US012694221B2

(12) United States Patent (10) Patent No.: US 12,694,221 B2

Pu et al. (45) Date of Patent: Jul. 28, 2026

(54) DYNAMIC CONTENT RENDERING BASED ON CONTEXT FOR AR AND ASSISTANT SYSTEMS

(71) Applicant: Meta Platforms, Inc., Menlo Park, CA (US)

(72) Inventors: Yiming Pu, Santa Clara, CA (US); Christopher E Balmes, San Francisco, CA (US); Gabrielle Catherine Moskey, San Mateo, CA (US); John Jacob Blakeley, Bothell, WA (US); Amy Lawson Bearman, Emerald Hills, CA (US); Alireza Dirafzoon, San Francisco, CA (US); Matthew Dan Feiszli, San Francisco, CA (US); Ganesh Venkatesh, San Jose, CA (US); Babak Damavandi, San Francisco, CA (US); Jiwen Ren, Brooklyn, NY (US); Chengyuan Yan, San Bruno, CA (US); Guangqiang Dong, Sammamish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 86 days.

(21) Appl. No.: 18/597,470

(22) Filed: Mar. 6, 2024

(65) Prior Publication Data

US 2024/0296289 A1 Sep. 5, 2024

Related U.S. Application Data

(63) Continuation of application No. 17/391,765, filed on Aug. 2, 2021, now Pat. No. 11,966,701.

(Continued)

(51) Int. Cl.
*G06F 40/00* (2020.01)
*G06F 1/3206* (2019.01)
(Continued)

(52) U.S. Cl.
CPC ............ *G06F 40/30* (2020.01); *G06F 1/3206* (2013.01); *G06F 3/011* (2013.01);
(Continued)

(58) Field of Classification Search
None
See application file for complete search history.

(56) References Cited

U.S. PATENT DOCUMENTS 5,282,267 A 1/1994 Woo, Jr. et al.
5,926,537 A 7/1999 Birze
(Continued)

FOREIGN PATENT DOCUMENTS

CA 3142624 A1 12/2020
CN 107978313 A 5/2018
(Continued)

OTHER PUBLICATIONS

US 11,915,021 B1, 02/2024, Liu et al. (withdrawn)
(Continued)

*Primary Examiner* — Martin Mushambo
(74) *Attorney, Agent, or Firm* — Morgan, Lewis & Bockius LLP

(57) ABSTRACT

In one embodiment, a method includes rendering a first output image comprising one or more augmented-reality (AR) objects for displays of an AR rendering device of an AR system associated with a first user. The method further includes accessing sensor signals associated with the first user. The one or more sensor signals may be captured by sensors of the AR system. The method further includes detecting a change in a context of the first user with respect (Continued)

to a real-world environment based on the sensor signals. The method further includes rendering a second output image comprising the AR objects for the displays of the AR rendering device. One or more of the AR objects may be adapted based on the detected change in the context of the first user.

20 Claims, 30 Drawing Sheets

Related U.S. Application Data

(60) Provisional application No. 63/177,812, filed on Apr. 21, 2021.

(51) Int. Cl.

| | |
|---|---|
| *G06F 3/01* | (2006.01) |
| *G06F 3/04815* | (2022.01) |
| *G06F 16/11* | (2019.01) |
| *G06F 16/95* | (2019.01) |
| *G06F 40/205* | (2020.01) |
| *G06F 40/30* | (2020.01) |
| *G06F 40/35* | (2020.01) |
| *G06N 5/02* | (2023.01) |
| *G06N 5/046* | (2023.01) |
| *G06N 20/00* | (2019.01) |
| *G06T 19/00* | (2011.01) |
| *G06T 19/20* | (2011.01) |
| *G10L 15/08* | (2006.01) |
| *G10L 15/18* | (2013.01) |
| *H04L 67/133* | (2022.01) |
| *G06F 40/295* | (2020.01) |
| *G10L 15/22* | (2006.01) |
| *G10L 15/26* | (2006.01) |
| *G10L 15/30* | (2013.01) |
| *H04L 51/02* | (2022.01) |

(52) U.S. Cl.

CPC ........ *G06F 3/04815* (2013.01); *G06F 16/122* (2019.01); *G06F 16/95* (2019.01); *G06F 40/205* (2020.01); *G06F 40/35* (2020.01); *G06N 5/02* (2013.01); *G06N 5/046* (2013.01); *G06N 20/00* (2019.01); *G06T 19/006* (2013.01); *G06T 19/20* (2013.01); *G10L 15/083* (2013.01); *G10L 15/1815* (2013.01); *H04L 67/133* (2022.05); *G06F 40/295* (2020.01); *G06T 2219/2004* (2013.01); *G10L 15/22* (2013.01); *G10L 2015/223* (2013.01); *G10L 15/26* (2013.01); *G10L 15/30* (2013.01); *H04L 51/02* (2013.01)

(56) References Cited

U.S. PATENT DOCUMENTS

| | | | |
|---|---|---|---|
| 6,014,439 | A | 1/2000 | Walker et al. |
| 6,504,571 | B1 | 1/2003 | Narayanaswami et al. |
| 7,124,123 | B1 | 10/2006 | Roskind et al. |
| 7,158,678 | B2 | 1/2007 | Nagel et al. |
| 7,397,912 | B2 | 7/2008 | Aasman et al. |
| 7,613,287 | B1 | 11/2009 | Stifelman et al. |
| 7,889,853 | B2 | 2/2011 | Sutcliffe |
| 8,027,451 | B2 | 9/2011 | Arendsen et al. |
| 8,204,200 | B2 | 6/2012 | Wang et al. |
| 8,560,564 | B1 | 10/2013 | Hoelzle et al. |
| 8,660,247 | B1 | 2/2014 | Brown |
| 8,677,377 | B2 | 3/2014 | Cheyer et al. |
| 8,935,192 | B1 | 1/2015 | Ventilla et al. |
| 8,983,383 | B1 | 3/2015 | Haskin |
| 9,154,739 | B1 | 10/2015 | Nicolaou et al. |
| 9,251,471 | B2 | 2/2016 | Pinckney et al. |
| 9,299,059 | B1 | 3/2016 | Marra et al. |
| 9,304,736 | B1 | 4/2016 | Whiteley et al. |
| 9,338,242 | B1 | 5/2016 | Suchland et al. |
| 9,338,493 | B2 | 5/2016 | Van Os et al. |
| 9,390,724 | B2 | 7/2016 | List |
| 9,418,658 | B1 | 8/2016 | David et al. |
| 9,472,206 | B2 | 10/2016 | Ady |
| 9,479,931 | B2 | 10/2016 | Ortiz, Jr. et al. |
| 9,576,574 | B2 | 2/2017 | Van Os |
| 9,639,608 | B2 | 5/2017 | Freeman |
| 9,659,577 | B1 | 5/2017 | Langhammer |
| 9,720,955 | B1 | 8/2017 | Cao et al. |
| 9,747,895 | B1 | 8/2017 | Jansche et al. |
| 9,792,281 | B2 | 10/2017 | Sarikaya |
| 9,858,925 | B2 | 1/2018 | Gruber et al. |
| 9,865,260 | B1 | 1/2018 | Vuskovic et al. |
| 9,875,233 | B1 | 1/2018 | Tomkins et al. |
| 9,875,741 | B2 | 1/2018 | Gelfenbeyn et al. |
| 9,881,077 | B1 | 1/2018 | Alfonseca et al. |
| 9,886,953 | B2 | 2/2018 | Lemay et al. |
| 9,990,591 | B2 | 6/2018 | Gelfenbeyn et al. |
| 10,042,032 | B2 | 8/2018 | Scott et al. |
| 10,127,220 | B2 | 11/2018 | Bellegarda et al. |
| 10,134,395 | B2 | 11/2018 | Typrin |
| 10,162,886 | B2 | 12/2018 | Wang et al. |
| 10,199,051 | B2 | 2/2019 | Binder et al. |
| 10,241,752 | B2 | 3/2019 | Lemay et al. |
| 10,276,170 | B2 | 4/2019 | Gruber et al. |
| 10,311,833 | B1 | 6/2019 | Qiu et al. |
| 10,387,464 | B2 | 8/2019 | Weston et al. |
| 10,453,454 | B2 | 10/2019 | Homma et al. |
| 10,462,422 | B1 | 10/2019 | Harrison et al. |
| D868,793 | S | 12/2019 | Germe |
| 10,511,808 | B2 | 12/2019 | Harrison et al. |
| 10,521,185 | B1 | 12/2019 | Kim et al. |
| D881,883 | S | 4/2020 | Germe |
| D882,567 | S | 4/2020 | Parfitt |
| D882,570 | S | 4/2020 | Germe |
| 10,623,897 | B1 | 4/2020 | Wu et al. |
| 10,685,669 | B1 | 6/2020 | Lan et al. |
| 10,719,786 | B1 | 7/2020 | Treseler et al. |
| 10,782,986 | B2 | 9/2020 | Martin |
| 10,803,050 | B1 | 10/2020 | Salkola |
| 10,841,249 | B2 | 11/2020 | Lim et al. |
| 10,854,206 | B1 | 12/2020 | Liu et al. |
| 10,878,805 | B2 | 12/2020 | Agarwal et al. |
| 10,885,819 | B1 | 1/2021 | Verbeke et al. |
| 10,896,295 | B1 | 1/2021 | Shenoy |
| 10,949,616 | B1 | 3/2021 | Shenoy et al. |
| 10,958,599 | B1 | 3/2021 | Penov et al. |
| 10,977,258 | B1 | 4/2021 | Liu et al. |
| 10,978,056 | B1 | 4/2021 | Challa et al. |
| 11,003,669 | B1 | 5/2021 | Nelson et al. |
| 11,003,839 | B1 | 5/2021 | Hatch |
| 11,038,974 | B1 | 6/2021 | Koukoumidis et al. |
| 11,042,554 | B1 | 6/2021 | Balakrishnan et al. |
| 11,086,858 | B1 | 8/2021 | Koukoumidis et al. |
| 11,175,646 | B2 | 11/2021 | Koch |
| 11,195,057 | B2 | 12/2021 | Zadeh et al. |
| 11,222,627 | B1 | 1/2022 | Qian et al. |
| 11,308,284 | B2 | 4/2022 | Huang et al. |
| 11,416,556 | B2 | 8/2022 | Misra et al. |
| 11,437,027 | B1 | 9/2022 | Guo et al. |
| 11,829,595 | B1 * | 11/2023 | Aggarwal ............... G06F 30/13 |
| 11,948,563 | B1 | 4/2024 | Liu et al. |
| 2008/0240379 | A1 | 10/2008 | Maislos et al. |
| 2008/0300884 | A1 | 12/2008 | Smith |
| 2009/0055778 | A1 | 2/2009 | Abdelazim et al. |
| 2009/0282033 | A1 | 11/2009 | Alshawi |
| 2011/0246383 | A1 | 10/2011 | Gibson et al. |
| 2012/0245944 | A1 | 9/2012 | Gruber et al. |
| 2012/0246191 | A1 | 9/2012 | Xiong |
| 2012/0265528 | A1 | 10/2012 | Gruber et al. |
| 2012/0311126 | A1 | 12/2012 | Jadallah et al. |
| 2013/0035930 | A1 | 2/2013 | Ferrucci et al. |
| 2013/0268839 | A1 | 10/2013 | Lefebvre et al. |
| 2013/0275138 | A1 | 10/2013 | Gruber et al. |

(56) References Cited

U.S. PATENT DOCUMENTS

| | | | |
|---|---|---|---|
| 2013/0275164 A1 | 10/2013 | Gruber et al. | |
| 2013/0278634 A1* | 10/2013 | Xu | G06T 19/006 |
| | | | 345/633 |
| 2013/0311508 A1* | 11/2013 | Denker | G06F 3/013 |
| | | | 707/769 |
| 2014/0012926 A1 | 1/2014 | Narayanan et al. | |
| 2014/0032659 A1 | 1/2014 | Marini et al. | |
| 2014/0074483 A1 | 3/2014 | Van Os | |
| 2014/0129266 A1 | 5/2014 | Perl et al. | |
| 2014/0164506 A1 | 6/2014 | Tesch et al. | |
| 2014/0225918 A1 | 8/2014 | Mittal et al. | |
| 2014/0244712 A1 | 8/2014 | Walters et al. | |
| 2014/0278343 A1 | 9/2014 | Tran | |
| 2014/0280017 A1 | 9/2014 | Indarapu et al. | |
| 2014/0280302 A1 | 9/2014 | Morsi et al. | |
| 2014/0297284 A1 | 10/2014 | Gruber et al. | |
| 2014/0314338 A1 | 10/2014 | Hamel et al. | |
| 2015/0081674 A1 | 3/2015 | Ali et al. | |
| 2015/0134430 A1 | 5/2015 | Ellis et al. | |
| 2015/0142420 A1 | 5/2015 | Sarikaya et al. | |
| 2015/0142704 A1 | 5/2015 | London | |
| 2015/0169284 A1 | 6/2015 | Quast et al. | |
| 2015/0169572 A1 | 6/2015 | Taubman et al. | |
| 2015/0169744 A1 | 6/2015 | Walkingshaw et al. | |
| 2015/0179168 A1 | 6/2015 | Hakkani-Tur et al. | |
| 2015/0186156 A1 | 7/2015 | Brown et al. | |
| 2015/0207765 A1 | 7/2015 | Brantingham et al. | |
| 2015/0220888 A1 | 8/2015 | Iyer | |
| 2015/0235447 A1 | 8/2015 | Abovitz et al. | |
| 2015/0347375 A1 | 12/2015 | Tremblay et al. | |
| 2016/0019290 A1 | 1/2016 | Ratnaparkhi et al. | |
| 2016/0037311 A1 | 2/2016 | Cho | |
| 2016/0063118 A1 | 3/2016 | Campbell et al. | |
| 2016/0116980 A1* | 4/2016 | George-Svahn | G06F 3/041 |
| | | | 345/173 |
| 2016/0179462 A1 | 6/2016 | Bjorkengren | |
| 2016/0196491 A1 | 7/2016 | Chandrasekaran et al. | |
| 2016/0225370 A1 | 8/2016 | Kannan et al. | |
| 2016/0255082 A1 | 9/2016 | Rathod | |
| 2016/0260436 A1 | 9/2016 | Lemay et al. | |
| 2016/0293164 A1 | 10/2016 | Shi et al. | |
| 2016/0306505 A1 | 10/2016 | Vigneras et al. | |
| 2016/0308799 A1 | 10/2016 | Schubert et al. | |
| 2016/0328096 A1 | 11/2016 | Tran et al. | |
| 2016/0378849 A1 | 12/2016 | Myslinski | |
| 2016/0378861 A1 | 12/2016 | Eledath et al. | |
| 2017/0026318 A1 | 1/2017 | Daniel et al. | |
| 2017/0076720 A1 | 3/2017 | Gopalan et al. | |
| 2017/0083285 A1 | 3/2017 | Meyers et al. | |
| 2017/0091168 A1 | 3/2017 | Bellegarda et al. | |
| 2017/0092264 A1 | 3/2017 | Hakkani-Tur et al. | |
| 2017/0132019 A1 | 5/2017 | Karashchuk et al. | |
| 2017/0193390 A1 | 7/2017 | Weston et al. | |
| 2017/0220119 A1* | 8/2017 | Potts | G06F 3/017 |
| 2017/0235361 A1 | 8/2017 | Rigazio et al. | |
| 2017/0286401 A1 | 10/2017 | He et al. | |
| 2017/0337742 A1* | 11/2017 | Powderly | G06F 3/015 |
| 2017/0353469 A1 | 12/2017 | Selekman et al. | |
| 2017/0358304 A1 | 12/2017 | Castillo Sanchez et al. | |
| 2017/0359707 A1 | 12/2017 | Diaconu et al. | |
| 2018/0013699 A1 | 1/2018 | Sapoznik et al. | |
| 2018/0018562 A1 | 1/2018 | Jung | |
| 2018/0018987 A1 | 1/2018 | Zass | |
| 2018/0040020 A1 | 2/2018 | Kurian et al. | |
| 2018/0045963 A1* | 2/2018 | Hoover | G02B 27/0189 |
| 2018/0046151 A1 | 2/2018 | Ahmed | |
| 2018/0046861 A1* | 2/2018 | Patel | G06T 19/006 |
| 2018/0052824 A1 | 2/2018 | Ferrydiansyah et al. | |
| 2018/0054523 A1 | 2/2018 | Zhang et al. | |
| 2018/0096071 A1 | 4/2018 | Green | |
| 2018/0096072 A1 | 4/2018 | He et al. | |
| 2018/0107917 A1 | 4/2018 | Hewavitharana et al. | |
| 2018/0121508 A1 | 5/2018 | Halstvedt | |
| 2018/0189629 A1 | 7/2018 | Yatziv et al. | |
| 2018/0196880 A1 | 7/2018 | Carter | |
| 2018/0210874 A1 | 7/2018 | Fuxman et al. | |
| 2018/0211665 A1 | 7/2018 | Park et al. | |
| 2018/0293484 A1 | 10/2018 | Wang et al. | |
| 2018/0308486 A1 | 10/2018 | Saddler et al. | |
| 2018/0329998 A1 | 11/2018 | Thomson et al. | |
| 2018/0364887 A1 | 12/2018 | Bell et al. | |
| 2019/0012470 A1* | 1/2019 | Ross | G06T 15/005 |
| 2019/0034412 A1 | 1/2019 | Gupta et al. | |
| 2019/0035152 A1 | 1/2019 | Kazansky | |
| 2019/0035390 A1 | 1/2019 | Howard et al. | |
| 2019/0066670 A1 | 2/2019 | White et al. | |
| 2019/0080698 A1 | 3/2019 | Miller | |
| 2019/0082221 A1 | 3/2019 | Jain et al. | |
| 2019/0087491 A1 | 3/2019 | Bax | |
| 2019/0096129 A1 | 3/2019 | Rhodes et al. | |
| 2019/0096398 A1 | 3/2019 | Sereshki | |
| 2019/0103108 A1 | 4/2019 | Song et al. | |
| 2019/0132265 A1 | 5/2019 | Nowak-Przygodzki et al. | |
| 2019/0139150 A1 | 5/2019 | Brownhill et al. | |
| 2019/0171943 A1 | 6/2019 | Pao et al. | |
| 2019/0179611 A1 | 6/2019 | Wojogbe et al. | |
| 2019/0180144 A1 | 6/2019 | Tsishkou et al. | |
| 2019/0213490 A1 | 7/2019 | White et al. | |
| 2019/0311036 A1 | 10/2019 | Shanmugam et al. | |
| 2019/0311720 A1 | 10/2019 | Pasko | |
| 2019/0324527 A1 | 10/2019 | Presant et al. | |
| 2019/0324553 A1 | 10/2019 | Liu et al. | |
| 2019/0324780 A1 | 10/2019 | Zhu et al. | |
| 2019/0325042 A1 | 10/2019 | Yu et al. | |
| 2019/0325080 A1 | 10/2019 | Natarajan et al. | |
| 2019/0325081 A1 | 10/2019 | Liu et al. | |
| 2019/0325084 A1 | 10/2019 | Peng et al. | |
| 2019/0325864 A1 | 10/2019 | Anders et al. | |
| 2019/0327330 A1 | 10/2019 | Natarajan et al. | |
| 2019/0327331 A1 | 10/2019 | Natarajan et al. | |
| 2019/0347837 A1 | 11/2019 | Donalek et al. | |
| 2019/0348033 A1 | 11/2019 | Chen et al. | |
| 2019/0361408 A1 | 11/2019 | Tokuchi | |
| 2020/0013380 A1 | 1/2020 | Kakoyiannis et al. | |
| 2020/0027427 A1* | 1/2020 | Allen | G06F 3/017 |
| 2020/0103963 A1 | 4/2020 | Kelly et al. | |
| 2020/0143562 A1* | 5/2020 | Jiang | G06V 40/19 |
| 2020/0211546 A1 | 7/2020 | Schairer et al. | |
| 2020/0213663 A1 | 7/2020 | Okamoto | |
| 2020/0221223 A1 | 7/2020 | Zhou | |
| 2020/0228692 A1 | 7/2020 | Wakamatsu et al. | |
| 2020/0241646 A1 | 7/2020 | Hebbalaguppe et al. | |
| 2020/0274773 A1 | 8/2020 | Mortsolf et al. | |
| 2020/0285855 A1 | 9/2020 | Brebner | |
| 2020/0304880 A1 | 9/2020 | Diaz Delgado et al. | |
| 2020/0314330 A1 | 10/2020 | Takayama | |
| 2020/0341546 A1 | 10/2020 | Yuan et al. | |
| 2020/0394843 A1 | 12/2020 | Ramachandra Iyer | |
| 2020/0409457 A1 | 12/2020 | Terrano et al. | |
| 2020/0410012 A1 | 12/2020 | Moon et al. | |
| 2020/0410891 A1 | 12/2020 | Baeuerle et al. | |
| 2021/0048883 A1 | 2/2021 | Kelly et al. | |
| 2021/0081698 A1 | 3/2021 | Lindeman et al. | |
| 2021/0082403 A1 | 3/2021 | Agarwal et al. | |
| 2021/0090343 A1* | 3/2021 | Godi | G06F 3/011 |
| 2021/0117479 A1 | 4/2021 | Liu et al. | |
| 2021/0117623 A1 | 4/2021 | Aly et al. | |
| 2021/0117712 A1 | 4/2021 | Huang et al. | |
| 2021/0117780 A1 | 4/2021 | Malik et al. | |
| 2021/0118440 A1 | 4/2021 | Peng et al. | |
| 2021/0118442 A1 | 4/2021 | Poddar et al. | |
| 2021/0120206 A1* | 4/2021 | Liu | G06F 40/295 |
| 2021/0247846 A1 | 8/2021 | Shriram et al. | |
| 2021/0334565 A1 | 10/2021 | Roche et al. | |
| 2022/0121884 A1 | 4/2022 | Zadeh et al. | |
| 2022/0129123 A1 | 4/2022 | Nair et al. | |
| 2022/0214743 A1* | 7/2022 | Dascola | G06F 3/017 |
| 2022/0219206 A1 | 7/2022 | Narayan | |

(56) References Cited

U.S. PATENT DOCUMENTS

| | | | |
|---|---|---|---|
| 2022/0269762 A1 | 8/2022 | Zhao et al. | |
| 2024/0054156 A1 | 2/2024 | Vincent et al. | |

FOREIGN PATENT DOCUMENTS

| | | |
|---|---|---|
| CN | 111344780 A | 6/2020 |
| EP | 3557504 A1 | 10/2019 |
| EP | 3792914 A2 | 3/2021 |
| GB | 2581621 A | 8/2020 |
| TW | 201712669 A | 4/2017 |
| TW | 201730734 A | 9/2017 |
| TW | 201738877 A | 11/2017 |
| TW | 201935270 A | 9/2019 |
| TW | 202001597 A | 1/2020 |
| WO | 9401824 A1 | 1/1994 |
| WO | 2012116241 A2 | 8/2012 |
| WO | 2017027339 A1 | 2/2017 |
| WO | 2019118367 A1 | 6/2019 |

OTHER PUBLICATIONS

Co-pending U.S. Appl. No. 16/914,966, inventor Behar; Noam Yakob, filed Jun. 29, 2020.

Co-pending U.S. Appl. No. 16/921,665, inventors Liu; Honglei et al., filed Jul. 6, 2020.

Co-pending U.S. Appl. No. 16/998,423, inventors Armen; Aghajanyan et al., filed Aug. 20, 2020.

Co-pending U.S. Appl. No. 17/006,260, inventors William; Presant et al., filed Aug. 28, 2020.

Co-pending U.S. Appl. No. 17/006,339, inventors Shivani; Poddar et al., filed Aug. 28, 2020.

Co-pending U.S. Appl. No. 17/006,377, inventors Shivani; Poddar et al., filed Aug. 28, 2020.

Co-pending U.S. Appl. No. 17/009,542, inventor Kottur; Satwik , filed Sep. 1, 2020.

Co-pending U.S. Appl. No. 17/035,253, inventors Khemka; Piyush et al., filed Sep. 28, 2020.

Co-pending U.S. Appl. No. 17/120,013, inventors Botros; Fadi et al., filed Dec. 11, 2020.

Co-pending U.S. Appl. No. 17/136,636, inventors Greenberg; Michael et al., filed Dec. 29, 2020.

Co-pending U.S. Appl. No. 17/139,363, inventors Daniel; Manhon Cheng et al., filed Dec. 31, 2020.

Co-pending U.S. Appl. No. 17/186,459, inventors Liu; Bing et al., filed Feb. 26, 2021.

Co-pending U.S. Appl. No. 17/336,716, inventors Chaland; Christophe et al., filed Jun. 2, 2021.

Co-pending U.S. Appl. No. 17/351,501, inventors Sethi; Pooja et al., filed Jun. 18, 2021.

Co-pending U.S. Appl. No. 17/394,096, inventors Wang; Emily et al., filed Aug. 4, 2021.

Co-pending U.S. Appl. No. 17/394,159, inventors Santoro; Elizabeth Kelsey et al., filed Aug. 4, 2021.

Co-pending U.S. Appl. No. 17/407,922, inventors Pu; Yiming et al., filed Aug. 20, 2021.

Co-pending U.S. Appl. No. 17/504,276, inventors Satwik; Kottur et al., filed Oct. 18, 2021.

Co-pending U.S. Appl. No. 17/512,478, inventors Chen; Zhiyu et al., filed Oct. 27, 2021.

Co-pending U.S. Appl. No. 17/512,490, inventors Presant; William Crosby et al., filed Oct. 27, 2021.

Co-pending U.S. Appl. No. 17/521,623, inventors Martinson; Leif Haven et al., filed Nov. 8, 2021.

Co-pending U.S. Appl. No. 17/524,598, inventors Hanson; Michael Robert et al., filed Nov. 11, 2021.

Co-pending U.S. Appl. No. 17/525,510, inventors Shrivastava; Akshat et al., filed Nov. 12, 2021.

Co-pending U.S. Appl. No. 17/543,178, inventors Desai; Shrey et al., filed Dec. 6, 2021.

Co-pending U.S. Appl. No. 17/566,467, inventors Goel; Swati et al., filed Dec. 30, 2021.

Co-pending U.S. Appl. No. 17/725,540, inventors Surkov; Alexey Gennadyevich et al., filed Apr. 20, 2022.

Co-pending U.S. Appl. No. 17/732,104, inventors Sheng; Bi et al., filed Apr. 28, 2022.

Huang J., et al., "An Augmented Reality Sign-Reading Assistant for Users with Reduced Vision," Plos One, vol. 14, No. 1,Jan. 16, 2019, 9 pages.

International Search Report and Written Opinion for International Application No. PCT/US2022/024163, mailed Oct. 10, 2022, 9 pages.

International Search Report and Written Opinion for International Application No. PCT/US2022/025653, mailed Jul. 21, 2022, 11 pages.

International Search Report and Written Opinion for International Application No. PCT/US2022/025675, mailed Jul. 22, 2022, 14 pages.

International Search Report and Written Opinion for International Application No. PCT/US2022/025844, mailed Jul. 25, 2022, 14 pages.

Khan M.D., et al., "An AI-Based Visual Aid With Integrated Reading Assistant for the Completely Blind," IEEE TRA1'ISACTIONS on Human-Machine Systems, vol. 50, No. 6, Dec. 2020, pp. 507-517.

Pintado D., et al., "Deep Learning Based Shopping Assistant for the Visually Impaired," IEEE International Conference Onconsumer Electronics (ICCE), Jan. 11, 2019, 6 pages.

U.S. Appl. No. 62/660,876, inventors Kumar; Anuj et al., filed Apr. 20, 2018.

U.S. Appl. No. 62/675,090, inventors Hanson; Michael Robert et al., filed May 22, 2018.

U.S. Appl. No. 62/747,628, inventors Liu; Honglei et al., filed Oct. 18, 2018.

U.S. Appl. No. 62/749,608, inventors Challa; Ashwini et al., filed Oct. 23, 2018.

U.S. Appl. No. 62/750,746, inventors Liu; Honglei et al., filed Oct. 25, 2018.

U.S. Appl. No. 62/923,342, inventors Hanson; Michael Robert et al., filed Oct. 18, 2019.

USPTO—Office Action mailed on Dec. 16, 2024 for related U.S. Appl. No. 17/725,540; 72 pages.

Co-pending U.S. Appl. No. 15/953,957, inventors Moujahid; Kemal El et al., filed Apr. 16, 2018.

Co-pending U.S. Appl. No. 15/967,193, inventors Testuggine; Davide et al., filed Apr. 30, 2018.

Co-pending U.S. Appl. No. 15/967,279, inventors Fuchun; Peng et al., filed Apr. 30, 2018.

Co-pending U.S. Appl. No. 16/025,317, inventors Gupta; Sonal et al., filed Jul. 2, 2018.

Co-pending U.S. Appl. No. 16/036,827, inventors Emmanouil; Koukoumidis et al., filed Jul. 16, 2018.

Co-pending U.S. Appl. No. 16/038,120, inventors Schissel; Jason et al., filed Jul. 17, 2018.

Co-pending U.S. Appl. No. 16/048,049, inventor Markku; Salkola, filed Jul. 27, 2018.

Co-pending U.S. Appl. No. 16/048,072, inventor Salkola; Markku , filed Jul. 27, 2018.

Co-pending U.S. Appl. No. 16/048,101, inventor Salkola; Markku , filed Jul. 27, 2018.

Co-pending U.S. Appl. No. 16/057,414, inventors Jeremy; Gillmor Kahn et al., filed Aug. 7, 2018.

Co-pending U.S. Appl. No. 16/103,775, inventors Zheng; Zhou et al., filed Aug. 14, 2018.

Co-pending U.S. Appl. No. 16/107,601, inventor Rajesh; Krishna Shenoy, filed Aug. 21, 2018.

Co-pending U.S. Appl. No. 16/107,847, inventors Rajesh; Krishna Shenoy et al., filed Aug. 21, 2018.

Co-pending U.S. Appl. No. 16/121,393, inventors Zhou; Zheng et al., filed Sep. 4, 2018.

Co-pending U.S. Appl. No. 16/127,173, inventors Zheng; Zhou et al., filed Sep. 10, 2018.

(56) References Cited

OTHER PUBLICATIONS

Co-pending U.S. Appl. No. 16/129,638, inventors Vivek; Natarajan et al., filed Sep. 12, 2018.
Co-pending U.S. Appl. No. 16/150,184, inventors Francislav; P. Penov et al., filed Oct. 2, 2018.
Co-pending U.S. Appl. No. 16/151,040, inventors Brian; Nelson et al., filed Oct. 3, 2018.
Co-pending U.S. Appl. No. 16/168,536, inventors Dumoulin; Benoit F. et al., filed Oct. 23, 2018.
Co-pending U.S. Appl. No. 16/176,081, inventors Anusha; Balakrishnan et al., filed Oct. 31, 2018.
Co-pending U.S. Appl. No. 16/176,312, inventors Koukoumidis; Emmanouil et al., filed Oct. 31, 2018.
Co-pending U.S. Appl. No. 16/182,542, inventors Michael; Hanson et al., filed Nov. 6, 2018.
Co-pending U.S. Appl. No. 16/183,650, inventors Xiaohu; Liu et al., filed Nov. 7, 2018.
Co-pending U.S. Appl. No. 16/192,538, inventor Koukoumidis; Emmanouil, filed Nov. 15, 2018.
Co-pending U.S. Appl. No. 16/222,923, inventors Jason; Schissel et al., filed Dec. 17, 2018.
Co-pending U.S. Appl. No. 16/222,957, inventors Emmanouil; Koukoumidis et al., filed Dec. 17, 2018.
Co-pending U.S. Appl. No. 16/229,828, inventors Xiaohu; Liu et al., filed Dec. 21, 2018.
Co-pending U.S. Appl. No. 16/247,439, inventors Xiaohu; Liu et al., filed on Jan. 14, 2019.
Co-pending U.S. Appl. No. 16/264,173, inventors Ashwini; Challa et al., filed Jan. 31, 2019.
Co-pending U.S. Appl. No. 16/376,832, inventors Liu; Honglei et al., filed Apr. 5, 2019.
Co-pending U.S. Appl. No. 16/389,634, inventors Crook; Paul Anthony et al., filed Apr. 19, 2019.
Co-pending U.S. Appl. No. 16/389,728, inventors William; Presant et al., filed Apr. 19, 2019.
Co-pending U.S. Appl. No. 16/389,738, inventors Peng; Fuchun et al., filed Apr. 19, 2019.
Co-pending U.S. Appl. No. 16/389,769, inventors Honglei; Liu et al., filed Apr. 19, 2019.
Co-pending U.S. Appl. No. 16/434,010, inventors Dogaru; Sergiu et al., filed Jun. 6, 2019.
Co-pending U.S. Appl. No. 16/552,559, inventors Seungwhan; Moon et al., filed Aug. 27, 2019.
Co-pending U.S. Appl. No. 16/557,055, inventors Moon; Seungwhan et al., filed Aug. 30, 2019.

Co-pending U.S. Appl. No. 16/659,070, inventors Lisa; Xiaoyi Huang et al., filed Oct. 21, 2019.
Co-pending U.S. Appl. No. 16/659,203, inventors Huang; Lisa Xiaoyi et al., filed Oct. 21, 2019.
Co-pending U.S. Appl. No. 16/659,419, inventor Huang; Lisa Xiaoyi, filed Oct. 21, 2019.
Co-pending U.S. Appl. No. 16/703,700, inventors Ahmed; Aly et al., filed Dec. 4, 2019.
Co-pending U.S. Appl. No. 16/733,044, inventors Francislav; P. Penov et al., filed Jan. 2, 2020.
Co-pending U.S. Appl. No. 16/741,630, inventors Crook; Paul Anthony et al., filed Jan. 13, 2020.
Co-pending U.S. Appl. No. 16/741,642, inventors Fuchun; Peng et al., filed Jan. 13, 2020.
Co-pending U.S. Appl. No. 16/742,668, inventors Xiaohu; Liu et al., filed Jan. 14, 2020.
Co-pending U.S. Appl. No. 16/742,769, inventors Liu; Xiaohu et al., filed Jan. 14, 2020.
Co-pending U.S. Appl. No. 16/790,497, inventors Gao; Yang et al., filed Feb. 13, 2020.
Co-pending U.S. Appl. No. 16/815,960, inventors Kshitiz; Malik et al., filed Mar. 11, 2020.
Co-pending U.S. Appl. No. 16/815,990, inventors Kshitiz; Malik et al., filed Mar. 11, 2020.
Co-pending U.S. Appl. No. 16/842,366, inventors Sravani; Kamisetty et al., filed Apr. 7, 2020.
EPO—Office Action mailed Jan. 2, 2025 for European Patent Application No. 22729316.4, filed on Apr. 20, 2022, 9 pages.
EPO—Office Action mailed Jan. 3, 2025 for European Patent Application No. 22729836.1, filed on Apr. 21, 2022, 5 pages.
EPO—Office Action mailed Dec. 23, 2024 for European Patent Application No. 22726559.2, filed on Apr. 21, 2022, 9 pages.
Notice of Allowance mailed Apr. 2, 2025 for U.S. Appl. No. 17/725,540, filed Apr. 20, 2022, 14 pages.
Office Action mailed Oct. 6, 2025 for European Patent Application No. 22729836.1, filed on Apr. 21, 2022, 11 pages.
Office Action mailed May 16, 2025 for European Application No. 22729836.1, filed Apr. 21, 2022, 10 pages.
Office Action mailed May 20, 2025 for European Application No. 22729316.4, filed Apr. 20, 2022, 11 pages.
Office Action mailed Sep. 30, 2025 for Taiwan Application No. 111107738, filed Mar. 3, 2022, 8 pages.
Office Action mailed Jul. 31, 2025 for Taiwan Application No. 111107737, filed Mar. 3, 2022, 10 pages.
Non-Final Office Action mailed Apr. 20, 2026 for U.S. Appl. No. 18/894,872, filed Sep. 24, 2024, 15 pages.

* cited by examiner

812 — Front View

816

Standby — 810

Side View — 818

814

130

820
System
UI

832 — Front View

836

820

834

Glance — 830

Side View — 838

Notifications — 836

814

130

820
System
UI

Status Bar — 834

842 — Front View

Brandi

836

844

846    Interactive — 840

Side View — 838

Notifications — 836

814

Assistant
UI — 844

130

846
Apps

Status Bar — 834

2110 — Front View

2115

130

2105

Side View — 2120

2115

App
(Navigation)

130

2105

2110 — Front View    2115

130

2105

Side View — 2120

App
(Navigation)

2115

130

2105

2110 — Front View    2125 eggs
milk
bread
almond butter
apples
bananas
bar soap

130

2105

Side View — 2120

Reminder

2125

130

2105

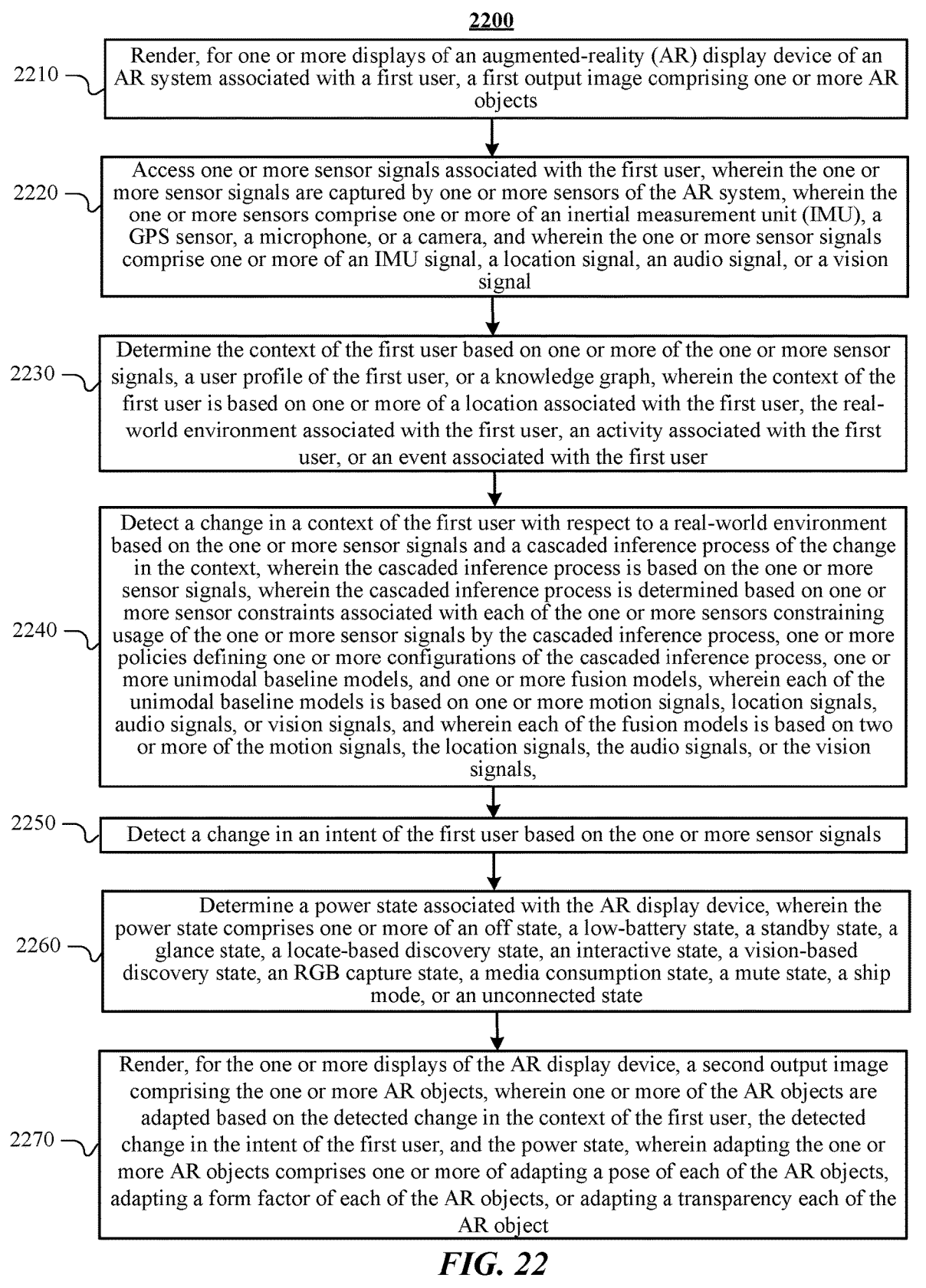

2200

| |
|---|
| 2210 — Render, for one or more displays of an augmented-reality (AR) display device of an AR system associated with a first user, a first output image comprising one or more AR objects |

↓

| |
|---|
| 2220 — Access one or more sensor signals associated with the first user, wherein the one or more sensor signals are captured by one or more sensors of the AR system, wherein the one or more sensors comprise one or more of an inertial measurement unit (IMU), a GPS sensor, a microphone, or a camera, and wherein the one or more sensor signals comprise one or more of an IMU signal, a location signal, an audio signal, or a vision signal |

↓

| |
|---|
| 2230 — Determine the context of the first user based on one or more of the one or more sensor signals, a user profile of the first user, or a knowledge graph, wherein the context of the first user is based on one or more of a location associated with the first user, the real-world environment associated with the first user, an activity associated with the first user, or an event associated with the first user |

↓

| |
|---|
| 2240 — Detect a change in a context of the first user with respect to a real-world environment based on the one or more sensor signals and a cascaded inference process of the change in the context, wherein the cascaded inference process is based on the one or more sensor signals, wherein the cascaded inference process is determined based on one or more sensor constraints associated with each of the one or more sensors constraining usage of the one or more sensor signals by the cascaded inference process, one or more policies defining one or more configurations of the cascaded inference process, one or more unimodal baseline models, and one or more fusion models, wherein each of the unimodal baseline models is based on one or more motion signals, location signals, audio signals, or vision signals, and wherein each of the fusion models is based on two or more of the motion signals, the location signals, the audio signals, or the vision signals, |

↓

| |
|---|
| 2250 — Detect a change in an intent of the first user based on the one or more sensor signals |

↓

| |
|---|
| 2260 — Determine a power state associated with the AR display device, wherein the power state comprises one or more of an off state, a low-battery state, a standby state, a glance state, a locate-based discovery state, an interactive state, a vision-based discovery state, an RGB capture state, a media consumption state, a mute state, a ship mode, or an unconnected state |

↓

| |
|---|
| 2270 — Render, for the one or more displays of the AR display device, a second output image comprising the one or more AR objects, wherein one or more of the AR objects are adapted based on the detected change in the context of the first user, the detected change in the intent of the first user, and the power state, wherein adapting the one or more AR objects comprises one or more of adapting a pose of each of the AR objects, adapting a form factor of each of the AR objects, or adapting a transparency each of the AR object |

*FIG. 22*

DYNAMIC CONTENT RENDERING BASED ON CONTEXT FOR AR AND ASSISTANT SYSTEMS

PRIORITY

This application is a continuation of U.S. patent application Ser. No. 17/391,765, filed Aug. 2, 2021, entitled "Dynamic content rendering based on context for AR and assistant systems," claims the benefit under 35 U.S.C. § 119(c) of U.S. Provisional Patent Application No. 63/177, 812, filed 21 Apr. 2021, all of which are incorporated herein by reference in their entirety.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with the assistant system via user inputs of various modalities (e.g., audio, voice, text, image, video, gesture, motion, location, orientation) in stateful and multi-turn conversations to receive assistance from the assistant system. As an example and not by way of limitation, the assistant system may support mono-modal inputs (e.g., only voice inputs), multi-modal inputs (e.g., voice inputs and text inputs), hybrid/multi-modal inputs, or any combination thereof. User inputs provided by a user may be associated with particular assistant-related tasks, and may include, for example, user requests (e.g., verbal requests for information or performance of an action), user interactions with an assistant application associated with the assistant system (e.g., selection of UI elements via touch or gesture), or any other type of suitable user input that may be detected and understood by the assistant system (e.g., user movements detected by the client device of the user). The assistant system may create and store a user profile comprising both personal and contextual information associated with the user. In particular embodiments, the assistant system may analyze the user input using natural-language understanding (NLU). The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation (NLG). Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, an artificial/augmented reality (AR) system may dynamically render AR content (e.g., the assistant representation/user interface (UI)) for a user with spatial and contextual awareness. This may allow the AR content to adapt to the user's activities and better integrate with the user's real-world environment. The AR system may use contextual information from the shell of the client system to understand the user's intent (i.e., their intended action) and dynamically adapt the digital display of the AR content accordingly to optimize their presence as the user transits from intent to intent. As an example and not by way of limitation, when a user wearing AR glasses walks to the kitchen, the assistant UI may fade or move to the bottom of the user's field of view to avoid blocking the user's view. But when the user gets close to the kitchen counter and looks at it, the assistant UI may snap to the countertop to provide assistance quickly to the user for what the user might want to do at the kitchen counter. The onboard sensors associated with the AR system may be able to pick up contextual signals that provide an understanding of the user's environment and state. To be power efficient, the AR system may use a cascaded classification approach, progressing from cheaper models to more expensive models, to determine the user's environment and state. The AR system may further adapt the rendering of the AR content based on such environment and state information. Although this disclosure focuses on AR systems, the concepts may be generally applicable to adapting virtual reality (VR) content on VR systems. Although this disclosure describes adapting particular contents by particular systems in a particular manner, this disclosure contemplates adapting any suitable content by any suitable system in any suitable manner.

In particular embodiments, an AR system may render, for one or more displays of an augmented-reality (AR) display device of the AR system associated with a first user, a first output image comprising one or more AR objects. The AR system may then access one or more sensor signals associated with the first user. In particular embodiments, the one or more sensor signals may be captured by one or more sensors of the AR system. The AR system may detect a change in a context of the first user with respect to a real-world environment based on the one or more sensor signals. The AR system may further render, for the one or more displays of the AR display device, a second output image comprising the one or more AR objects. In particular embodiments, one or more of the AR objects may be adapted based on the detected change in the context of the first user.

Certain technical challenges exist for dynamically adapting the rendering of AR content. One technical challenge may include determining how to adapt the rendering of the AR content. One solution presented by the embodiments disclosed herein to address this challenge may be determining the adaptation based on power states associated with the AR rendering device, as adapting the AR content based on power states may optimize the utilization of the computing power to enhance the user's continuous usage of the AR-enabled client system. Another solution presented by the embodiments disclosed herein to address this challenge may be determining the adaptation based on context information associated with the user, as the contextual information may indicate the user states and their environment to enable proactive experiences (e.g., shell, applications, etc.) and assistant use cases. One technical challenge may include accurately determining the context for adaptive rendering. The solution presented by the embodiments disclosed herein to address this challenge may be using different types of sensor signals to determine the context as these sensor signals may provide comprehensive information about a user's environment and state change for accurate context determination. Another technical challenge may include taking the most use of the limited computing power of a compact client system. The solution presented by the embodiments disclosed herein to address this challenge may be using a cascaded inference process where cheaper sensor signals are used first and more expensive sensor signals are used later, thereby gradually increasing the utilization of the limited computing power to make the best use of it.

Certain embodiments disclosed herein may provide one or more technical advantages. A technical advantage of the embodiments may include improving the user experience with the AR system as the most suitable AR content according to the context may be provided more prominently for the user to interact with. Another technical advantage of the embodiments may include enabling a user to be actively engaged with real-world activities while simultaneously providing assistance on demand, as the adaptive rendering of AR content may avoid disturbing the user with real-world activities but the user may still be able to easily access the AR content for different tasks. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 22 illustrates an example method for dynamically adapting the rendering of AR content.

DESCRIPTION OF EXAMPLE EMBODIMENTS

System Overview

Figure 1:
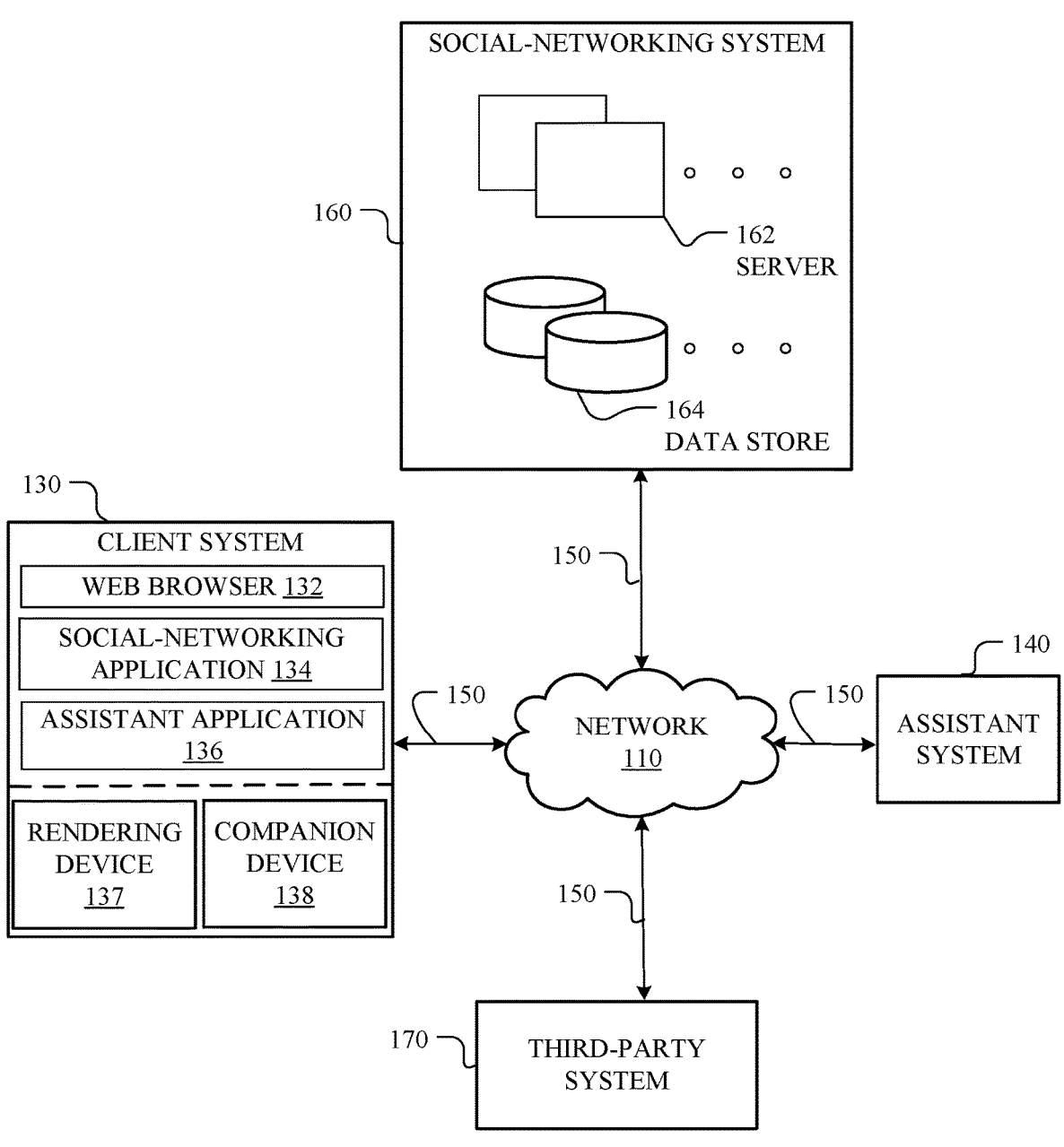
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 110, or a combination of two or more such networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be any suitable electronic device including hardware, software, or embedded logic components, or a combination of two or more such components, and may be capable of carrying out the functionalities implemented or supported by a client system 130. As an example and not by way of limitation, the client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual reality (VR) headset, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application Ser. No. 29/631,910, filed 3 Jan. 2018, U.S. Design patent application Ser. No. 29/631,747, filed 2 Jan. 2018, U.S. Design patent application Ser. No. 29/631,913, filed 3 Jan. 2018, and U.S. Design patent application Ser. No. 29/631,914, filed 3 Jan. 2018, each of which is incorporated by reference. This disclosure contemplates any suitable client systems 130. In particular embodiments, a client system 130 may enable a network user at a client system 130 to access a network 110. The client system 130 may also enable the user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may include an assistant xbot functionality as a front-end interface for interacting with the user of the client system 130, including receiving user inputs and presenting outputs. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may interact with the assistant system 140 by providing user input to the assistant application 136 via various modalities (e.g., audio, voice, text, vision, image, video, gesture, motion, activity, location, orientation). The assistant application 136 may communicate the user input to the assistant system 140 (e.g., via the assistant xbot). Based on the user input, the assistant system 140 may generate responses. The assistant system 140 may send the generated responses to the assistant application 136. The assistant application 136 may then present the responses to the user at the client system 130 via various modalities (e.g., audio, text, image, and video). As an example and not by way of limitation, the user may interact with the assistant system 140 by providing a user input (e.g., a verbal request for information regarding a current status of nearby vehicle traffic) to the assistant xbot via a microphone of the client system 130. The assistant application 136 may then communicate the user input to the assistant system 140 over network 110. The assistant system 140 may accordingly analyze the user input, generate a response based on the analysis of the user input (e.g., vehicle traffic information obtained from a third-party source), and communicate the generated response back to the assistant application 136. The assistant application 136 may then present the generated response to the user in any suitable manner (e.g., displaying a text-based push notification and/or image(s) illustrating a local map of nearby vehicle traffic on a display of the client system 130).

In particular embodiments, a client system 130 may implement wake-word detection techniques to allow users to conveniently activate the assistant system 140 using one or more wake-words associated with assistant system 140. As an example and not by way of limitation, the system audio API on client system 130 may continuously monitor user input comprising audio data (e.g., frames of voice data) received at the client system 130. In this example, a wake-word associated with the assistant system 140 may be the voice phrase "hey assistant." In this example, when the system audio API on client system 130 detects the voice phrase "hey assistant" in the monitored audio data, the assistant system 140 may be activated for subsequent interaction with the user. In alternative embodiments, similar detection techniques may be implemented to activate the assistant system 140 using particular non-audio user inputs associated with the assistant system 140. For example, the non-audio user inputs may be specific visual signals detected by a low-power sensor (e.g., camera) of client system 130. As an example and not by way of limitation, the visual signals may be a static image (e.g., barcode, QR code, universal product code (UPC)), a position of the user (e.g., the user's gaze towards client system 130), a user motion (e.g., the user pointing at an object), or any other suitable visual signal.

In particular embodiments, a client system 130 may include a rendering device 137 and, optionally, a companion device 138. The rendering device 137 may be configured to render outputs generated by the assistant system 140 to the user. The companion device 138 may be configured to perform computations associated with particular tasks (e.g., communications with the assistant system 140) locally (i.e., on-device) on the companion device 138 in particular circumstances (e.g., when the rendering device 137 is unable to perform said computations). In particular embodiments, the client system 130, the rendering device 137, and/or the companion device 138 may each be a suitable electronic device including hardware, software, or embedded logic components, or a combination of two or more such components, and may be capable of carrying out, individually or cooperatively, the functionalities implemented or supported by the client system 130 described herein. As an example and not by way of limitation, the client system 130, the rendering device 137, and/or the companion device 138 may each include a computer system such as a desktop computer, notebook or laptop computer, netbook, a tablet computer, c-book reader, GPS device, camera, personal digital assistant (PDA), handheld electronic device, cellular telephone, smartphone, smart speaker, virtual reality (VR) headset, augmented-reality (AR) smart glasses, other suitable electronic device, or any suitable combination thereof. In particular embodiments, one or more of the client system 130, the rendering device 137, and the companion device 138 may operate as a smart assistant device. As an example and not by way of limitation, the rendering device 137 may comprise smart glasses and the companion device 138 may comprise a smart phone. As another example and not by way of limitation, the rendering device 137 may comprise a smart watch and the companion device 138 may comprise a smart phone. As yet another example and not by way of limitation, the rendering device 137 may comprise smart glasses and the companion device 138 may comprise a smart remote for the smart glasses. As yet another example and not by way of limitation, the rendering device 137 may comprise a VR/AR headset and the companion device 138 may comprise a smart phone.

In particular embodiments, a user may interact with the assistant system 140 using the rendering device 137 or the companion device 138, individually or in combination. In particular embodiments, one or more of the client system 130, the rendering device 137, and the companion device 138 may implement a multi-stage wake-word detection model to enable users to conveniently activate the assistant system 140 by continuously monitoring for one or more wake-words associated with assistant system 140. At a first stage of the wake-word detection model, the rendering device 137 may receive audio user input (e.g., frames of voice data). If a wireless connection between the rendering device 137 and the companion device 138 is available, the application on the rendering device 137 may communicate the received audio user input to the companion application on the companion device 138 via the wireless connection. At a second stage of the wake-word detection model, the companion application on the companion device 138 may process the received audio user input to detect a wake-word associated with the assistant system 140. The companion application on the companion device 138 may then communicate the detected wake-word to a server associated with the assistant system 140 via wireless network 110. At a third stage of the wake-word detection model, the server associated with the assistant system 140 may perform a keyword verification on the detected wake-word to verify whether the user intended to activate and receive assistance from the assistant system 140. In alternative embodiments, any of the processing, detection, or keyword verification may be performed by the rendering device 137 and/or the companion device 138. In particular embodiments, when the assistant system 140 has been activated by the user, an application on the rendering device 137 may be configured to receive user input from the user, and a companion application on the companion device 138 may be configured to handle user inputs (e.g., user requests) received by the application on the rendering device 137. In particular embodiments, the rendering device 137 and the companion device 138 may be associated with each other (i.e., paired) via one or more wireless communication protocols (e.g., Bluetooth).

The following example workflow illustrates how a rendering device 137 and a companion device 138 may handle a user input provided by a user. In this example, an application on the rendering device 137 may receive a user input comprising a user request directed to the rendering device 137. The application on the rendering device 137 may then determine a status of a wireless connection (i.e., tethering status) between the rendering device 137 and the companion device 138. If a wireless connection between the rendering device 137 and the companion device 138 is not available, the application on the rendering device 137 may communicate the user request (optionally including additional data and/or contextual information available to the rendering device 137) to the assistant system 140 via the network 110. The assistant system 140 may then generate a response to the user request and communicate the generated response back to the rendering device 137. The rendering device 137 may then present the response to the user in any suitable manner. Alternatively, if a wireless connection between the rendering device 137 and the companion device 138 is available, the application on the rendering device 137 may communicate the user request (optionally including additional data and/or contextual information available to the rendering device 137) to the companion application on the companion device 138 via the wireless connection. The companion application on the companion device 138 may then communicate the user request (optionally including additional data and/or contextual information available to the companion device 138) to the assistant system 140 via the network 110. The assistant system 140 may then generate a response to the user request and communicate the generated response back to the companion device 138. The companion application on the companion device 138 may then communicate the generated response to the application on the rendering device 137. The rendering device 137 may then present the response to the user in any suitable manner. In the preceding example workflow, the rendering device 137 and the companion device 138 may each perform one or more computations and/or processes at each respective step of the workflow. In particular embodiments, performance of the computations and/or processes disclosed herein may be adaptively switched between the rendering device 137 and the companion device 138 based at least in part on a device state of the rendering device 137 and/or the companion device 138, a task associated with the user input, and/or one or more additional factors. As an example and not by way of limitation, one factor may be signal strength of the wireless connection between the rendering device 137 and the companion device 138. For example, if the signal strength of the wireless connection between the rendering device 137 and the companion device 138 is strong, the computations and processes may be adaptively switched to be substantially performed by the companion device 138 in order to, for example, benefit from the greater processing power of the CPU of the companion device 138. Alternatively, if the signal strength of the wireless connection between the rendering device 137 and the companion device 138 is weak, the computations and processes may be adaptively switched to be substantially performed by the rendering device 137 in a standalone manner. In particular embodiments, if the client system 130 does not comprise a companion device 138, the aforementioned computations and processes may be performed solely by the rendering device 137 in a standalone manner.

In particular embodiments, an assistant system 140 may assist users with various assistant-related tasks. The assistant system 140 may interact with the social-networking system 160 and/or the third-party system 170 when executing these assistant-related tasks.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132 or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. As an example and not by way of limitation, each server 162 may be a web server, a news server, a mail server, a message server, an advertising server, a file server, an application server, an exchange server, a database server, a proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference ir module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a user input comprising a user request received from a client system 130. Authorization servers may be used to enforce one or more privacy settings of the users of the social-networking system 160. A privacy setting of a user may determine how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
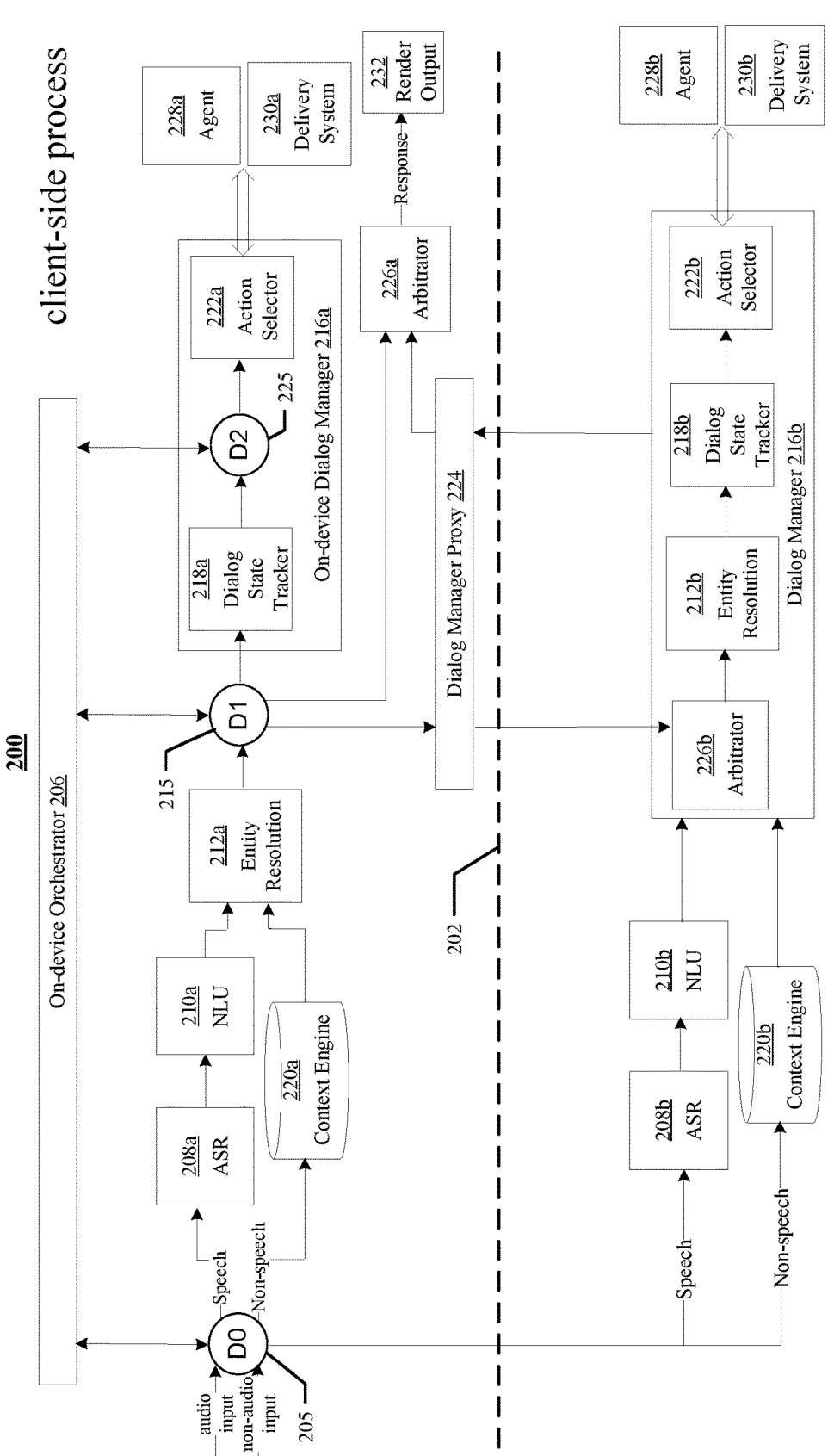
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with the assistant system 140 via user inputs of various modalities (e.g., audio, voice, text, vision, image, video, gesture, motion, activity, location, orientation) in stateful and multi-turn conversations to receive assistance from the assistant system 140. As an example and not by way of limitation, a user input may comprise an audio input based on the user's voice (e.g., a verbal command), which may be processed by a system audio API (application programming interface) on client system 130. The system audio API may perform techniques including echo cancellation, noise removal, beam forming, self-user voice activation, speaker identification, voice activity detection (VAD), and/or any other suitable acoustic technique in order to generate audio data that is readily processable by the assistant system 140. In particular embodiments, the assistant system 140 may support mono-modal inputs (e.g., only voice inputs), multi-modal inputs (e.g., voice inputs and text inputs), hybrid/multi-modal inputs, or any combination thereof. In particular embodiments, a user input may be a user-generated input that is sent to the assistant system 140 in a single turn. User inputs provided by a user may be associated with particular assistant-related tasks, and may include, for example, user requests (e.g., verbal requests for information or performance of an action), user interactions with the assistant application 136 associated with the assistant system 140 (e.g., selection of UI elements via touch or gesture), or any other type of suitable user input that may be detected and understood by the assistant system 140 (e.g., user movements detected by the client device 130 of the user).

In particular embodiments, the assistant system 140 may create and store a user profile comprising both personal and contextual information associated with the user. In particular embodiments, the assistant system 140 may analyze the user input using natural-language understanding (NLU) techniques. The analysis may be based at least in part on the user profile of the user for more personalized and context-aware understanding. The assistant system 140 may resolve entities associated with the user input based on the analysis. In particular embodiments, the assistant system 140 may inter-act with different agents to obtain information or services that are associated with the resolved entities. The assistant system 140 may generate a response for the user regarding the information or services by using natural-language gen-eration (NLG). Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodi-ments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist a user via an architecture built upon client-side pro-cesses and server-side processes which may operate in various operational modes. In FIG. 2, the client-side process is illustrated above the dashed line 202 whereas the server-side process is illustrated below the dashed line 202. A first operational mode (i.e., on-device mode) may be a workflow in which the assistant system 140 processes a user input and provides assistance to the user by primarily or exclusively performing client-side processes locally on the client system 130. For example, if the client system 130 is not connected to a network 110 (i.e., when client system 130 is offline), the assistant system 140 may handle a user input in the first operational mode utilizing only client-side processes. A second operational mode (i.e., cloud mode) may be a work-flow in which the assistant system 140 processes a user input and provides assistance to the user by primarily or exclu-sively performing server-side processes on one or more remote servers (e.g., a server associated with assistant sys-tem 140). As illustrated in FIG. 2, a third operational mode (i.e., blended mode) may be a parallel workflow in which the assistant system 140 processes a user input and provides assistance to the user by performing client-side processes locally on the client system 130 in conjunction with server-side processes on one or more remote servers (e.g., a server associated with assistant system 140). For example, the client system 130 and the server associated with assistant system 140 may both perform automatic speech recognition (ASR) and natural-language understanding (NLU) pro-cesses, but the client system 130 may delegate dialog, agent, and natural-language generation (NLG) processes to be performed by the server associated with assistant system 140.

In particular embodiments, selection of an operational mode may be based at least in part on a device state, a task associated with a user input, and/or one or more additional factors. As an example and not by way of limitation, as described above, one factor may be a network connectivity status for client system 130. For example, if the client system 130 is not connected to a network 110 (i.e., when client system 130 is offline), the assistant system 140 may handle a user input in the first operational mode (i.e., on-device mode). As another example and not by way of limitation, another factor may be based on a measure of available battery power (i.e., battery status) for the client system 130. For example, if there is a need for client system 130 to conserve battery power (e.g., when client system 130 has minimal available battery power or the user has indi-cated a desire to conserve the battery power of the client system 130), the assistant system 140 may handle a user input in the second operational mode (i.e., cloud mode) or the third operational mode (i.e., blended mode) in order to perform fewer power-intensive operations on the client system 130. As yet another example and not by way of limitation, another factor may be one or more privacy constraints (e.g., specified privacy settings, applicable pri-vacy policies). For example, if one or more privacy con-straints limits or precludes particular data from being trans-mitted to a remote server (e.g., a server associated with the assistant system 140), the assistant system 140 may handle a user input in the first operational mode (i.e., on-device mode) in order to protect user privacy. As yet another example and not by way of limitation, another factor may be desynchronized context data between the client system 130 and a remote server (e.g., the server associated with assistant system 140). For example, the client system 130 and the server associated with assistant system 140 may be deter-mined to have inconsistent, missing, and/or unreconciled context data, the assistant system 140 may handle a user input in the third operational mode (i.e., blended mode) to reduce the likelihood of an inadequate analysis associated with the user input. As yet another example and not by way of limitation, another factor may be a measure of latency for the connection between client system 130 and a remote server (e.g., the server associated with assistant system 140). For example, if a task associated with a user input may significantly benefit from and/or require prompt or imme-diate execution (e.g., photo capturing tasks), the assistant system 140 may handle the user input in the first operational mode (i.e., on-device mode) to ensure the task is performed in a timely manner. As yet another example and not by way of limitation, another factor may be, for a feature relevant to a task associated with a user input, whether the feature is only supported by a remote server (e.g., the server associated with assistant system 140). For example, if the relevant feature requires advanced technical functionality (e.g., high-powered processing capabilities, rapid update cycles) that is only supported by the server associated with assistant sys-tem 140 and is not supported by client system 130 at the time of the user input, the assistant system 140 may handle the user input in the second operational mode (i.e., cloud mode) or the third operational mode (i.e., blended mode) in order to benefit from the relevant feature.

In particular embodiments, an on-device orchestrator 206 on the client system 130 may coordinate receiving a user input and may determine, at one or more decision points in an example workflow, which of the operational modes described above should be used to process or continue processing the user input. As discussed above, selection of an operational mode may be based at least in part on a device state, a task associated with a user input, and/or one or more additional factors. As an example and not by way of limi-tation, with reference to the workflow architecture illustrated in FIG. 2, after a user input is received from a user, the on-device orchestrator 206 may determine, at decision point (DO) 205, whether to begin processing the user input in the first operational mode (i.e., on-device mode), the second operational mode (i.e., cloud mode), or the third operational mode (i.e., blended mode). For example, at decision point (DO) 205, the on-device orchestrator 206 may select the first operational mode (i.e., on-device mode) if the client system 130 is not connected to network 110 (i.e., when client system 130 is offline), if one or more privacy constraints expressly require on-device processing (e.g., adding or removing another person to a private call between users), or if the user input is associated with a task which does not require or benefit from server-side processing (e.g., setting an alarm or calling another user). As another example, at decision point (DO) 205, the on-device orchestrator 206 may select the second operational mode (i.e., cloud mode) or the third operational mode (i.e., blended mode) if the client system 130 has a need to conserve battery power (e.g., when client system 130 has minimal available battery power or the user has indicated a desire to conserve the battery power of the client system 130) or has a need to limit additional utilization of computing resources (e.g., when other processes operating on client device 130 require high CPU utilization (e.g., SMS messaging applications)).

In particular embodiments, if the on-device orchestrator 206 determines at decision point (DO) 205 that the user input should be processed using the first operational mode (i.e., on-device mode) or the third operational mode (i.e., blended mode), the client-side process may continue as illustrated in FIG. 2. As an example and not by way of limitation, if the user input comprises speech data, the speech data may be received at a local automatic speech recognition (ASR) module 208a on the client system 130. The ASR module 208a may allow a user to dictate and have speech transcribed as written text, have a document synthesized as an audio stream, or issue commands that are recognized as such by the system.

In particular embodiments, the output of the ASR module 208a may be sent to a local natural-language understanding (NLU) module 210a. The NLU module 210a may perform named entity resolution (NER), or named entity resolution may be performed by the entity resolution module 212a, as described below. In particular embodiments, one or more of an intent, a slot, or a domain may be an output of the NLU module 210a.

In particular embodiments, the user input may comprise non-speech data, which may be received at a local context engine 220a. As an example and not by way of limitation, the non-speech data may comprise locations, visuals, touch, gestures, world updates, social updates, contextual information, information related to people, activity data, and/or any other suitable type of non-speech data. The non-speech data may further comprise sensory data received by client system 130 sensors (e.g., microphone, camera), which may be accessed subject to privacy constraints and further analyzed by computer vision technologies. In particular embodiments, the computer vision technologies may comprise human reconstruction, face detection, facial recognition, hand tracking, eye tracking, and/or any other suitable computer vision technologies. In particular embodiments, the non-speech data may be subject to geometric constructions, which may comprise constructing objects surrounding a user using any suitable type of data collected by a client system 130. As an example and not by way of limitation, a user may be wearing AR glasses, and geometric constructions may be utilized to determine spatial locations of surfaces and items (e.g., a floor, a wall, a user's hands). In particular embodiments, the non-speech data may be inertial data captured by AR glasses or a VR headset, and which may be data associated with linear and angular motions (e.g., measurements associated with a user's body movements). In particular embodiments, the context engine 220a may determine various types of events and context based on the non-speech data.

In particular embodiments, the outputs of the NLU module 210a and/or the context engine 220a may be sent to an entity resolution module 212a. The entity resolution module 212a may resolve entities associated with one or more slots output by NLU module 210a. In particular embodiments, each resolved entity may be associated with one or more entity identifiers. As an example and not by way of limitation, an identifier may comprise a unique user identifier (ID) corresponding to a particular user (e.g., a unique username or user ID number for the social-networking system 160). In particular embodiments, each resolved entity may also be associated with a confidence score. More information on resolving entities may be found in U.S. Pat. No. 10,803,050, filed 27 Jul. 2018, and U.S. patent application Ser. No. 16/048,072, filed 27 Jul. 2018, each of which is incorporated by reference.

In particular embodiments, at decision point (DO) 205, the on-device orchestrator 206 may determine that a user input should be handled in the second operational mode (i.e., cloud mode) or the third operational mode (i.e., blended mode). In these operational modes, the user input may be handled by certain server-side modules in a similar manner as the client-side process described above.

In particular embodiments, if the user input comprises speech data, the speech data of the user input may be received at a remote automatic speech recognition (ASR) module 208b on a remote server (e.g., the server associated with assistant system 140). The ASR module 208b may allow a user to dictate and have speech transcribed as written text, have a document synthesized as an audio stream, or issue commands that are recognized as such by the system.

In particular embodiments, the output of the ASR module 208b may be sent to a remote natural-language understanding (NLU) module 210b. In particular embodiments, the NLU module 210b may perform named entity resolution (NER) or named entity resolution may be performed by entity resolution module 212b of dialog manager module 216b as described below. In particular embodiments, one or more of an intent, a slot, or a domain may be an output of the NLU module 210b.

In particular embodiments, the user input may comprise non-speech data, which may be received at a remote context engine 220b. In particular embodiments, the remote context engine 220b may determine various types of events and context based on the non-speech data. In particular embodiments, the output of the NLU module 210b and/or the context engine 220b may be sent to a remote dialog manager 216b.

In particular embodiments, as discussed above, an on-device orchestrator 206 on the client system 130 may coordinate receiving a user input and may determine, at one or more decision points in an example workflow, which of the operational modes described above should be used to process or continue processing the user input. As further discussed above, selection of an operational mode may be based at least in part on a device state, a task associated with a user input, and/or one or more additional factors. As an example and not by way of limitation, with continued reference to the workflow architecture illustrated in FIG. 2, after the entity resolution module 212a generates an output or a null output, the on-device orchestrator 206 may determine, at decision point (D1) 215, whether to continue processing the user input in the first operational mode (i.e., on-device mode), the second operational mode (i.e., cloud mode), or the third operational mode (i.e., blended mode). For example, at decision point (D1) 215, the on-device orchestrator 206 may select the first operational mode (i.e., on-device mode) if an identified intent is associated with a latency sensitive processing task (e.g., taking a photo, pausing a stopwatch). As another example and not by way of limitation, if a messaging task is not supported by on-device processing on the client system 130, the on-device orchestrator 206 may select the third operational mode (i.e., blended mode) to process the user input associated with a messaging request. As yet another example, at decision point (D1) 215, the on-device orchestrator 206 may select the second operational mode (i.e., cloud mode) or the third operational mode (i.e., blended mode) if the task being processed requires access to a social graph, a knowledge graph, or a concept graph not stored on the client system 130. Alternatively, the on-device orchestrator 206 may instead select the first operational mode (i.e., on-device mode) if a sufficient version of an informational graph including requisite information for the task exists on the client system 130 (e.g., a smaller and/or bootstrapped version of a knowledge graph).

In particular embodiments, if the on-device orchestrator 206 determines at decision point (D1) 215 that processing should continue using the first operational mode (i.e., on-device mode) or the third operational mode (i.e., blended mode), the client-side process may continue as illustrated in FIG. 2. As an example and not by way of limitation, the output from the entity resolution module 212a may be sent to an on-device dialog manager 216a. In particular embodiments, the on-device dialog manager 216a may comprise a dialog state tracker 218a and an action selector 222a. The on-device dialog manager 216a may have complex dialog logic and product-related business logic to manage the dialog state and flow of the conversation between the user and the assistant system 140. The on-device dialog manager 216a may include full functionality for end-to-end integration and multi-turn support (e.g., confirmation, disambiguation). The on-device dialog manager 216a may also be lightweight with respect to computing limitations and resources including memory, computation (CPU), and binary size constraints. The on-device dialog manager 216a may also be scalable to improve developer experience. In particular embodiments, the on-device dialog manager 216a may benefit the assistant system 140, for example, by providing offline support to alleviate network connectivity issues (e.g., unstable or unavailable network connections), by using client-side processes to prevent privacy-sensitive information from being transmitted off of client system 130, and by providing a stable user experience in high-latency sensitive scenarios.

In particular embodiments, the on-device dialog manager 216a may further conduct false trigger mitigation. Implementation of false trigger mitigation may detect and prevent false triggers from user inputs which would otherwise invoke the assistant system 140 (e.g., an unintended wake-word) and may further prevent the assistant system 140 from generating data records based on the false trigger that may be inaccurate and/or subject to privacy constraints. As an example and not by way of limitation, if a user is in a voice call, the user's conversation during the voice call may be considered private, and the false trigger mitigation may limit detection of wake-words to audio user inputs received locally by the user's client system 130. In particular embodiments, the on-device dialog manager 216a may implement false trigger mitigation based on a nonsense detector. If the nonsense detector determines with a high confidence that a received wake-word is not logically and/or contextually sensible at the point in time at which it was received from the user, the on-device dialog manager 216a may determine that the user did not intend to invoke the assistant system 140.

In particular embodiments, due to a limited computing power of the client system 130, the on-device dialog manager 216a may conduct on-device learning based on learning algorithms particularly tailored for client system 130. As an example and not by way of limitation, federated learning techniques may be implemented by the on-device dialog manager 216a. Federated learning is a specific category of distributed machine learning techniques which may train machine-learning models using decentralized data stored on end devices (e.g., mobile phones). In particular embodiments, the on-device dialog manager 216a may use federated user representation learning model to extend existing neural-network personalization techniques to implementation of federated learning by the on-device dialog manager 216a. Federated user representation learning may personalize federated learning models by learning task-specific user representations (i.e., embeddings) and/or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged by a remote server (e.g., the server associated with assistant system 140). Federated parameters, by contrast, may be trained remotely on the server. In particular embodiments, the on-device dialog manager 216a may use an active federated learning model, which may transmit a global model trained on the remote server to client systems 130 and calculate gradients locally on the client systems 130. Active federated learning may enable the on-device dialog manager 216a to minimize the transmission costs associated with downloading models and uploading gradients. For active federated learning, in each round, client systems 130 may be selected in a semi-random manner based at least in part on a probability conditioned on the current model and the data on the client systems 130 in order to optimize efficiency for training the federated learning model.

In particular embodiments, the dialog state tracker 218a may track state changes over time as a user interacts with the world and the assistant system 140 interacts with the user. As an example and not by way of limitation, the dialog state tracker 218a may track, for example, what the user is talking about, whom the user is with, where the user is, what tasks are currently in progress, and where the user's gaze is at subject to applicable privacy policies.

In particular embodiments, at decision point (D1) 215, the on-device orchestrator 206 may determine to forward the user input to the server for either the second operational mode (i.e., cloud mode) or the third operational mode (i.e., blended mode). As an example and not by way of limitation, if particular functionalities or processes (e.g., messaging) are not supported by on the client system 130, the on-device orchestrator 206 may determine at decision point (D1) 215 to use the third operational mode (i.e., blended mode). In particular embodiments, the on-device orchestrator 206 may cause the outputs from the NLU module 210a, the context engine 220a, and the entity resolution module 212a, via a dialog manager proxy 224, to be forwarded to an entity resolution module 212*b* of the remote dialog manager 216*b* to continue the processing. The dialog manager proxy 224 may be a communication channel for information/events exchange between the client system 130 and the server. In particular embodiments, the dialog manager 216*b* may additionally comprise a remote arbitrator 226*b*, a remote dialog state tracker 218*b*, and a remote action selector 222*b*. In particular embodiments, the assistant system 140 may have started processing a user input with the second operational mode (i.e., cloud mode) at decision point (DO) 205 and the on-device orchestrator 206 may determine to continue processing the user input based on the second operational mode (i.e., cloud mode) at decision point (D1) 215. Accordingly, the output from the NLU module 210*b* and the context engine 220*b* may be received at the remote entity resolution module 212*b*. The remote entity resolution module 212*b* may have similar functionality as the local entity resolution module 212*a*, which may comprise resolving entities associated with the slots. In particular embodiments, the entity resolution module 212*b* may access one or more of the social graph, the knowledge graph, or the concept graph when resolving the entities. The output from the entity resolution module 212*b* may be received at the arbitrator 226*b*.

In particular embodiments, the remote arbitrator 226*b* may be responsible for choosing between client-side and server-side upstream results (e.g., results from the NLU module 210*a/b*, results from the entity resolution module 212*a/b*, and results from the context engine 220*a/b*). The arbitrator 226*b* may send the selected upstream results to the remote dialog state tracker 218*b*. In particular embodiments, similarly to the local dialog state tracker 218*a*, the remote dialog state tracker 218*b* may convert the upstream results into candidate tasks using task specifications and resolve arguments with entity resolution.

In particular embodiments, at decision point (D2) 225, the on-device orchestrator 206 may determine whether to continue processing the user input based on the first operational mode (i.e., on-device mode) or forward the user input to the server for the third operational mode (i.e., blended mode). The decision may depend on, for example, whether the client-side process is able to resolve the task and slots successfully, whether there is a valid task policy with a specific feature support, and/or the context differences between the client-side process and the server-side process. In particular embodiments, decisions made at decision point (D2) 225 may be for multi-turn scenarios. In particular embodiments, there may be at least two possible scenarios. In a first scenario, the assistant system 140 may have started processing a user input in the first operational mode (i.e., on-device mode) using client-side dialog state. If at some point the assistant system 140 decides to switch to having the remote server process the user input, the assistant system 140 may create a programmatic/predefined task with the current task state and forward it to the remote server. For subsequent turns, the assistant system 140 may continue processing in the third operational mode (i.e., blended mode) using the server-side dialog state. In another scenario, the assistant system 140 may have started processing the user input in either the second operational mode (i.e., cloud mode) or the third operational mode (i.e., blended mode) and may substantially rely on server-side dialog state for all subsequent turns. If the on-device orchestrator 206 determines to continue processing the user input based on the first operational mode (i.e., on-device mode), the output from the dialog state tracker 218*a* may be received at the action selector 222*a*.

In particular embodiments, at decision point (D2) 225, the on-device orchestrator 206 may determine to forward the user input to the remote server and continue processing the user input in either the second operational mode (i.e., cloud mode) or the third operational mode (i.e., blended mode). The assistant system 140 may create a programmatic/predefined task with the current task state and forward it to the server, which may be received at the action selector 222*b*. In particular embodiments, the assistant system 140 may have started processing the user input in the second operational mode (i.e., cloud mode), and the on-device orchestrator 206 may determine to continue processing the user input in the second operational mode (i.e., cloud mode) at decision point (D2) 225. Accordingly, the output from the dialog state tracker 218*b* may be received at the action selector 222*b*.

In particular embodiments, the action selector 222*a/b* may perform interaction management. The action selector 222*a/b* may determine and trigger a set of general executable actions. The actions may be executed either on the client system 130 or at the remote server. As an example and not by way of limitation, these actions may include providing information or suggestions to the user. In particular embodiments, the actions may interact with agents 228*a/b*, users, and/or the assistant system 140 itself. These actions may comprise actions including one or more of a slot request, a confirmation, a disambiguation, or an agent execution. The actions may be independent of the underlying implementation of the action selector 222*a/b*. For more complicated scenarios such as, for example, multi-turn tasks or tasks with complex business logic, the local action selector 222*a* may call one or more local agents 228*a*, and the remote action selector 222*b* may call one or more remote agents 228*b* to execute the actions. Agents 228*a/b* may be invoked via task ID, and any actions may be routed to the correct agent 228*a/b* using that task ID. In particular embodiments, an agent 228*a/b* may be configured to serve as a broker across a plurality of content providers for one domain. A content provider may be an entity responsible for carrying out an action associated with an intent or completing a task associated with the intent. In particular embodiments, agents 228*a/b* may provide several functionalities for the assistant system 140 including, for example, native template generation, task specific business logic, and querying external APIs. When executing actions for a task, agents 228*a/b* may use context from the dialog state tracker 218*a/b*, and may also update the dialog state tracker 2.18*a/b*. In particular embodiments, agents 228*a/b* may also generate partial payloads from a dialog act.

In particular embodiments, the local agents 228*a* may have different implementations to be compiled/registered for different platforms (e.g., smart glasses versus a VR headset). In particular embodiments, multiple device-specific implementations (e.g., real-time calls for a client system 130 or a messaging application on the client system 130) may be handled internally by a single agent 228*a*. Alternatively, device-specific implementations may be handled by multiple agents 228*a* associated with multiple domains. As an example and not by way of limitation, calling an agent 228*a* on smart glasses may be implemented in a different manner than calling an agent 228*a* on a smart phone. Different platforms may also utilize varying numbers of agents 228*a*. The agents 228*a* may also be cross-platform (i.e., different operating systems on the client system 130). In addition, the agents 228*a* may have minimized startup time or binary size impact. Local agents 228*a* may be suitable for particular use cases. As an example and not by way of limitation, one use case may be emergency calling on the client system 130. As another example and not by way of limitation, another use case may be responding to a user input without network connectivity. As yet another example and not by way of limitation, another use case may be that particular domains/tasks may be privacy sensitive and may prohibit user inputs being sent to the remote server.

In particular embodiments, the local action selector 222a may call a local delivery system 230a for executing the actions, and the remote action selector 222b may call a remote delivery system 230b for executing the actions. The delivery system 230a/b may deliver a predefined event upon receiving triggering signals from the dialog state tracker 218a/b by executing corresponding actions. The delivery system 230a/b may ensure that events get delivered to a host with a living connection. As an example and not by way of limitation, the delivery system 230a/b may broadcast to all online devices that belong to one user. As another example and not by way of limitation, the delivery system 230a/b may deliver events to target-specific devices. The delivery system 230a/b may further render a payload using up-to-date device context.

In particular embodiments, the on-device dialog manager 216a may additionally comprise a separate local action execution module, and the remote dialog manager 216b may additionally comprise a separate remote action execution module. The local execution module and the remote action execution module may have similar functionality. In particular embodiments, the action execution module may call the agents 228a/b to execute tasks. The action execution module may additionally perform a set of general executable actions determined by the action selector 222a/b. The set of executable actions may interact with agents 228a/b, users, and the assistant system 140 itself via the delivery system 230a/b.

In particular embodiments, if the user input is handled using the first operational mode (i.e., on-device mode), results from the agents 228a and/or the delivery system 230a may be returned to the on-device dialog manager 216a. The on-device dialog manager 216a may then instruct a local arbitrator 226a to generate a final response based on these results. The arbitrator 226a may aggregate the results and evaluate them. As an example and not by way of limitation, the arbitrator 226a may rank and select a best result for responding to the user input. If the user request is handled in the second operational mode (i.e., cloud mode), the results from the agents 228b and/or the delivery system 230b may be returned to the remote dialog manager 216b. The remote dialog manager 216b may instruct, via the dialog manager proxy 224, the arbitrator 226a to generate the final response based on these results. Similarly, the arbitrator 226a may analyze the results and select the best result to provide to the user. If the user input is handled based on the third operational mode (i.e., blended mode), the client-side results and server-side results (e.g., from agents 228a/b and/or delivery system 230a/b) may both be provided to the arbitrator 226a by the on-device dialog manager 216a and remote dialog manager 216b, respectively. The arbitrator 226 may then choose between the client-side and server-side side results to determine the final result to be presented to the user. In particular embodiments, the logic to decide between these results may depend on the specific use-case.

In particular embodiments, the local arbitrator 226a may generate a response based on the final result and send it to a render output module 232. The render output module 232 may determine how to render the output in a way that is suitable for the client system 130. As an example and not by way of limitation, for a VR headset or AR smart glasses, the render output module 232 may determine to render the output using a visual-based modality (e.g., an image or a video clip) that may be displayed via the VR headset or AR smart glasses. As another example, the response may be rendered as audio signals that may be played by the user via a VR headset or AR smart glasses. As yet another example, the response may be rendered as augmented-reality data for enhancing user experience.

In particular embodiments, in addition to determining an operational mode to process the user input, the on-device orchestrator 206 may also determine whether to process the user input on the rendering device 137, process the user input on the companion device 138, or process the user request on the remote server. The rendering device 137 and/or the companion device 138 may each use the assistant stack in a similar manner as disclosed above to process the user input. As an example and not by, the on-device orchestrator 206 may determine that part of the processing should be done on the rendering device 137, part of the processing should be done on the companion device 138, and the remaining processing should be done on the remote server.

In particular embodiments, the assistant system 140 may have a variety of capabilities including audio cognition, visual cognition, signals intelligence, reasoning, and memories. In particular embodiments, the capability of audio cognition may enable the assistant system 140 to, for example, understand a user's input associated with various domains in different languages, understand and summarize a conversation, perform on-device audio cognition for complex commands, identify a user by voice, extract topics from a conversation and auto-tag sections of the conversation, enable audio interaction without a wake-word, filter and amplify user voice from ambient noise and conversations, and/or understand which client system 130 a user is talking to if multiple client systems 130 are in vicinity.

In particular embodiments, the capability of visual cognition may enable the assistant system 140 to, for example, perform face detection and tracking, recognize a user, recognize people of interest in major metropolitan areas at varying angles, recognize interesting objects in the world through a combination of existing machine-learning models and one-shot learning, recognize an interesting moment and auto-capture it, achieve semantic understanding over multiple visual frames across different episodes of time, provide platform support for additional capabilities in people, places, or objects recognition, recognize a full set of settings and micro-locations including personalized locations, recognize complex activities, recognize complex gestures to control a client system 130, handle images/videos from egocentric cameras (e.g., with motion, capture angles, resolution), accomplish similar levels of accuracy and speed regarding images with lower resolution, conduct one-shot registration and recognition of people, places, and objects, and/or perform visual recognition on a client system 130.

In particular embodiments, the assistant system 140 may leverage computer vision techniques to achieve visual cognition. Besides computer vision techniques, the assistant system 140 may explore options that may supplement these techniques to scale up the recognition of objects. In particular embodiments, the assistant system 140 may use supplemental signals such as, for example, optical character recognition (OCR) of an object's labels, GPS signals for places recognition, and/or signals from a user's client system 130 to identify the user. In particular embodiments, the assistant system 140 may perform general scene recognition (e.g., home, work, public spaces) to set a context for the user and reduce the computer-vision search space to identify likely objects or people. In particular embodiments, the assistant system 140 may guide users to train the assistant system 140. For example, crowdsourcing may be used to get users to tag objects and help the assistant system 140 recognize more objects over time. As another example, users may register their personal objects as part of an initial setup when using the assistant system 140. The assistant system 140 may further allow users to provide positive/negative signals for objects they interact with to train and improve personalized models for them.

In particular embodiments, the capability of signals intelligence may enable the assistant system 140 to, for example, determine user location, understand date/time, determine family locations, understand users' calendars and future desired locations, integrate richer sound understanding to identify setting/context through sound alone, and/or build signals intelligence models at runtime which may be personalized to a user's individual routines.

In particular embodiments, the capability of reasoning may enable the assistant system 140 to, for example, pick up previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, and/or understand the changes in a scene and how that may impact the user's desired content.

In particular embodiments, the capabilities of memories may enable the assistant system 140 to, for example, remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and/or write to memory in structured form to form rich short, episodic and long-term memories.

Figure 3:
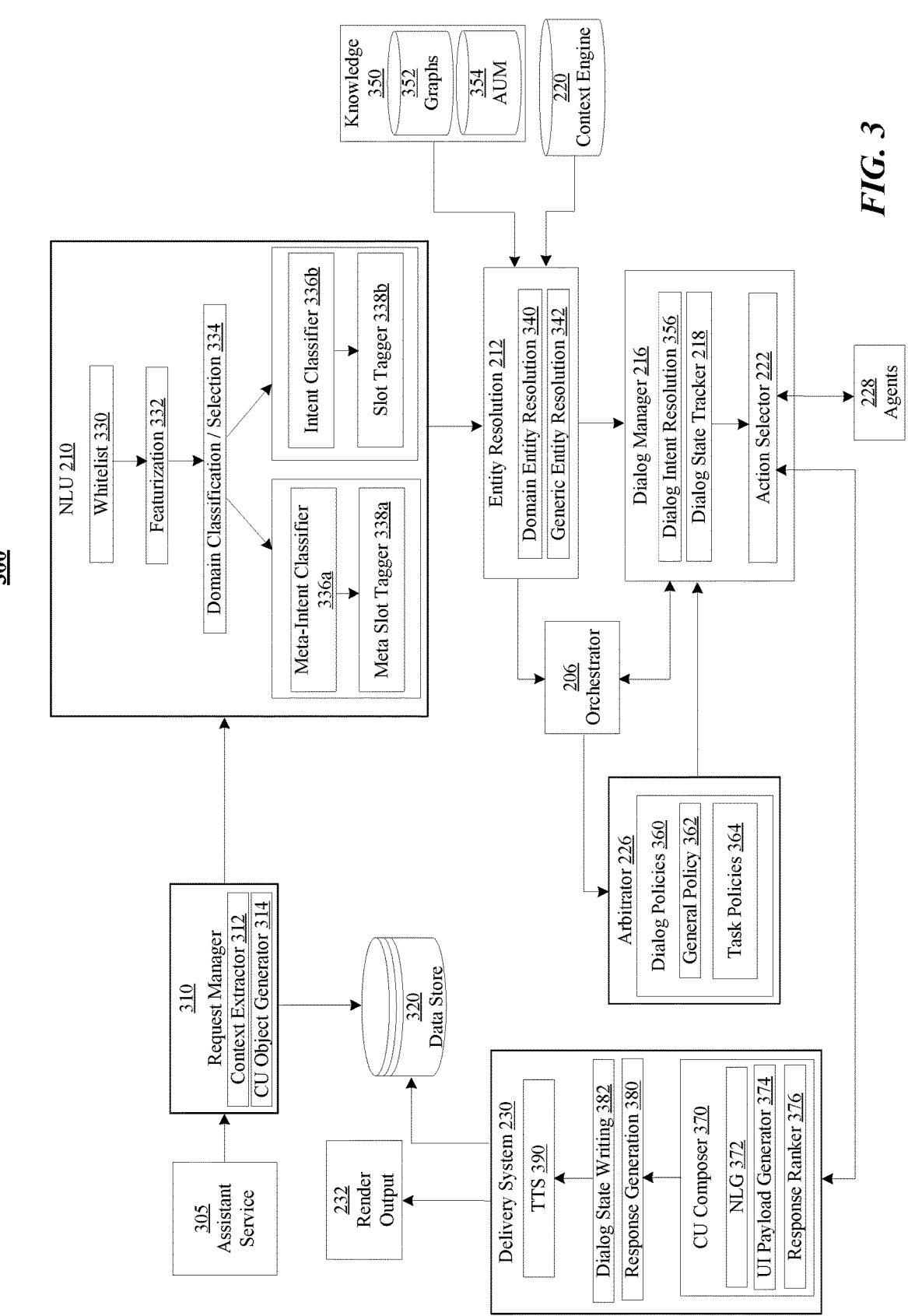
FIG. 3 illustrates an example flow diagram of server-side processes of the assistant system.

FIG. 3 illustrates an example flow diagram 300 of the assistant system 140. In particular embodiments, an assistant service module 305 may access a request manager 310 upon receiving a user input. In particular embodiments, the request manager 310 may comprise a context extractor 312 and a conversational understanding object generator (CU object generator) 314. The context extractor 312 may extract contextual information associated with the user input. The context extractor 312 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 314 may generate particular CU objects relevant to the user input. The CU objects may comprise dialog-session data and features associated with the user input, which may be shared with all the modules of the assistant system 140. In particular embodiments, the request manager 310 may store the contextual information and the generated CU objects in a data store 320 which is a particular data store implemented in the assistant system 140.

In particular embodiments, the request manger 310 may send the generated CU objects to the NLU module 210. The NLU module 210 may perform a plurality of steps to process the CU objects. The NLU module 210 may first run the CU objects through an allowlist/blocklist 330. In particular embodiments, the allowlist/blocklist 330 may comprise interpretation data matching the user input. The NLU module 210 may then perform a featurization 332 of the CU objects. The NLU module 210 may then perform domain classification/selection 334 on user input based on the features resulted from the featurization 332 to classify the user input into predefined domains. In particular embodiments, a domain may denote a social context of interaction (e.g., education), or a namespace for a set of intents (e.g., music). The domain classification/selection results may be further processed based on two related procedures. In one procedure, the NLU module 210 may process the domain classification/selection results using a meta-intent classifier 336a. The meta-intent classifier 336a may determine categories that describe the user's intent. An intent may be an element in a pre-defined taxonomy of semantic intentions, which may indicate a purpose of a user interaction with the assistant system 140. The NLU module 210a may classify a user input into a member of the pre-defined taxonomy. For example, the user input may be "Play Beethoven's 5th," and the NLU module 210a may classify the input as having the intent [IN:play_music]. In particular embodiments, intents that are common to multiple domains may be processed by the meta-intent classifier 336a. As an example and not by way of limitation, the meta-intent classifier 336a may be based on a machine-learning model that may take the domain classification/selection results as input and calculate a probability of the input being associated with a particular predefined meta-intent. The NLU module 210 may then use a meta slot tagger 338a to annotate one or more meta slots for the classification result from the meta-intent classifier 336a. A slot may be a named sub-string corresponding to a character string within the user input representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the meta slot tagger 338a may tag generic slots such as references to items (e.g., the first), the type of slot, the value of the slot, etc. In particular embodiments, the NLU module 210 may process the domain classification/selection results using an intent classifier 336b. The intent classifier 336b may determine the user's intent associated with the user input. In particular embodiments, there may be one intent classifier 336b for each domain to determine the most possible intents in a given domain. As an example and not by way of limitation, the intent classifier 336b may be based on a machine-learning model that may take the domain classification/selection results as input and calculate a probability of the input being associated with a particular predefined intent. The NLU module 210 may then use a slot tagger 338b to annotate one or more slots associated with the user input. In particular embodiments, the slot tagger 338b may annotate the one or more slots for the n-grams of the user input. As an example and not by way of limitation, a user input may comprise "change 500 dollars in my account to Japanese yen." The intent classifier 336b may take the user input as input and formulate it into a vector. The intent classifier 336b may then calculate probabilities of the user input being associated with different predefined intents based on a vector comparison between the vector representing the user input and the vectors representing different predefined intents. In a similar manner, the slot tagger 338*b* may take the user input as input and formulate each word into a vector. The slot tagger 338*b* may then calculate probabilities of each word being asso-ciated with different predefined slots based on a vector comparison between the vector representing the word and the vectors representing different predefined slots. The intent of the user may be classified as "changing money". The slots of the user input may comprise "500", "dollars", "account", and "Japanese yen" The meta-intent of the user may be classified as "financial service". The meta slot may comprise "finance".

In particular embodiments, the natural-language under-standing (NLU) module 210 may additionally extract infor-mation from one or more of a social graph, a knowledge graph, or a concept graph, and may retrieve a user's profile stored locally on the client system 130. The NLU module 210 may additionally consider contextual information when analyzing the user input. The NLU module 210 may further process information from these different sources by identi-fying and aggregating information, annotating n-grams of the user input, ranking the n-grams with confidence scores based on the aggregated information, and formulating the ranked n-grams into features that may be used by the NLU module 210 for understanding the user input. In particular embodiments, the NLU module 210 may identify one or more of a domain, an intent, or a slot from the user input in a personalized and context-aware manner. As an example and not by way of limitation, a user input may comprise "show me how to get to the coffee shop." The NLU module 210 may identify a particular coffee shop that the user wants to go to based on the user's personal information and the associated contextual information. In particular embodi-ments, the NLU module 210 may comprise a lexicon of a particular language, a parser, and grammar rules to partition sentences into an internal representation. The NLU module 210 may also comprise one or more programs that perform naive semantics or stochastic semantic analysis, and may further use pragmatics to understand a user input. In par-ticular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding (NLU) may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by refer-ence.

In particular embodiments, the output of the NLU module 210 may be sent to the entity resolution module 212 to resolve relevant entities. Entities may include, for example, unique users or concepts, each of which may have a unique identifier (ID). The entities may include one or more of a real-world entity (from general knowledge base), a user entity (from user memory), a contextual entity (device context/dialog context), or a value resolution (numbers, datetime, etc.). In particular embodiments, the entity reso-lution module 212 may comprise domain entity resolution 340 and generic entity resolution 342. The entity resolution module 212 may execute generic and domain-specific entity resolution. The generic entity resolution 342 may resolve the entities by categorizing the slots and meta slots into different generic topics. The domain entity resolution 340 may resolve the entities by categorizing the slots and meta slots into different domains. As an example and not by way of limitation, in response to the input of an inquiry of the advantages of a particular brand of electric car, the generic entity resolution 342 may resolve the referenced brand of electric car as vehicle and the domain entity resolution 340 may resolve the referenced brand of electric car as electric car.

In particular embodiments, entities maybe resolved based on knowledge 350 about the world and the user. The assistant system 140 may extract ontology data from the graphs 352. As an example and not by way of limitation, the graphs 352 may comprise one or more of a knowledge graph, a social graph, or a concept graph. The ontology data may comprise the structural relationship between different slots/meta-slots and domains. The ontology data may also comprise information of how the slots/meta-slots may be grouped, related within a hierarchy where the higher level comprises the domain, and subdivided according to simi-larities and differences. For example, the knowledge graph may comprise a plurality of entities. Each entity may com-prise a single record associated with one or more attribute values. The particular record may be associated with a unique entity identifier. Each record may have diverse values for an attribute of the entity. Each attribute value may be associated with a confidence probability and/or a seman-tic weight. A confidence probability for an attribute value represents a probability that the value is accurate for the given attribute. A semantic weight for an attribute value may represent how the value semantically appropriate for the given attribute considering all the available information. For example, the knowledge graph may comprise an entity of a book titled "BookName", which may include information extracted from multiple content sources (e.g., an online social network, online encyclopedias, book review sources, media databases, and entertainment content sources), which may be deduped, resolved, and fused to generate the single unique record for the knowledge graph. In this example, the entity titled "BookName" may be associated with a "fan-tasy" attribute value for a "genre" entity attribute. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the assistant user memory (AUM) 354 may comprise user episodic memories which help determine how to assist a user more effectively. The AUM 354 may be the central place for storing, retrieving, indexing, and searching over user data. As an example and not by way of limitation, the AUM 354 may store informa-tion such as contacts, photos, reminders, etc. Additionally, the AUM 354 may automatically synchronize data to the server and other devices (only for non-sensitive data). As an example and not by way of limitation, if the user sets a nickname for a contact on one device, all devices may synchronize and get that nickname based on the AUM 354. In particular embodiments, the AUM 354 may first prepare events, user sate, reminder, and trigger state for storing in a data store. Memory node identifiers (ID) may be created to store entry objects in the AUM 354, where an entry may be some piece of information about the user (e.g., photo, reminder, etc.) As an example and not by way of limitation, the first few bits of the memory node ID may indicate that this is a memory node ID type, the next bits may be the user ID, and the next bits may be the time of creation. The AUM 354 may then index these data for retrieval as needed. Index ID may be created for such purpose. In particular embodiments, given an "index key" (e.g., PHOTO_LOCATION) and "index value" (e.g., "San Francisco"), the AUM 354 may get a list of memory IDs that have that attribute (e.g., photos in San Francisco). As an example and not by way of limitation, the first few bits may indicate this is an index ID type, the next bits may be the user ID, and the next bits may encode an "index key" and "index value". The AUM 354 may further conduct information retrieval with a flexible query language. Relation index ID may be created for such purpose. In particular embodiments, given a source memory node and an edge type, the AUM 354 may get memory IDs of all target nodes with that type of outgoing edge from the source. As an example and not by way of limitation, the first few bits may indicate this is a relation index ID type, the next bits may be the user ID, and the next bits may be a source node ID and edge type. In particular embodiments, the AUM 354 may help detect concurrent updates of different events. More information on episodic memories may be found in U.S. patent application Ser. No. 16/552,559, filed 27 Aug. 2019, which is incorporated by reference.

In particular embodiments, the entity resolution module 212 may use different techniques to resolve different types of entities. For real-world entities, the entity resolution module 212 may use a knowledge graph to resolve the span to the entities, such as "music track", "movie", etc. For user entities, the entity resolution module 212 may use user memory or some agents to resolve the span to user-specific entities, such as "contact", "reminders", or "relationship". For contextual entities, the entity resolution module 212 may perform coreference based on information from the context engine 220 to resolve the references to entities in the context, such as "him", "her", "the first one", or "the last one". In particular embodiments, for coreference, the entity resolution module 212 may create references for entities determined by the NLU module 210. The entity resolution module 212 may then resolve these references accurately. As an example and not by way of limitation, a user input may comprise "find me the nearest grocery store and direct me there". Based on coreference, the entity resolution module 212 may interpret "there" as "the nearest grocery store". In particular embodiments, coreference may depend on the information from the context engine 220 and the dialog manager 216 so as to interpret references with improved accuracy. In particular embodiments, the entity resolution module 212 may additionally resolve an entity under the context (device context or dialog context), such as, for example, the entity shown on the screen or an entity from the last conversation history. For value resolutions, the entity resolution module 212 may resolve the mention to exact value in standardized form, such as numerical value, date time, address, etc.

In particular embodiments, the entity resolution module 212 may first perform a check on applicable privacy constraints in order to guarantee that performing entity resolution does not violate any applicable privacy policies. As an example and not by way of limitation, an entity to be resolved may be another user who specifies in their privacy settings that their identity should not be searchable on the online social network. In this case, the entity resolution module 212 may refrain from returning that user's entity identifier in response to a user input. By utilizing the described information obtained from the social graph, the knowledge graph, the concept graph, and the user profile, and by complying with any applicable privacy policies, the entity resolution module 212 may resolve entities associated with a user input in a personalized, context-aware, and privacy-protected manner.

In particular embodiments, the entity resolution module 212 may work with the ASR module 208 to perform entity resolution. The following example illustrates how the entity resolution module 212 may resolve an entity name. The entity resolution module 212 may first expand names associated with a user into their respective normalized text forms as phonetic consonant representations which may be phonetically transcribed using a double metaphone algorithm. The entity resolution module 212 may then determine an n-best set of candidate transcriptions and perform a parallel comprehension process on all of the phonetic transcriptions in the n-best set of candidate transcriptions. In particular embodiments, each transcription that resolves to the same intent may then be collapsed into a single intent. Each intent may then be assigned a score corresponding to the highest scoring candidate transcription for that intent. During the collapse, the entity resolution module 212 may identify various possible text transcriptions associated with each slot, correlated by boundary timing offsets associated with the slot's transcription. The entity resolution module 212 may then extract a subset of possible candidate transcriptions for each slot from a plurality (e.g., 1000) of candidate transcriptions, regardless of whether they are classified to the same intent. In this manner, the slots and intents may be scored lists of phrases. In particular embodiments, a new or running task capable of handling the intent may be identified and provided with the intent (e.g., a message composition task for an intent to send a message to another user). The identified task may then trigger the entity resolution module 212 by providing it with the scored lists of phrases associated with one of its slots and the categories against which it should be resolved. As an example and not by way of limitation, if an entity attribute is specified as "friend," the entity resolution module 212 may run every candidate list of terms through the same expansion that may be run at matcher compilation time. Each candidate expansion of the terms may be matched in the precompiled trie matching structure. Matches may be scored using a function based at least in part on the transcribed input, matched form, and friend name. As another example and not by way of limitation, if an entity attribute is specified as "celebrity/notable person," the entity resolution module 212 may perform parallel searches against the knowledge graph for each candidate set of terms for the slot output from the ASR module 208. The entity resolution module 212 may score matches based on matched person popularity and ASR-provided score signal. In particular embodiments, when the memory category is specified, the entity resolution module 212 may perform the same search against user memory. The entity resolution module 212 may crawl backward through user memory and attempt to match each memory (e.g., person recently mentioned in conversation, or seen and recognized via visual signals, etc.). For each entity, the entity resolution module 212 may employ matching similarly to how friends are matched (i.e., phonetic). In particular embodiments, scoring may comprise a temporal decay factor associated with a recency with which the name was previously mentioned. The entity resolution module 212 may further combine, sort, and dedupe all matches. In particular embodiments, the task may receive the set of candidates. When multiple high scoring candidates are present, the entity resolution module 212 may perform user-facilitated disambiguation (e.g., getting real-time user feedback from users on these candidates).

In particular embodiments, the context engine 220 may help the entity resolution module 212 improve entity resolution. The context engine 220 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the context engine 220 as part of the user profile. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference. In particular embodiments, the online inference service may analyze the conversational data associated with the user that are received by the assistant system 140 at a current time. The analysis result may be stored in the context engine 220 also as part of the user profile. In particular embodiments, both the offline aggregators and online inference service may extract personalization features from the plurality of data. The extracted personalization features may be used by other modules of the assistant system 140 to better understand user input. In particular embodiments, the entity resolution module 212 may process the information from the context engine 220 (e.g., a user profile) in the following steps based on natural-language processing (NLP). In particular embodiments, the entity resolution module 212 may tokenize text by text normalization, extract syntax features from text, and extract semantic features from text based on NLP. The entity resolution module 212 may additionally extract features from contextual information, which is accessed from dialog history between a user and the assistant system 140. The entity resolution module 212 may further conduct global word embedding, domain-specific embedding, and/or dynamic embedding based on the contextual information. The processing result may be annotated with entities by an entity tagger. Based on the annotations, the entity resolution module 212 may generate dictionaries. In particular embodiments, the dictionaries may comprise global dictionary features which can be updated dynamically offline. The entity resolution module 212 may rank the entities tagged by the entity tagger. In particular embodiments, the entity resolution module 212 may communicate with different graphs 352 including one or more of the social graph, the knowledge graph, or the concept graph to extract ontology data that is relevant to the retrieved information from the context engine 220. In particular embodiments, the entity resolution module 212 may further resolve entities based on the user profile, the ranked entities, and the information from the graphs 352.

In particular embodiments, the entity resolution module 212 may be driven by the task (corresponding to an agent 228). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution module 212 may resolve "John" against everything. As another example and not by way of limitation, for the utterance "send a message to John", the entity resolution module 212 may easily determine "John" refers to a person that one can message. As a result, the entity resolution module 212 may bias the resolution to a friend. As another example and not by way of limitation, for the utterance "what is John's most famous album?" To resolve "John", the entity resolution module 212 may first determine the task corresponding to the utterance, which is finding a music album. The entity resolution module 212 may determine that entities related to music albums include singers, producers, and recording studios. Therefore, the entity resolution module 212 may search among these types of entities in a music domain to resolve "John."

In particular embodiments, the output of the entity resolution module 212 may be sent to the dialog manager 216 to advance the flow of the conversation with the user. The dialog manager 216 may be an asynchronous state machine that repeatedly updates the state and selects actions based on the new state. The dialog manager 216 may additionally store previous conversations between the user and the assistant system 140. In particular embodiments, the dialog manager 216 may conduct dialog optimization. Dialog optimization relates to the challenge of understanding and identifying the most likely branching options in a dialog with a user. As an example and not by way of limitation, the assistant system 140 may implement dialog optimization techniques to obviate the need to confirm who a user wants to call because the assistant system 140 may determine a high confidence that a person inferred based on context and available data is the intended recipient. In particular embodiments, the dialog manager 216 may implement reinforcement learning frameworks to improve the dialog optimization. The dialog manager 216 may comprise dialog intent resolution 356, the dialog state tracker 218, and the action selector 222. In particular embodiments, the dialog manager 216 may execute the selected actions and then call the dialog state tracker 218 again until the action selected requires a user response, or there are no more actions to execute. Each action selected may depend on the execution result from previous actions. In particular embodiments, the dialog intent resolution 356 may resolve the user intent associated with the current dialog session based on dialog history between the user and the assistant system 140. The dialog intent resolution 356 may map intents determined by the NLU module 210 to different dialog intents. The dialog intent resolution 356 may further rank dialog intents based on signals from the NLU module 210, the entity resolution module 212, and dialog history between the user and the assistant system 140.

In particular embodiments, the dialog state tracker 218 may use a set of operators to track the dialog state. The operators may comprise necessary data and logic to update the dialog state. Each operator may act as delta of the dialog state after processing an incoming user input. In particular embodiments, the dialog state tracker 218 may a comprise a task tracker, which may be based on task specifications and different rules. The dialog state tracker 218 may also comprise a slot tracker and coreference component, which may be rule based and/or recency based. The coreference component may help the entity resolution module 212 to resolve entities. In alternative embodiments, with the coreference component, the dialog state tracker 218 may replace the entity resolution module 212 and may resolve any references/mentions and keep track of the state. In particular embodiments, the dialog state tracker 218 may convert the upstream results into candidate tasks using task specifications and resolve arguments with entity resolution. Both user state (e.g., user's current activity) and task state (e.g., triggering conditions) may be tracked. Given the current state, the dialog state tracker 218 may generate candidate tasks the assistant system 140 may process and perform for the user. As an example and not by way of limitation, candidate tasks may include "show suggestion," "get weather information," or "take photo." In particular embodiments, the dialog state tracker 218 may generate candidate tasks based on available data from, for example, a knowledge graph, a user memory, and a user task history. In particular embodiments, the dialog state tracker 218 may then resolve the triggers object using the resolved arguments. As an example and not by way of limitation, a user input "remind me to call mom when she's online and I'm home tonight" may perform the following conversion from the NLU output to the triggers representation by the dialog state tracker 218:

a side-effect free component and generate n-best candidates of dialog state update operators that propose updates to the dialog state. The dialog state tracker 218 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 218 may update/rank the dialog state of the current

| NLU Ontology Representation: | ➡ Triggers Representation: |
|---|---|
| [IN:CREATE_SMART_REMINDER<br>Remind me to<br>  [SL:TODO call mom] when<br>  [SL:TRIGGER CONJUNCTION<br>    [IN:GET_TRIGGER<br>      [SL:TRIGGER SOCIAL_UPDATE<br>      she's online] and I'm<br>      [SL:TRIGGER_LOCATION home]<br>      [SL:DATE TIME tonight]<br>    ]<br>  ]<br>] | Triggers: {<br>  and Triggers: [<br>    condition: {ContextualEvent(mom is<br>    online)},<br>    condition: (ContextualEvent(location<br>    is home)},<br><br>    condition: {ContextualEvent(time is<br>    tonight)}]))]} |

In the above example, "mom," "home," and "tonight" are represented by their respective entities: personEntity, locationEntity, datetimeEntity.

In particular embodiments, the dialog manager 216 may map events determined by the context engine 220 to actions. As an example and not by way of limitation, an action may be a natural-language generation (NLG) action, a display or overlay, a device action, or a retrieval action. The dialog manager 216 may also perform context tracking and interaction management. Context tracking may comprise aggregating real-time stream of events into a unified user state. Interaction management may comprise selecting optimal action in each state. In particular embodiments, the dialog state tracker 218 may perform context tracking (i.e., tracking events related to the user). To support processing of event streams, the dialog state tracker 218a may use an event handler (e.g., for disambiguation, confirmation, request.) that may consume various types of events and update an internal assistant state. Each event type may have one or more handlers. Each event handler may be modifying a certain slice of the assistant state. In particular embodiments, the event handlers may be operating on disjoint subsets of the state (i.e., only one handler may have write-access to a particular field in the state). In particular embodiments, all event handlers may have an opportunity to process a given event. As an example and not by way of limitation, the dialog state tracker 218 may run all event handlers in parallel on every event, and then may merge the state updates proposed by each event handler (e.g., for each event, most handlers may return a NULL update).

In particular embodiments, the dialog state tracker 218 may work as any programmatic handler (logic) that requires versioning. In particular embodiments, instead of directly altering the dialog state, the dialog state tracker 218 may be dialog session. As an example and not by way of limitation, the dialog state tracker 218 may update the dialog state as "completed" if the dialog session is over. As another example and not by way of limitation, the dialog state tracker 218 may rank the dialog state based on a priority associated with it.

In particular embodiments, the dialog state tracker 218 may communicate with the action selector 222 about the dialog intents and associated content objects. In particular embodiments, the action selector 222 may rank different dialog hypotheses for different dialog intents. The action selector 222 may take candidate operators of dialog state and consult the dialog policies 360 to decide what actions should be executed. In particular embodiments, a dialog policy 360 may a tree-based policy, which is a pre-constructed dialog plan. Based on the current dialog state, a dialog policy 360 may choose a node to execute and generate the corresponding actions. As an example and not by way of limitation, the tree-based policy may comprise topic grouping nodes and dialog action (leaf) nodes. In particular embodiments, a dialog policy 360 may also comprise a data structure that describes an execution plan of an action by an agent 228. A dialog policy 360 may further comprise multiple goals related to each other through logical operators. In particular embodiments, a goal may be an outcome of a portion of the dialog policy and it may be constructed by the dialog manager 216. A goal may be represented by an identifier (e.g., string) with one or more named arguments, which parameterize the goal. As an example and not by way of limitation, a goal with its associated goal argument may be represented as {confirm_artist, args:{artist: "Madonna" } }. In particular embodiments, goals may be mapped to leaves of the tree of the tree-structured representation of the dialog policy 360.

In particular embodiments, the assistant system 140 may use hierarchical dialog policies 360 with general policy 362 handling the cross-domain business logic and task policies 364 handling the task/domain specific logic. The general policy 362 may be used for actions that are not specific to individual tasks. The general policy 362 may be used to determine task stacking and switching, proactive tasks, notifications, etc. The general policy 362 may comprise handling low-confidence intents, internal errors, unacceptable user response with retries, and/or skipping or inserting confirmation based on ASR or NLU confidence scores. The general policy 362 may also comprise the logic of ranking dialog state update candidates from the dialog state tracker 218 output and pick the one to update (such as picking the top ranked task intent). In particular embodiments, the assistant system 140 may have a particular interface for the general policy 362, which allows for consolidating scattered cross-domain policy/business-rules, especial those found in the dialog state tracker 218, into a function of the action selector 222. The interface for the general policy 362 may also allow for authoring of self-contained sub-policy units that may be tied to specific situations or clients (e.g., policy functions that may be easily switched on or off based on clients, situation). The interface for the general policy 362 may also allow for providing a layering of policies with back-off, i.e., multiple policy units, with highly specialized policy units that deal with specific situations being backed up by more general policies 362 that apply in wider circumstances. In this context the general policy 362 may alternatively comprise intent or task specific policy.

In particular embodiments, a task policy 364 may comprise the logic for action selector 222 based on the task and current state. The task policy 364 may be dynamic and ad-hoc. In particular embodiments, the types of task policies 364 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 364 with machine-learning models. In particular embodiments, the general policy 362 may pick one operator from the candidate operators to update the dialog state, followed by the selection of a user facing action by a task policy 364. Once a task is active in the dialog state, the corresponding task policy 364 may be consulted to select right actions.

In particular embodiments, the action selector 222 may select an action based on one or more of the event determined by the context engine 220, the dialog intent and state, the associated content objects, and the guidance from dialog policies 360. Each dialog policy 360 may be subscribed to specific conditions over the fields of the state. After an event is processed and the state is updated, the action selector 222 may run a fast search algorithm (e.g., similarly to Boolean satisfiability) to identify which policies should be triggered based on the current state. In particular embodiments, if multiple policies are triggered, the action selector 222 may use a tie-breaking mechanism to pick a particular policy. Alternatively, the action selector 222 may use a more sophisticated approach which may dry-run each policy and then pick a particular policy which may be determined to have a high likelihood of success. In particular embodiments, mapping events to actions may result in several technical advantages for the assistant system 140. One technical advantage may include that each event may be a state update from the user or the user's physical/digital environment, which may or may not trigger an action from assistant system 140. Another technical advantage may include possibilities to handle rapid bursts of events (e.g., user enters a new building and sees many people) by first consuming all events to update state, and then triggering action(s) from the final state. Another technical advantage may include consuming all events into a single global assistant state.

In particular embodiments, the action selector 222 may take the dialog state update operators as part of the input to select the dialog action. The execution of the dialog action may generate a set of expectations to instruct the dialog state tracker 218 to handle future turns. In particular embodiments, an expectation may be used to provide context to the dialog state tracker 218 when handling the user input from next turn. As an example and not by way of limitation, slot request dialog action may have the expectation of proving a value for the requested slot. In particular embodiments, both the dialog state tracker 218 and the action selector 222 may not change the dialog state until the selected action is executed. This may allow the assistant system 140 to execute the dialog state tracker 218 and the action selector 222 for processing speculative ASR results and to do n-best ranking with dry runs.

In particular embodiments, the action selector 222 may call different agents 228 for task execution. Meanwhile, the dialog manager 216 may receive an instruction to update the dialog state. As an example and not by way of limitation, the update may comprise awaiting agents' 228 response. An agent 228 may select among registered content providers to complete the action. The data structure may be constructed by the dialog manager 216 based on an intent and one or more slots associated with the intent. In particular embodiments, the agents 228 may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, and/or work. In particular embodiments, the assistant system 140 may use a plurality of agents 228 collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, the dialog manager 216 may support multi-turn compositional resolution of slot mentions. For a compositional parse from the NLU module 210, the resolver may recursively resolve the nested slots. The dialog manager 216 may additionally support disambiguation for the nested slots. As an example and not by way of limitation, the user input may be "remind me to call Alex". The resolver may need to know which Alex to call before creating an actionable reminder to-do entity. The resolver may halt the resolution and set the resolution state when further user clarification is necessary for a particular slot. The general policy 362 may examine the resolution state and create corresponding dialog action for user clarification. In dialog state tracker 218, based on the user input and the last dialog action, the dialog manager 216 may update the nested slot. This capability may allow the assistant system 140 to interact with the user not only to collect missing slot values but also to reduce ambiguity of more complex/ambiguous utterances to complete the task. In particular embodiments, the dialog manager 216 may further support requesting missing slots in a nested intent and multi-intent user inputs (e.g., "take this photo and send it to Dad"). In particular embodiments, the dialog manager 216 may support machine-learning models for more robust dialog experience. As an example and not by way of limitation, the dialog state tracker 218 may use neural network based models (or any other suitable machine-learning models) to model belief over task hypotheses. As another example and not by way of limitation, for action selector 222, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user input.

In particular embodiments, the determined actions by the action selector 222 may be sent to the delivery system 230. The delivery system 230 may comprise a CU composer 370, a response generation component 380, a dialog state writing component 382, and a text-to-speech (TTS) component 390. Specifically, the output of the action selector 222 may be received at the CU composer 370. In particular embodiments, the output from the action selector 222 may be formulated as a <k,c,u,d> tuple, in which k indicates a knowledge source, c indicates a communicative goal, u indicates a user model, and d indicates a discourse model.

In particular embodiments, the CU composer 370 may generate a communication content for the user using a natural-language generation (NLG) component 372. In particular embodiments, the NLG component 372 may use different language models and/or language templates to generate natural-language outputs. The generation of natural-language outputs may be application specific. The generation of natural-language outputs may be also personalized for each user. In particular embodiments, the NLG component 372 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the NLG component 372 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the NLG component 372. The sentence planner may determine the organization of the communication content to make it human understandable. The surface realization component may determine specific words to use, the sequence of the sentences, and the style of the communication content.

In particular embodiments, the CU composer 370 may also determine a modality of the generated communication content using the UI payload generator 374. Since the generated communication content may be considered as a response to the user input, the CU composer 370 may additionally rank the generated communication content using a response ranker 376. As an example and not by way of limitation, the ranking may indicate the priority of the response. In particular embodiments, the CU composer 370 may comprise a natural-language synthesis (NLS) component that may be separate from the NLG component 372. The NLS component may specify attributes of the synthesized speech generated by the CU composer 370, including gender, volume, pace, style, or register, in order to customize the response for a particular user, task, or agent. The NLS component may tune language synthesis without engaging the implementation of associated tasks. In particular embodiments, the CU composer 370 may check privacy constraints associated with the user to make sure the generation of the communication content follows the privacy policies. More information on customizing natural-language generation (NLG) may be found in U.S. patent application Ser. No. 15/967,279, filed 30 Apr. 2018, and U.S. patent application Ser. No. 15/966,455, filed 30 Apr. 2018, which is incorporated by reference.

In particular embodiments, the delivery system 230 may perform different tasks based on the output of the CU composer 370. These tasks may include writing (i.e., storing/updating) the dialog state into the data store 330 using the dialog state writing component 382 and generating responses using the response generation component 380. In particular embodiments, the output of the CU composer 370 may be additionally sent to the TTS component 390 if the determined modality of the communication content is audio. In particular embodiments, the output from the delivery system 230 comprising one or more of the generated responses, the communication content, or the speech generated by the TTS component 390 may be then sent back to the dialog manager 216.

In particular embodiments, the orchestrator 206 may determine, based on the output of the entity resolution module 212, whether to processing a user input on the client system 130 or on the server, or in the third operational mode (i.e., blended mode) using both. Besides determining how to process the user input, the orchestrator 206 may receive the results from the agents 228 and/or the results from the delivery system 230 provided by the dialog manager 216. The orchestrator 206 may then forward these results to the arbitrator 226. The arbitrator 226 may aggregate these results, analyze them, select the best result, and provide the selected result to the render output module 232. In particular embodiments, the arbitrator 226 may consult with dialog policies 360 to obtain the guidance when analyzing these results. In particular embodiments, the render output module 232 may generate a response that is suitable for the client system 130.

Figure 4:
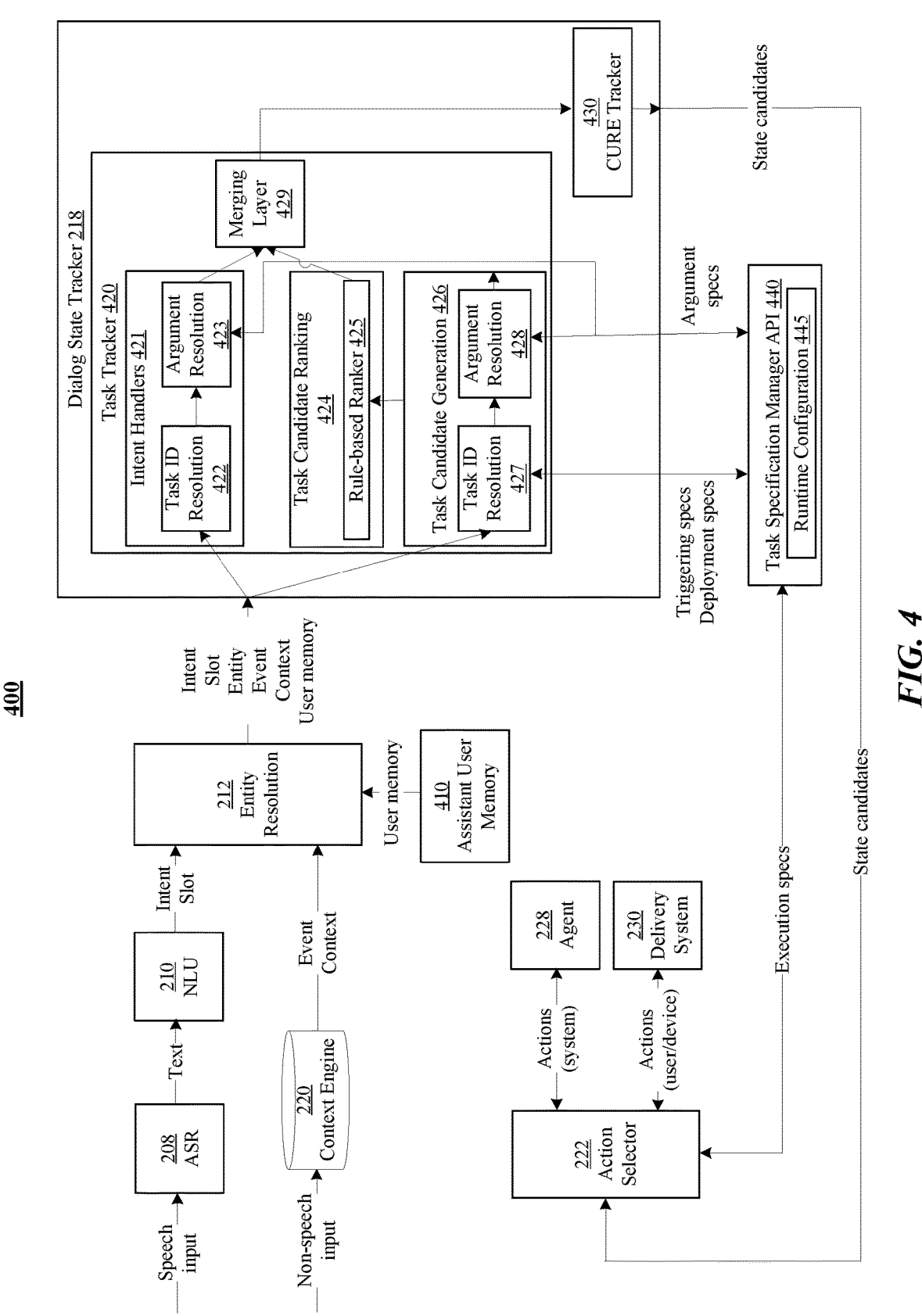
FIG. 4 illustrates an example flow diagram of processing a user input by the assistant system.

FIG. 4 illustrates an example task-centric flow diagram 400 of processing a user input. In particular embodiments, the assistant system 140 may assist users not only with voice-initiated experiences but also more proactive, multimodal experiences that are initiated on understanding user context. In particular embodiments, the assistant system 140 may rely on assistant tasks for such purpose. An assistant task may be a central concept that is shared across the whole assistant stack to understand user intention, interact with the user and the world to complete the right task for the user. In particular embodiments, an assistant task may be the primitive unit of assistant capability. It may comprise data fetching, updating some state, executing some command, or complex tasks composed of a smaller set of tasks. Completing a task correctly and successfully to deliver the value to the user may be the goal that the assistant system 140 is optimized for. In particular embodiments, an assistant task may be defined as a capability or a feature. The assistant task may be shared across multiple product surfaces if they have exactly the same requirements so it may be easily tracked. It may also be passed from device to device, and easily picked up mid-task by another device since the primitive unit is consistent. In addition, the consistent format of the assistant task may allow developers working on different modules in the assistant stack to more easily design around it. Furthermore, it may allow for task sharing. As an example and not by way of limitation, if a user is listening to music on smart glasses, the user may say "play this music on my phone." In the event that the phone hasn't been woken or has a task to execute, the smart glasses may formulate a task that is provided to the phone, which may then be executed by the phone to start playing music. In particular embodiments, the assistant task may be retained by each surface separately if they have different expected behaviors. In particular embodiments, the assistant system 140 may identify the right task based on user inputs in different modality or other signals, conduct conversation to collect all necessary information, and complete that task with action selector 222 implemented internally or externally, on server or locally product surfaces. In particular embodiments, the assistant stack may comprise a set of processing components from wake-up, recognizing user inputs, understanding user intention, reasoning about the tasks, fulfilling a task to generate natural-language response with voices.

In particular embodiments, the user input may comprise speech input. The speech input may be received at the ASR module 208 for extracting the text transcription from the speech input. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise one or more of a grapheme-to-phoneme (G2P) model, a pronunciation learning model, a personalized acoustic model, a personalized language model (PLM), or an end-pointing model. In particular embodiments, the grapheme-to-phoneme (G2P) model may be used to determine a user's grapheme-to-phoneme style (i.e., what it may sound like when a particular user speaks a particular word). In particular embodiments, the personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may also be used to predict what words a user is most likely to say given a context. In particular embodiments, the end-pointing model may detect when the end of an utterance is reached. In particular embodiments, based at least in part on a limited computing power of the client system 130, the assistant system 140 may optimize the personalized language model at runtime during the client-side process. As an example and not by way of limitation, the assistant system 140 may pre-compute a plurality of personalized language models for a plurality of possible subjects a user may talk about. When a user input is associated with a request for assistance, the assistant system 140 may promptly switch between and locally optimize the pre-computed language models at runtime based on user activities. As a result, the assistant system 140 may preserve computational resources while efficiently identifying a subject matter associated with the user input. In particular embodiments, the assistant system 140 may also dynamically re-learn user pronunciations at runtime.

In particular embodiments, the user input may comprise non-speech input. The non-speech input may be received at the context engine 220 for determining events and context from the non-speech input. The context engine 220 may determine multi-modal events comprising voice/text intents, location updates, visual events, touch, gaze, gestures, activities, device/application events, and/or any other suitable type of events. The voice/text intents may depend on the ASR module 208 and the NLU module 210. The location updates may be consumed by the dialog manager 216 to support various proactive/reactive scenarios. The visual events may be based on person or object appearing in the user's field of view. These events may be consumed by the dialog manager 216 and recorded in transient user state to support visual co-reference (e.g., resolving "that" in "how much is that shirt?" and resolving "him" in "send him my contact"). The gaze, gesture, and activity may result in flags being set in the transient user state (e.g., user is running) which may condition the action selector 222. For the device/application events, if an application makes an update to the device state, this may be published to the assistant system 140 so that the dialog manager 216 may use this context (what is currently displayed to the user) to handle reactive and proactive scenarios. As an example and not by way of limitation, the context engine 220 may cause a push notification message to be displayed on a display screen of the user's client system 130. The user may interact with the push notification message, which may initiate a multi-modal event (e.g., an event workflow for replying to a message received from another user). Other example multi-modal events may include seeing a friend, seeing a landmark, being at home, running, faces being recognized in a photo, starting a call with touch, taking a photo with touch, opening an application, etc. In particular embodiments, the context engine 220 may also determine world/social events based on world/social updates (e.g., weather changes, a friend getting online). The social updates may comprise events that a user is subscribed to, (e.g., friend's birthday, posts, comments, other notifications). These updates may be consumed by the dialog manager 216 to trigger proactive actions based on context (e.g., suggesting a user call a friend on their birthday, but only if the user is not focused on something else). As an example and not by way of limitation, receiving a message may be a social event, which may trigger the task of reading the message to the user.

In particular embodiments, the text transcription from the ASR module 208 maybe sent to the NLU module 210. The NLU module 210 may process the text transcription and extract the user intention (i.e., intents) and parse the slots or parsing result based on the linguistic ontology. In particular embodiments, the intents and slots from the NLU module 210 and/or the events and contexts from the context engine 220 may be sent to the entity resolution module 212. In particular embodiments, the entity resolution module 212 may resolve entities associated with the user input based on the output from the NLU module 210 and/or the context engine 220. The entity resolution module 212 may use different techniques to resolve the entities, including accessing user memory from the assistant user memory (AUM) 354. In particular embodiments, the AUM 354 may comprise user episodic memories helpful for resolving the entities by the entity resolution module 212. The AUM 354 may be the central place for storing, retrieving, indexing, and searching over user data.

In particular embodiments, the entity resolution module 212 may provide one or more of the intents, slots, entities, events, context, or user memory to the dialog state tracker 218. The dialog state tracker 218 may identify a set of state candidates for a task accordingly, conduct interaction with the user to collect necessary information to fill the state, and call the action selector 222 to fulfill the task. In particular embodiments, the dialog state tracker 218 may comprise a task tracker 410. The task tracker 410 may track the task state associated with an assistant task. In particular embodiments, a task state may be a data structure persistent cross interaction turns and updates in real time to capture the state of the task during the whole interaction. The task state may comprise all the current information about a task execution status, such as arguments, confirmation status, confidence score, etc. Any incorrect or outdated information in the task state may lead to failure or incorrect task execution. The task state may also serve as a set of contextual information for many other components such as the ASR module 208, the NLU module 210, etc.

In particular embodiments, the task tracker 410 may comprise intent handlers 411, task candidate ranking module 414, task candidate generation module 416, and merging layer 419. In particular embodiments, a task may be identified by its ID name. The task ID may be used to associate corresponding component assets if it is not explicitly set in the task specification, such as dialog policy 360, agent execution, NLG dialog act, etc. Therefore, the output from the entity resolution module 212 may be received by a task ID resolution component 417 of the task candidate generation module 416 to resolve the task ID of the corresponding task. In particular embodiments, the task ID resolution component 417 may call a task specification manager API 430 to access the triggering specifications and deployment specifications for resolving the task ID. Given these specifications, the task ID resolution component 417 may resolve the task ID using intents, slots, dialog state, context, and user memory.

In particular embodiments, the technical specification of a task may be defined by a task specification. The task specification may be used by the assistant system 140 to trigger a task, conduct dialog conversation, and find a right execution module (e.g., agents 228) to execute the task. The task specification may be an implementation of the product requirement document. It may serve as the general contract and requirements that all the components agreed on. It may be considered as an assembly specification for a product, while all development partners deliver the modules based on the specification. In particular embodiments, an assistant task may be defined in the implementation by a specification. As an example and not by way of limitation, the task specification may be defined as the following categories. One category may be a basic task schema which comprises the basic identification information such as ID, name, and the schema of the input arguments. Another category may be a triggering specification, which is about how a task can be triggered, such as intents, event message ID, etc. Another category may be a conversational specification, which is for dialog manager 216 to conduct the conversation with users and systems. Another category may be an execution specification, which is about how the task will be executed and fulfilled. Another category may be a deployment specification, which is about how a feature will be deployed to certain surfaces, local, and group of users.

In particular embodiments, the task specification manager API 430 may be an API for accessing a task specification manager. The task specification manager may be a module in the runtime stack for loading the specifications from all the tasks and providing interfaces to access all the tasks specifications for detailed information or generating task candidates. In particular embodiments, the task specification manager may be accessible for all components in the runtime stack via the task specification manager API 430. The task specification manager may comprise a set of static utility functions to manage tasks with the task specification manager, such as filtering task candidates by platform. Before landing the task specification, the assistant system 140 may also dynamically load the task specifications to support end-to-end development on the development stage.

In particular embodiments, the task specifications may be grouped by domains and stored in runtime configurations 435. The runtime stack may load all the task specifications from the runtime configurations 435 during the building time. In particular embodiments, in the runtime configurations 435, for a domain, there may be cconf file and a cinc file (e.g., sidechef_task.cconf and sidechef_task.inc). As an example and not by way of limitation, <domain>_tasks.cconf may comprise all the details of the task specifications. As another example and not by way of limitation, <domain>_tasks.cinc may provide a way to override the generated specification if there is no support for that feature yet.

In particular embodiments, a task execution may require a set of arguments to execute. Therefore, an argument resolution component 418 may resolve the argument names using the argument specifications for the resolved task ID. These arguments may be resolved based on NLU outputs (e.g., slot [SL:contact]), dialog state (e.g., short-term calling history), user memory (such as user preferences, location, long-term calling history, etc.), or device context (such as timer states, screen content, etc.). In particular embodiments, the argument modality may be text, audio, images or other structured data. The slot to argument mapping may be defined by a filling strategy and/or language ontology. In particular embodiments, given the task triggering specifications, the task candidate generation module 416 may look for the list of tasks to be triggered as task candidates based on the resolved task ID and arguments.

In particular embodiments, the generated task candidates may be sent to the task candidate ranking module 414 to be further ranked. The task candidate ranking module 414 may use a rule-based ranker 415 to rank them. In particular embodiments, the rule-based ranker 415 may comprise a set of heuristics to bias certain domain tasks. The ranking logic may be described as below with principles of context priority. In particular embodiments, the priority of a user specified task may be higher than an on-foreground task. The priority of the on-foreground task may be higher than a device-domain task when the intent is a meta intent. The priority of the device-domain task may be higher than a task of a triggering intent domain. As an example and not by way of limitation, the ranking may pick the task if the task domain is mentioned or specified in the utterance, such as "create a timer in TIMER app". As another example and not by way of imitation, the ranking may pick the task if the task domain is on foreground or active state, such as "stop the timer" to stop the timer while the TIMER app is on foreground and there is an active timer. As yet another example and not by way of imitation, the ranking may pick the task if the intent is general meta intent, and the task is device control while there is no other active application or active state. As yet another example and not by way of imitation, the ranking may pick the task if the task is the same as the intent domain. In particular embodiments, the task candidate ranking module 414 may customize some more logic to check the match of intent/slot/entity types. The ranked task candidates may be sent to the merging layer 419.

In particular embodiments, the output from the entity resolution module 212 may also sent to a task ID resolution component 412 of the intent handlers 411. The task ID resolution component 412 may resolve the task ID of the corresponding task similarly to the task ID resolution component 417. In particular embodiments, the intent handlers 411 may additionally comprise an argument resolution component 413. The argument resolution component 413 may resolve the argument names using the argument specifications for the resolved task ID similarly to the argument resolution component 418. In particular embodiments, intent handlers 411 may deal with task agnostic features and may not be expressed within the task specifications which are task specific. Intent handlers 411 may output state candidates other than task candidates such as argument update, confirmation update, disambiguation update, etc. In particular embodiments, some tasks may require very complex triggering conditions or very complex argument filling logic that may not be reusable by other tasks even if they were supported in the task specifications (e.g., in-call voice commands, media tasks via [IN:PLAY_MEDIA], etc.). Intent handlers 411 may be also suitable for such type of tasks. In particular embodiments, the results from the intent handlers 411 may take precedence over the results from the task candidate ranking module 414. The results from the intent handlers 411 may be also sent to the merging layer 419.

In particular embodiments, the merging layer 419 may combine the results from the intent handlers 411 and the results from the task candidate ranking module 414. The dialog state tracker 218 may suggest each task as a new state for the dialog policies 360 to select from, thereby generating a list of state candidates. The merged results may be further sent to a conversational understanding reinforcement engine (CURE) tracker 420. In particular embodiments, the CURE tracker 420 may be a personalized learning process to improve the determination of the state candidates by the dialog state tracker 218 under different contexts using real-time user feedback. More information on conversational understanding reinforcement engine may be found in U.S. patent application Ser. No. 17/186,459, filed 26 Feb. 2021, which is incorporated by reference.

In particular embodiments, the state candidates generated by the CURE tracker 420 may be sent to the action selector 222. The action selector 222 may consult with the task policies 364, which may be generated from execution specifications accessed via the task specification manager API 430. In particular embodiments, the execution specifications may describe how a task should be executed and what actions the action selector 222 may need to take to complete the task.

In particular embodiments, the action selector 222 may determine actions associated with the system. Such actions may involve the agents 228 to execute. As a result, the action selector 222 may send the system actions to the agents 228 and the agents 228 may return the execution results of these actions. In particular embodiments, the action selector may determine actions associated with the user or device. Such actions may need to be executed by the delivery system 230. As a result, the action selector 222 may send the user/device actions to the delivery system 230 and the delivery system 230 may return the execution results of these actions.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Artificial/Augmented Reality Systems

Figure 5A:
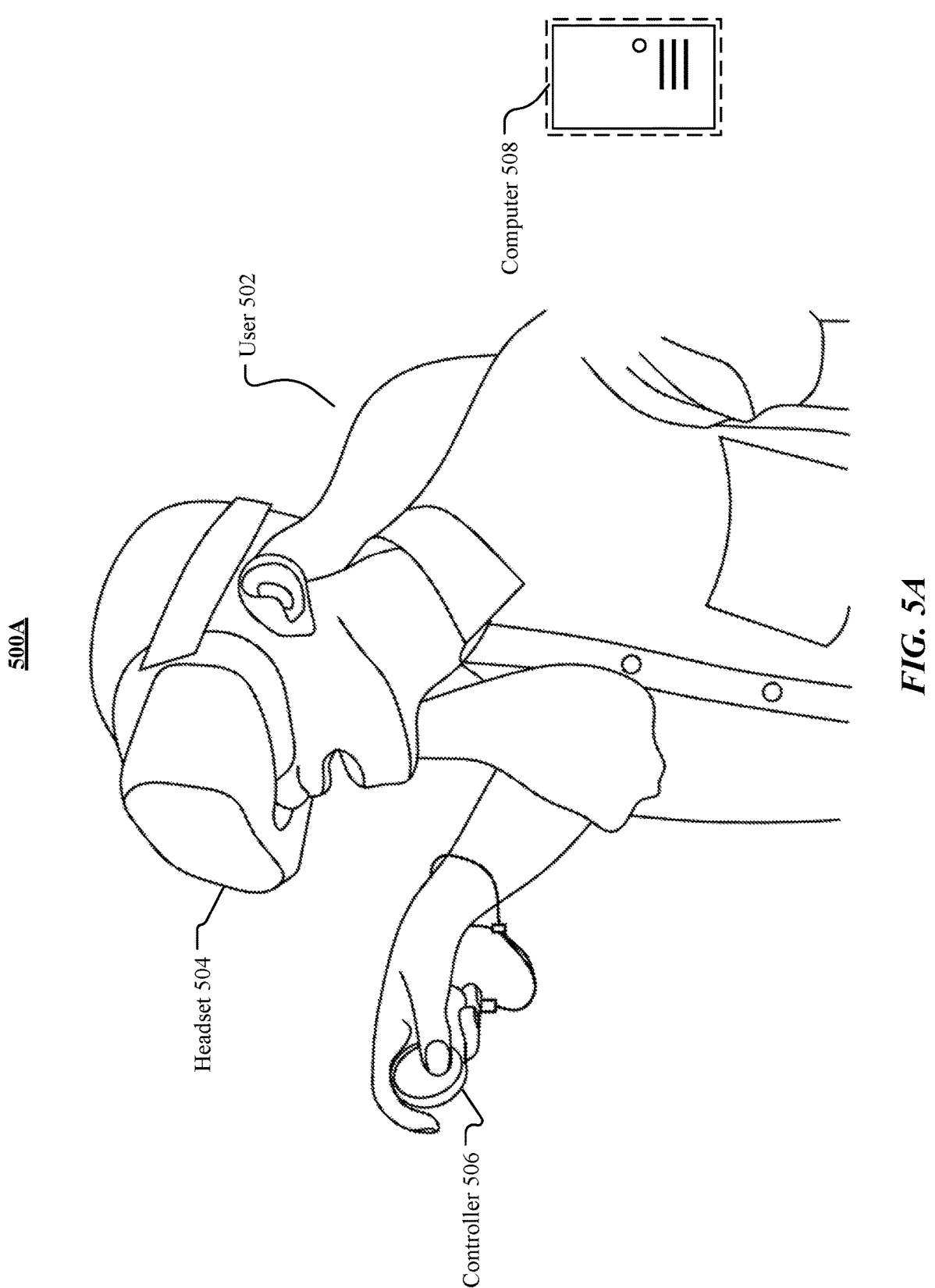
FIG. 5A illustrates an example artificial reality (AR) system.

FIG. 5A illustrates an example artificial reality (AR) system 500A. In particular embodiments, the artificial reality system 500 may comprise a headset 504, a controller 506, and a computing system 508. A user 502 may wear the headset 504 that may display visual artificial reality content to the user 502. The headset 504 may include an audio device that may provide audio artificial reality content to the user 502. The headset 504 may include one or more cameras which can capture images and videos of environments. The headset 504 may include an eye tracking system to determine the vergence distance of the user 502. The headset 504 may be referred as a head-mounted display (HDM). The controller 506 may comprise a trackpad and one or more buttons. The controller 506 may receive inputs from the user 502 and relay the inputs to the computing system 508. The controller 206 may also provide haptic feedback to the user 502. The computing system 508 may be connected to the headset 504 and the controller 506 through cables or wireless connections. The computing system 508 may control the headset 504 and the controller 506 to provide the artificial reality content to and receive inputs from the user 502. The computing system 508 may be a standalone host computer system, an on-board computer system integrated with the headset 504, a mobile device, or any other hardware platform capable of providing artificial reality content to and receiving inputs from the user 502.

Figure 5B:
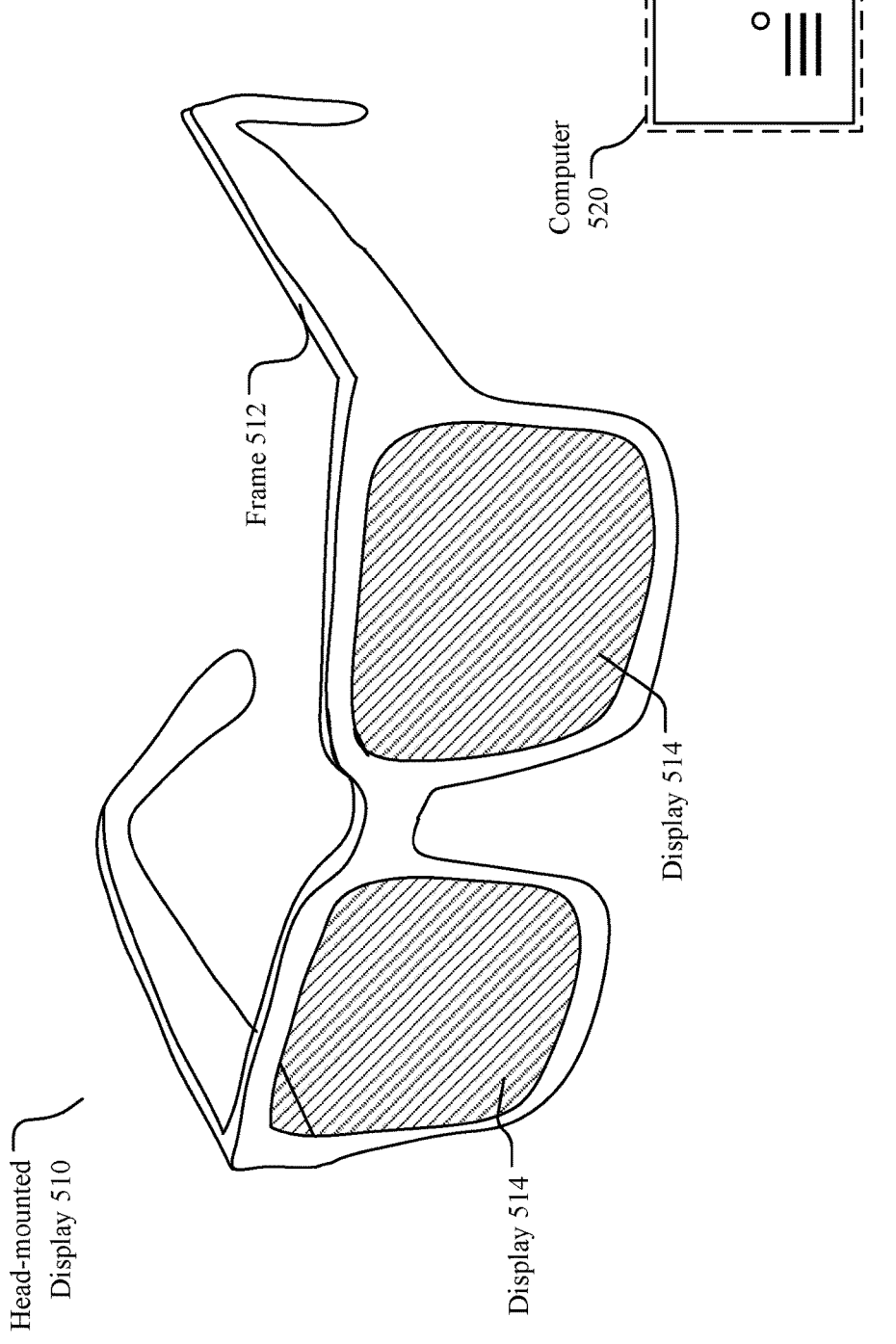
FIG. 5B illustrates an example augmented reality (AR) system.

FIG. 5B illustrates an example augmented reality (AR) system 500B. The augmented reality system 500B may include a head-mounted display (HMD) 510 (e.g., glasses) comprising a frame 512, one or more displays 514, and a computing system 520. The displays 514 may be transparent or translucent allowing a user wearing the HMD 510 to look through the displays 514 to see the real world and displaying visual artificial reality content to the user at the same time. The HMD 510 may include an audio device that may provide audio artificial reality content to users. The HMD 510 may include one or more cameras which can capture images and videos of environments. The HMD 510 may include an eye tracking system to track the vergence movement of the user wearing the HMD 510. The augmented reality system 500B may further include a controller comprising a trackpad and one or more buttons. The controller may receive inputs from users and relay the inputs to the computing system 520. The controller may also provide haptic feedback to users. The computing system 520 may be connected to the HMD 510 and the controller through cables or wireless connections. The computing system 520 may control the HMD 510 and the controller to provide the augmented reality content to and receive inputs from users. The computing system 520 may be a standalone host computer system, an on-board computer system integrated with the HMD 510, a mobile device, or any other hardware platform capable of providing artificial reality content to and receiving inputs from users.

Dynamic Content Rendering Based on Context for AR

In particular embodiments, an artificial/augmented reality (AR) system 500 may dynamically render AR content (e.g., the representation/user interface (UI) of the assistant system 140) for a user with spatial and contextual awareness. This may allow the AR content to adapt to the user's activities and better integrate with the user's real-world environment. The AR system 500 may use contextual information from the operating system shell of the client system 130 to understand the user's intent (i.e., their intended action) and dynamically adapt the digital display of the AR content accordingly to optimize their presence as the user transits from intent to intent. As an example and not by way of limitation, when a user wearing AR glasses walks to the kitchen, the UI of the assistant system 140 may fade or move to the bottom of the user's field of view to avoid blocking the user's view. But when the user gets close to the kitchen counter and looks at it, the UI of the assistant system 140 may snap to the countertop to provide assistance quickly to the user for what the user may want to do at the kitchen counter. The onboard sensors associated with the AR system 500 may be able to pick up contextual signals that provide an understanding of the user's environment and state. To be power efficient, the AR system 500 may use a cascaded inference approach, progressing from cheaper inference models to more expensive inference models, to determine the user's environment and state. The AR system 500 may further adapt the rendering of the AR content based on such environment and state information. Besides AR systems 500, the embodiments disclosed herein may be generally applicable to adapting virtual-reality (VR) content on VR systems. Although this disclosure describes adapting particular contents by particular systems in a particular manner, this disclosure contemplates adapting any suitable content by any suitable system in any suitable manner.

In particular embodiments, the AR system 500 may render, for one or more displays of an augmented-reality (AR) rendering device of the AR system 500 associated with a first user, a first output image comprising one or more AR objects. The AR system 500 may then access one or more sensor signals associated with the first user. In particular embodiments, the one or more sensor signals may be captured by one or more sensors of the AR system 500. The AR system 500 may detect a change in a context of the first user with respect to a real-world environment based on the one or more sensor signals. The AR system 500 may further render, for the one or more displays of the AR rendering device, a second output image comprising the one or more AR objects. In particular embodiments, one or more of the AR objects may be adapted based on the detected change in the context of the first user.

Figure 6:
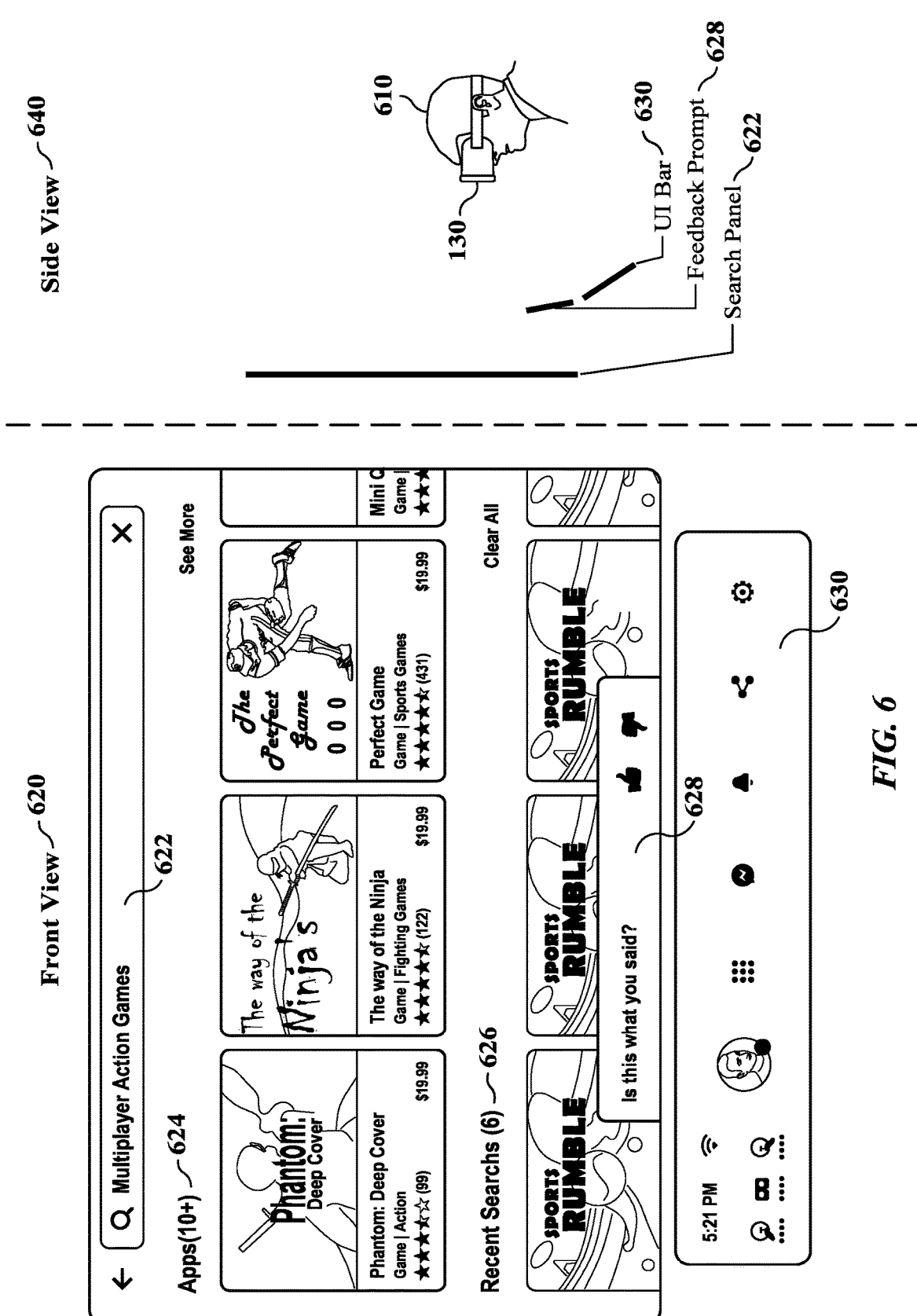
FIG. 6 illustrates an example layout of AR content.

FIG. 6 illustrates an example layout of AR content. As indicated in FIG. 6, when a user 610 using an AR-enabled client system 130 interacts with the AR system 500, the front view 620 (i.e., from a user's 610 point of view) may show different AR content comprising a search panel 622, different applications 624 running on the client system 130, recent searches 626, a prompt 628 from the AR system 500 asking for the user's confirmation, and a UI bar 630 comprising different shortcuts associated with different functions. FIG. 6 also illustrates a side view 640 of the layers associated with the AR content being displayed. As an example and not by way of limitation, the search panel 622 may be at the most backward layer. The UI bar 630 may be at the most forward layer. The feedback prompt 628 may be at a layer in between the layer for the search panel 622 and the layer for the UI bar 630. As a result, the AR system 500 may have a technical advantage of improving the user experience with the AR system 500 as the most suitable AR content according to the context may be provided more prominently for the user to interact with. Although this disclosure describes particular layout of particular content in a particular manner, this disclosure contemplates any suitable layout of any suitable content in any suitable manner.

Figure 7A:
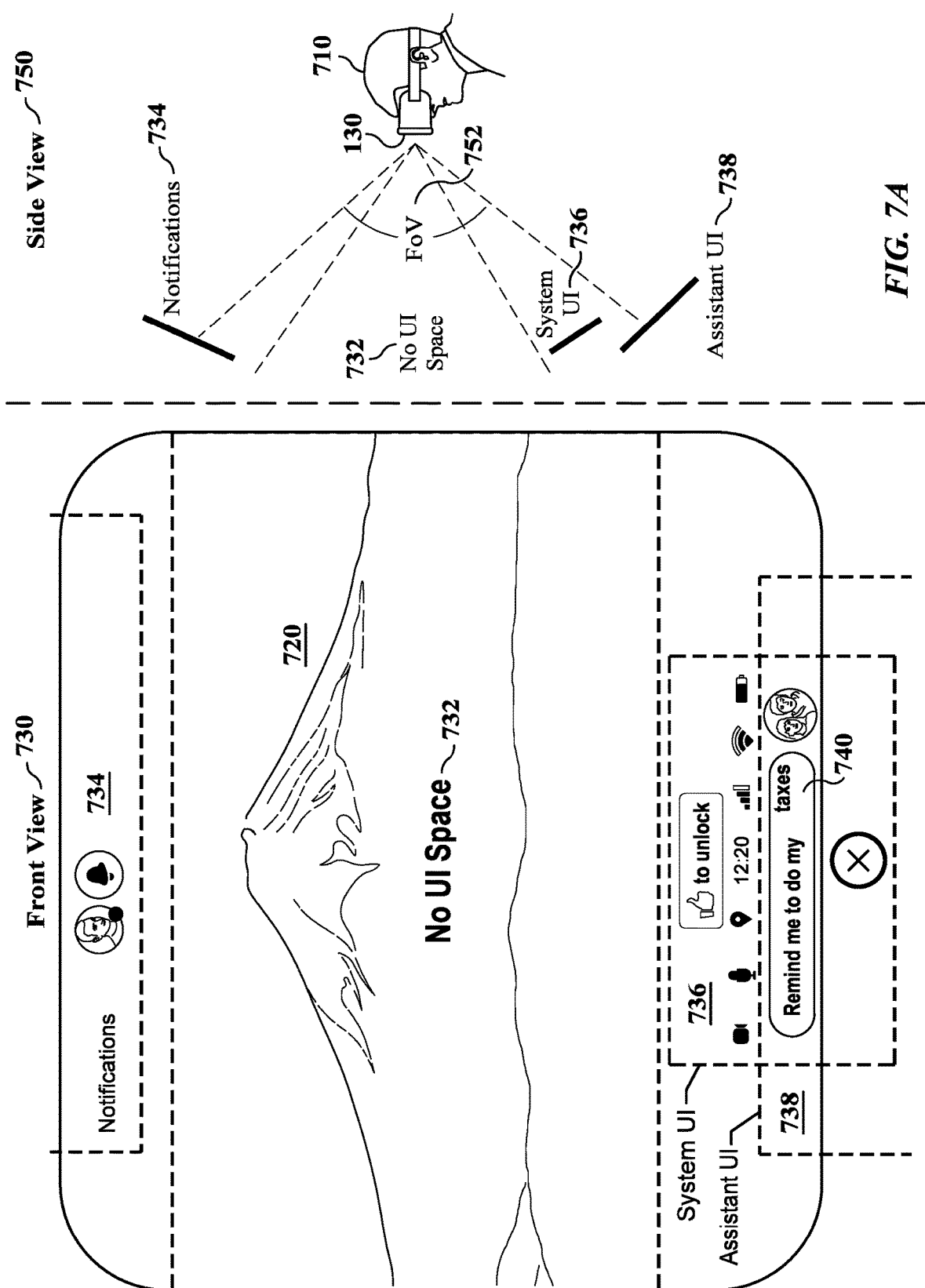
FIG. 7A illustrate example locations of the AR content seen by a user.

FIG. 7A illustrate example locations of the AR content seen by a user. As indicated in FIG. 7A, a user 710 using an AR-based client system 130 may be looking at Fuji Mountain 720 (in the real world) while interacting with the AR system 500 simultaneously. The front view 730 of the display (i.e., from a user's 710 point of view) may show different AR content overlaying what the user is seeing in the real world, e.g., the Fuji Mountain 720. There may be no UI space 732 at the center of the display. The top may be allocated for notifications 734. The bottom may be allocated for system UI 736 comprising different shortcuts associated with different functions and assistant UI 738 showing a reminder 740. FIG. 7A also illustrates a side view 750 of the layers associated with the AR content being displayed. Within the user's field of view (FoV) 752, there may be no UI space 732. Above at the user's field of view 752 there may be notifications 734. Below at the user's field of view 752 there may be system UI 736 and assistant UI 738. The user may see the full system UI 736 but partially the notifications 734 and the assistant UI 738. In addition, the system UI 736 may be at a layer that is more forward than the layer for the notifications 734 and the layer for the assistant UI 738. Although this disclosure describes particular locations of particular content in a particular manner, this disclosure contemplates any suitable location of any suitable content in any suitable manner.

Figure 7B:
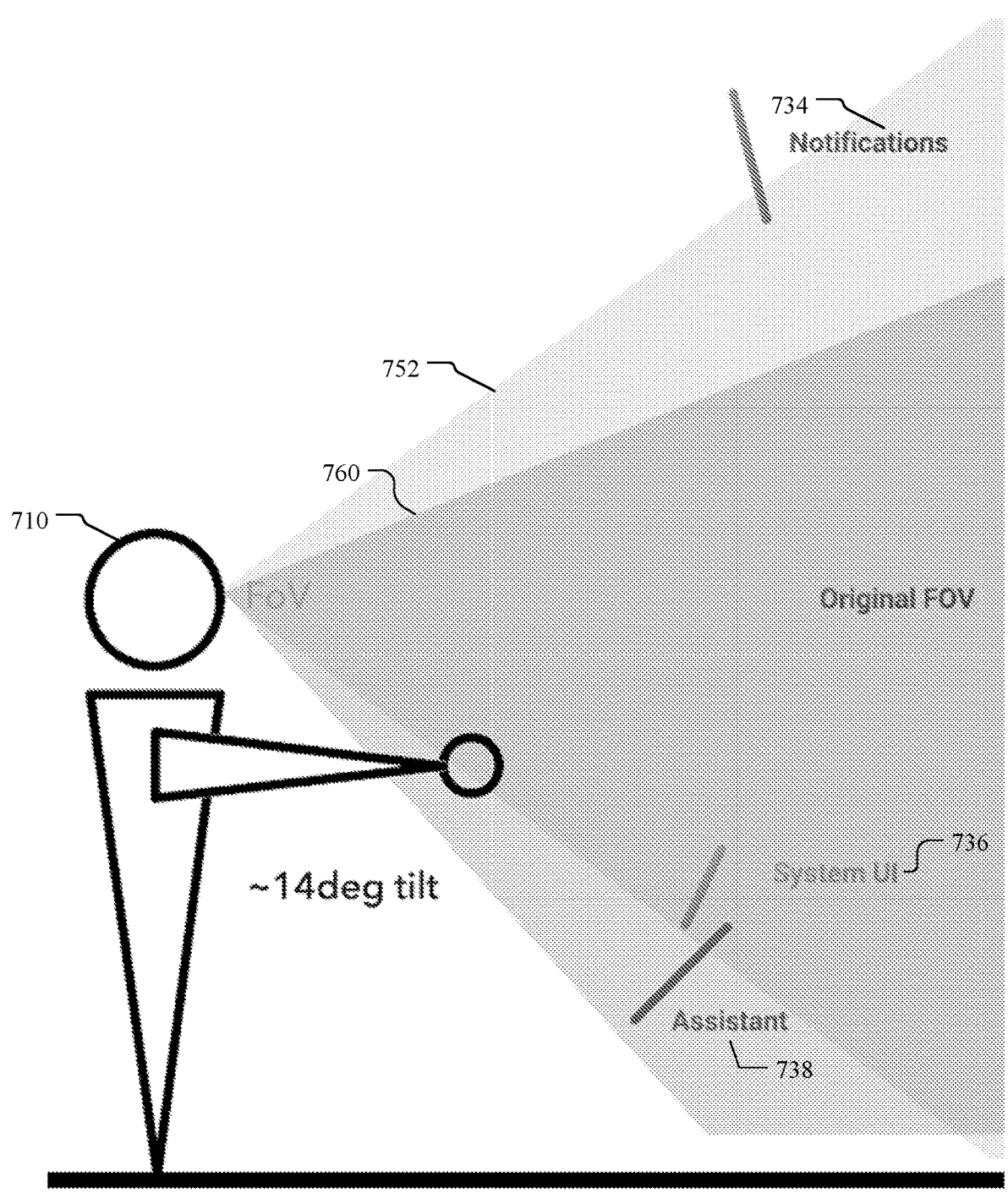
FIG. 7B illustrates example locations of the AR content with a change of the user's field of view corresponding to FIG. 7A.
Figure 7C:
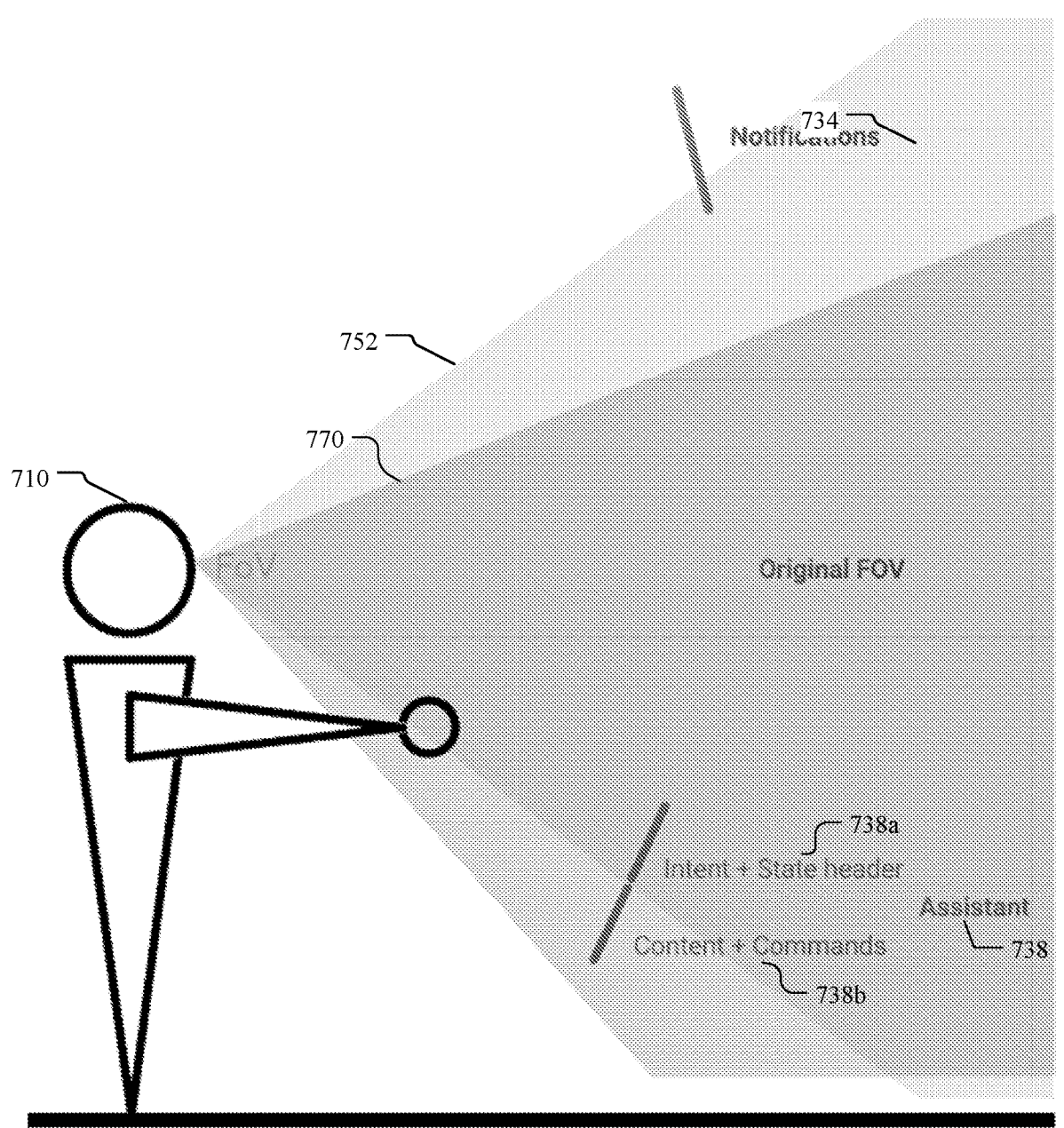
FIG. 7C illustrates example locations of the AR content specific to the assistant system corresponding to FIGS. 7A-7B.
Figure 7D:
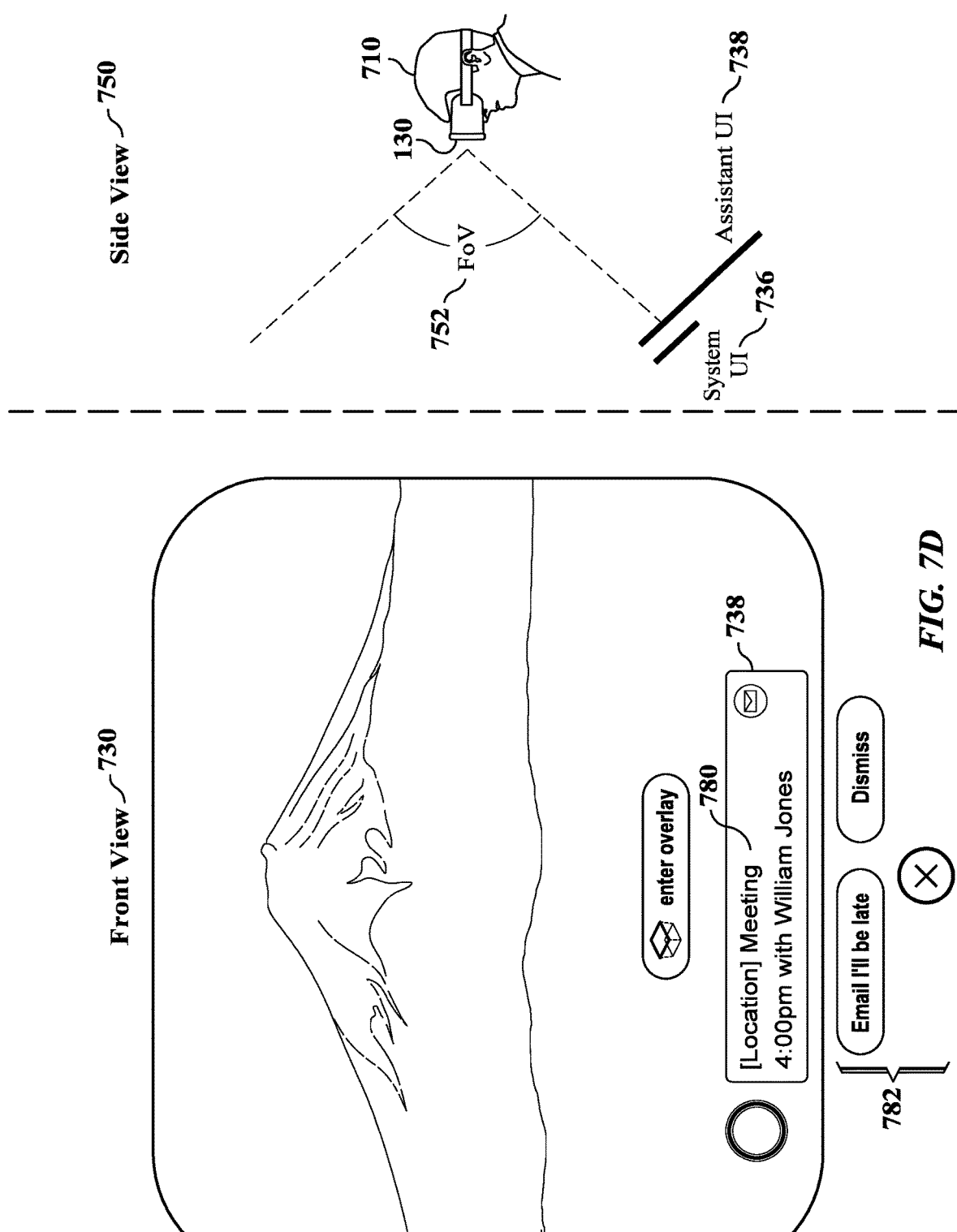
FIG. 7D illustrates an example adaptation of the UI of the assistant system corresponding to FIG. 7A.

FIG. 7B illustrates example locations of the AR content with a change of the user's field of view corresponding to FIG. 7A. As indicated in FIG. 7B, when the user's 710 field of view (FoV) 760 tilts down (e.g., by 14 degrees) as compared to the original field of view (FOV) 752, the user 710 may not see the notifications 734 anymore but may see the system UI 736 and the assistant UI 738 completely. FIG. 7C illustrates example locations of the AR content specific to the assistant system 140 corresponding to FIGS. 7A-7B. As indicated in FIG. 7C, with the original field of view (FOV) 752, the user 710 may see the intent and state header 738*a* of the assistant UI 738 but not the content and commands 738*b*. However, when the user's 710 field of view (FoV) 770 tilts down, the user 710 may see the assistant UI 738 completely including both the intent and state header 738*a* and the content and commands 738*b*. FIG. 7D illustrates an example adaptation of the UI of the assistant system 140 corresponding to FIG. 7A. In FIG. 7D, the assistant UI 738 may temporarily replace the status bar of the system UI 736 at the bottom of the field of view 752 to bring focus. Non-immediate details such as close, quick actions, etc. may be below the user's 710 sight line and field of view 752 to avoid distraction. As an example and not by way of limitation, the assistant UI 738 may show a calendar event 780 (e.g., a meeting with William Jones) and actions 782 (e.g., email or dismiss) the user 710 may take. The side view 750 further shows that the assistant UI 738 may be now at a more forward layer than the system UI 736 as compared to FIG. 7A where the system UI 736 was at a more forward layer than the assistant UI 738. Although this disclosure describes adapting particular contents by particular systems in a particular manner, this disclosure contemplates adapting any suitable content by any suitable system in any suitable manner.

In particular embodiments, the AR system 500 may intelligently adapt the rendering of any suitable AR content. The AR system 500 may need to change where it renders AR content to fit within the users' field of view of the changing environments. The AR system 500 may provide a dynamic placement of the AR content based on the users' mobility and their environment. The AR system 500 may be intelligent about what's going on in the real world so the AR content is not interfering with what a user is doing (e.g., the placement of the AR content may not pop up in front of the user's field of view while the user is focusing on some task). In particular embodiments, adapting the one or more AR objects may comprise one or more of adapting a pose of each of the AR objects, adapting a form factor of each of the AR objects, or adapting a transparency each of the AR objects.

The pose of an AR object may be either its location or its orientation. As an example and not by way of limitation, adapting a pose of an AR object may comprise changing its location from the center of the display to the bottom of the display. As another example and not by way of limitation, adapting a pose of an AR object may comprise changing its orientation from vertical to horizontal. The form factor of an AR object may be either its size or its shape. As an example and not by way of limitation, adapting a form factor of an AR object may comprise changing its size from small to medium. As another example and not by way of limitation, adapting a form factor of an AR object may comprise changing its shape from oval to round. The transparency of an AR object may indicate how opaque it is, e.g., ranging from fully visible to completely invisible. In particular embodiments, the AR system 500 may adapt the AR objects continuously. As an example and not by way of limitation, a user may wake up the AR system 500 via smart glasses and start interacting with the AR content. The AR content may appear in the user's field of view. As the user walks around, the display of the AR content may vary following the user activities (i.e., not anchoring to the point where it was when invoked). If the user starts interacting with someone or something else, the AR content may move so it is not interfering with the user's line of sight (e.g., moving to the side or bottom) but remaining in the user's peripheral vision. If the user moves towards a relevant real-world object (e.g., a table or a computer monitor), the AR content may snap onto that object. The user may then look away, but the AR content may remain anchored on that object. Therefore, if the user looks back, they may still find the AR content where they left it. Alternatively, if the user moves away from the object, the AR content may un-snap and start following the user again. As a result, the AR system 500 may have a technical advantage of enabling a user to be actively engaged with real-world activities while simultaneously providing assistance on demand, as the adaptive rendering of AR content may avoid disturbing the user with real-world activities but the user may still be able to easily access the AR content for different tasks. Although this disclosure describes adapting particular contents by particular systems in a particular manner, this disclosure contemplates adapting any suitable content by any suitable system in any suitable manner.

On an AR-based client system 130, the onboard sensors may be able to pick up signals that provide contextual information for understanding the user's environment and state. The AR system 500 may comprise an AR rendering device, which may be displaying content visually, rendering content audibly, or rendering content in any suitable modality. In particular embodiments, the AR system 500 may further comprise a companion device. As an example and not by way of limitation, the AR rendering device may be smart glasses and the companion device may be a smart phone. As another example and not by way of limitation, the AR rendering device may be an AR headset and its companion device may be a smart watch. In particular embodiments, one or more of the sensors may be implemented on the AR rendering device. In alternative embodiments, one or more of the sensors may be implemented on the companion device. The one or more sensors may comprise one or more of an inertial measurement unit (IMU), a GPS sensor, a microphone, or a camera. As an example and not by way of limitation, the IMU sensor may be a motion sensor or a gyroscope. Correspondingly, the one or more sensor signals may comprise one or more of an IMU signal, a location signal, an audio signal, or a vision signal. In particular embodiments, the AR system 500 may detect a change in an intent of the first user based on the one or more sensor signals. Accordingly, the one or more AR objects may be adapted further based on the detected change in the intent of the first user. Although this disclosure describes particular sensor signals of particular systems in a particular manner, this disclosure contemplates any suitable sensor signal of any suitable system in any suitable manner.

In particular embodiments, the AR system 500 may determine a power state associated with the AR rendering device. Accordingly, the one or more AR objects may be adapted further based on the power state. As an example and not by way of limitation, the power state may comprise one or more of an off state, a low-battery state, a standby state, a glance state, a locate-based discovery state, an interactive state, a vision-based discovery state, an RGB capture state, a media consumption state, a mute state, a ship mode, or an unconnected state. Determining the adaptation based on power states associated with the AR rendering device may be an effective solution for addressing the technical challenge of determining how to adapt the rendering of the AR content, as adapting the AR content based on power states may optimize the utilization of the computing power to enhance the user's continuous usage of the AR-enabled client system 130. Table 1 illustrates example power states and their respectively supported contexts.

TABLE 1

Power states and their supported contexts.

| Power State | Power State Description | Supported Contexts | Transitions |
|---|---|---|---|
| Off | Fully powered down | None | |
| Low battery | System may be clocked down and noncritical services may be disabled to save battery. | Noise, Indoor/Outdoor (medium accuracy) | |
| Standby | System may be not being actively used, but awaiting user input or other triggers. | Noise, Indoor/Outdoor (audio-based), Indoor/Outdoor setting (audio-based), Vehicle (IMU/audio-based) | Transition to vision-based discovery for a short time period based on environment context engine |
| Glance | Small systems may wake to show a notification, without fully going fully interactive. Users may wake up the system just to see the time, connectivity signals, etc. This may help with battery life. | Noise, Indoor/Outdoor (audio-based), Indoor/Outdoor setting (audio-based), Vehicle (IMU/audio-based) | Transition to vision-based discovery for a short time period based on environment context engine |
| Location-based Discovery | Scanning for and displaying world-locked content (localized in a map). | Noise, Indoor/Outdoor (location & audio-based), Indoor/Outdoor setting (location & audio-based), Vehicle (location & IMU/audio-based) | Transition to vision-based discovery for a short time period based on environment context engine |
| Interactive | Users may be directly interacting with device. | All contexts available. | |
| Vision-based discovery (assistant system 140) | Scanning the world for interesting visual content. | All contexts available. | |
| RGB Capture | Capturing short bursts of point-of-view video or single frames of point-of-view photos. | All contexts available. | |
| Media Consumption (not world locked) | Playing audio, video, or some other kind of streaming content to users not locked within the world. | All contexts available. | |
| Media Consumption (world locked) | Playing audio, video, or some other kind of streaming content to user that is locked within the world. | All contexts available. | |
| Mute | Vision/Audio Sensors disabled for wearer or bystander privacy or in sensitive environments. | None of the contexts available. Possible weak inference of indoor/outdoor using location. | |
| Ship mode | The battery may be disconnected from the system when the device is shipped from the factory to retailers, improving the product shelf life significantly. | None of the contexts available. | |

TABLE 1-continued

Power states and their supported contexts.

| Power State | Power State Description | Supported Contexts | Transitions |
|---|---|---|---|
| Unconnected | The client systems may be not connected to the stage or any other link. Limited services may be running until reconnected. | None of the contexts available. | |

Figures 8A, 8B, 8C:
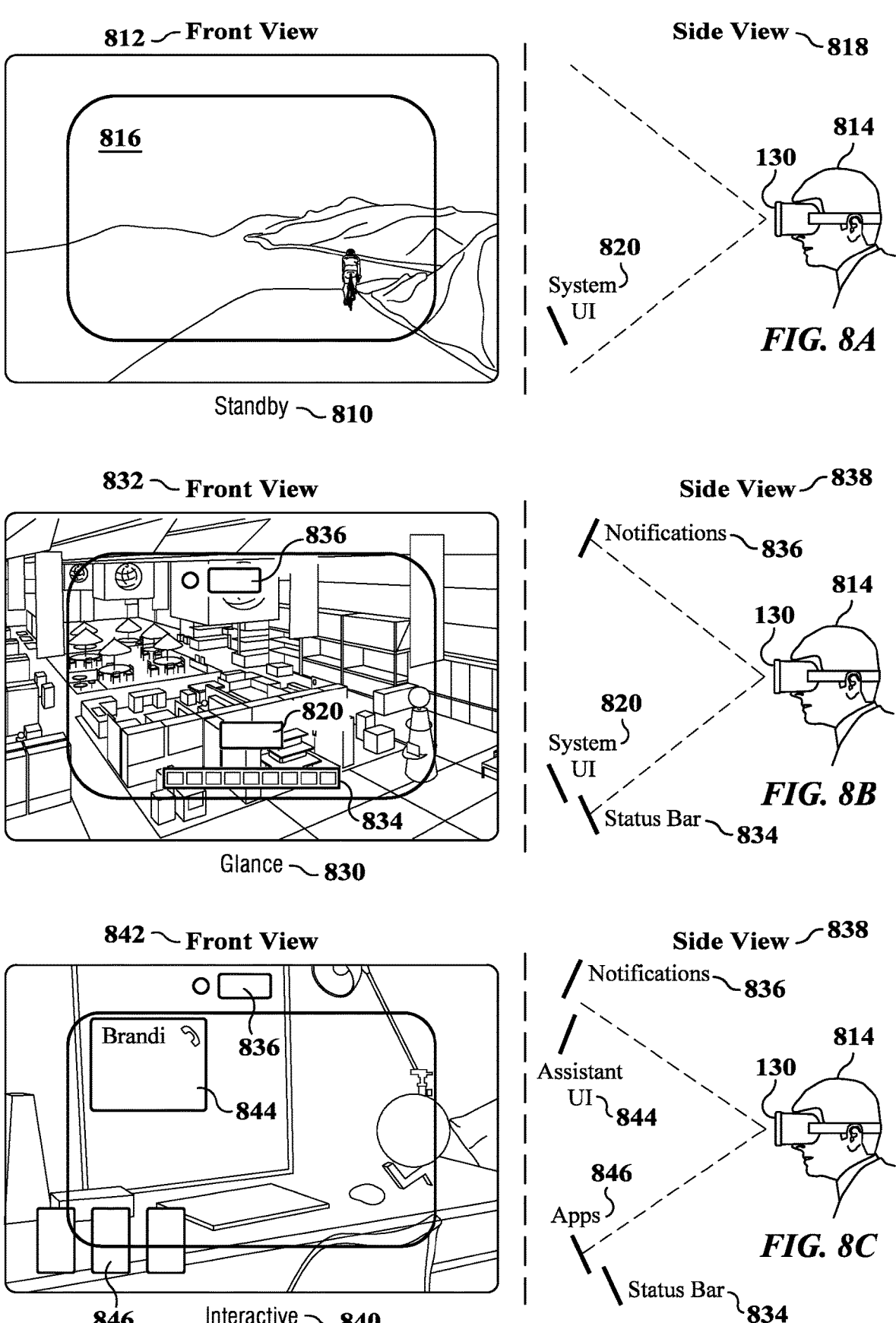
FIG. 8A illustrates an example standby power state.
FIG. 8B illustrates an example glance power state.
FIG. 8C illustrates an example interactive power state.

FIG. 8A illustrates an example standby power state. With the standby 810 power state, the display of the AR system 500 may be off but users may interact with the AR system 500 via voice. For example, within the front view 812 user 814 using an AR-based client system 130 may see the real-world scene 816. The side view 818 shows that the system UI 820 may be at the bottom of the user's 814 field of view and at a backward layer. FIG. 8B illustrates an example glance power state. With the glance 830 power state, users may quickly access information pushed to them. For example, within the front view 832 user 814 may see the real-world scene. There may be system UI 820 overlay, status bar 834 overlay, and notifications 836 overlay on top of the real-world scene. The side view 838 shows that the system UI 820 and the status bar 834 may be at the bottom of the user's 814 field of view whereas the notifications 836 may be at the top of the user's 814 field of view. Meanwhile, the system UI 820 may be at a layer that is more backward than the status bar 834 and the notifications 836. FIG. 8C illustrates an example interactive power state. With the interactive state 840, the full range of capabilities of the client system 130 may be available. For example, within the front view 842 user 814 may see the real-world scene. There may be notifications 836 overlay, assistant UI 844 overlay, apps 846 overlay, and status bar 834 (invisible from the front view) overlay on top of the real-world scene. The side view 838 shows that the system UI 820 and the status bar 834 may be at the bottom of the user's 814 field of view whereas the notifications 836 may be at the top of the user's 814 field of view. Meanwhile, the system UI 820 may be at a layer that is more backward than the status bar 834 (out of the user's 814 field of view) and the notifications 836. Although this disclosure describes particular power states of particular systems in a particular manner, this disclosure contemplates any suitable power state of any suitable system in any suitable manner.

Figure 9:
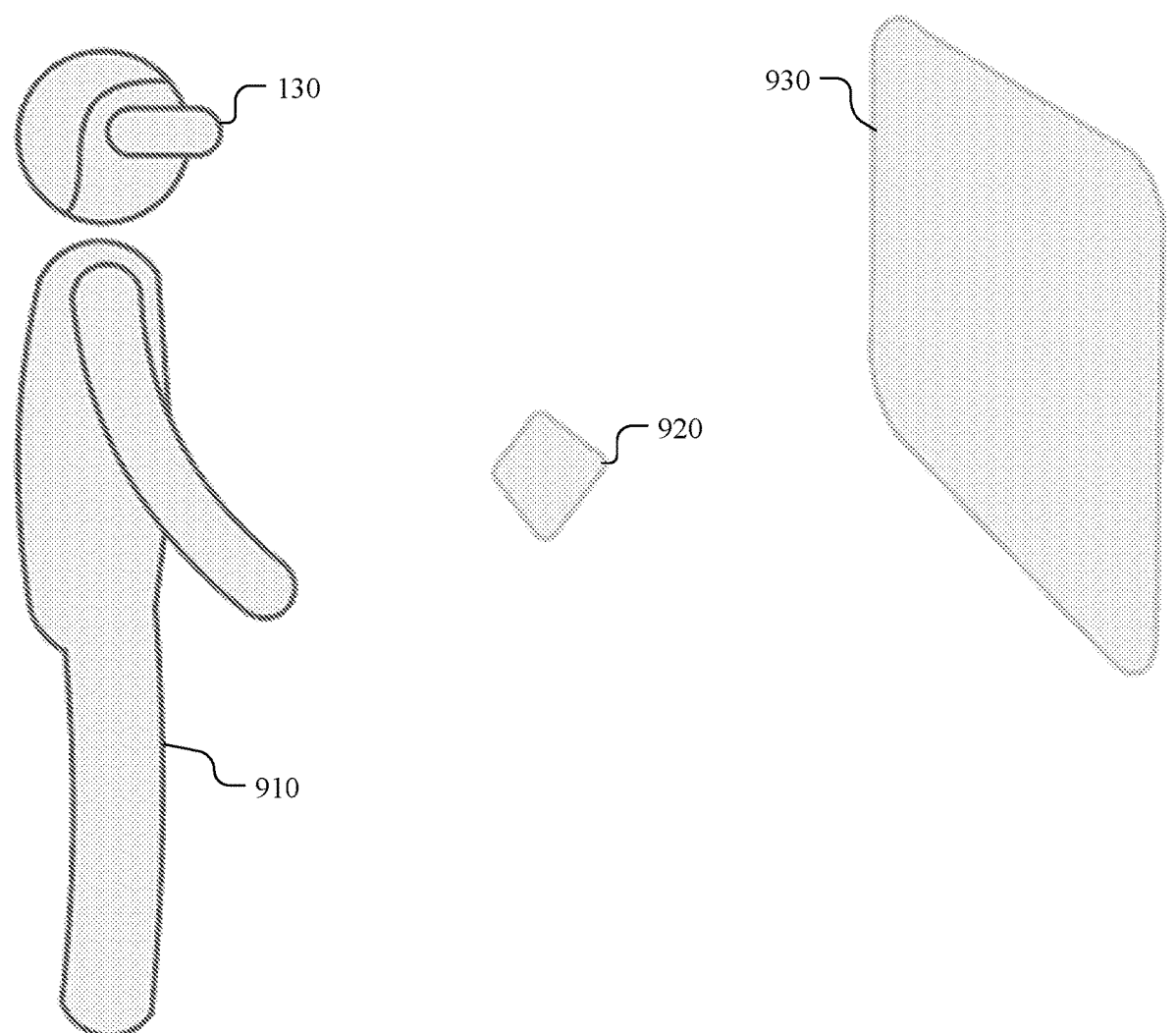
FIG. 9 illustrates an example interaction between a user and a user interface via an AR conversation layer.

In particular embodiments, the one or more AR objects may comprise a user interface (UI) associated with an assistant system 140. The AR system 500 may intelligently determine how to represent the UI of the assistant system 140 in a 3D space, e.g., where it is located in the user's field of view, how the location changes as the user interacts with it, how the location changes as the user's context changes, etc. In particular embodiments, the first option for determining how to represent the UI of the assistant system 140 may be having an AR "conversation layer" with the assistant system 140. In particular embodiments, the first user may interact with the assistant system 140 via the AR conversational layer. The AR conversation layer may be a layer between the user and the normal AR space. In particular embodiments, the AR conversation layer may be a prioritized layer that moves up in the user's field of view when the user requests the assistance from the assistant system 140. FIG. 9 illustrates an example interaction between a user and a user interface via an AR conversation layer. In FIG. 9, the user 910 may be wearing smart glasses as the client system 130 and seeing the device's applications through the glasses in a 3D space. As indicated in FIG. 9, the requests for the assistant system 140 may display a body-locked results surface (i.e., AR conversation layer 920) between the user's 910 body and the applications 930 in the 3D space. The user 910 may interact with applications 930 through global commands. In particular embodiments, the AR conversation layer 920 may depend on the power states of the client system 130. As an example and not by way of limitation, if the client system 130 is off, the user 910 may see nothing. If the power state is a glance state (which may be equivalent to the lock state on a phone), the AR system 500 may render the UI of the assistant system 140 on the edge of the field of view (e.g., near bottom of field of view). But if the user 910 glances at it (or says a wake word), it may bring the rendering of the UI of the assistant system 140 up more prominently. As another example and not by way of limitation, if the power state is an active state (which may be equivalent to an unlocked phone), all AR content may become available. Accordingly, the UI may display all available applications and the UI of the assistant system 140 may be displayed prominently along with other available applications. For the AR conversation layer 920, since it is a separate layer, the surface may be grabbed and moved around. In addition, it may change/morph as the user 910 talks to it by not only changing the position in the 3D space but also changing the size, opacity, shape, etc. In particular embodiments, adapting the UI may comprise adapting the AR conversational layer 920. Although this disclosure describes adapting particular contents by particular systems in a particular manner, this disclosure contemplates adapting any suitable content by any suitable system in any suitable manner.

Figure 10:
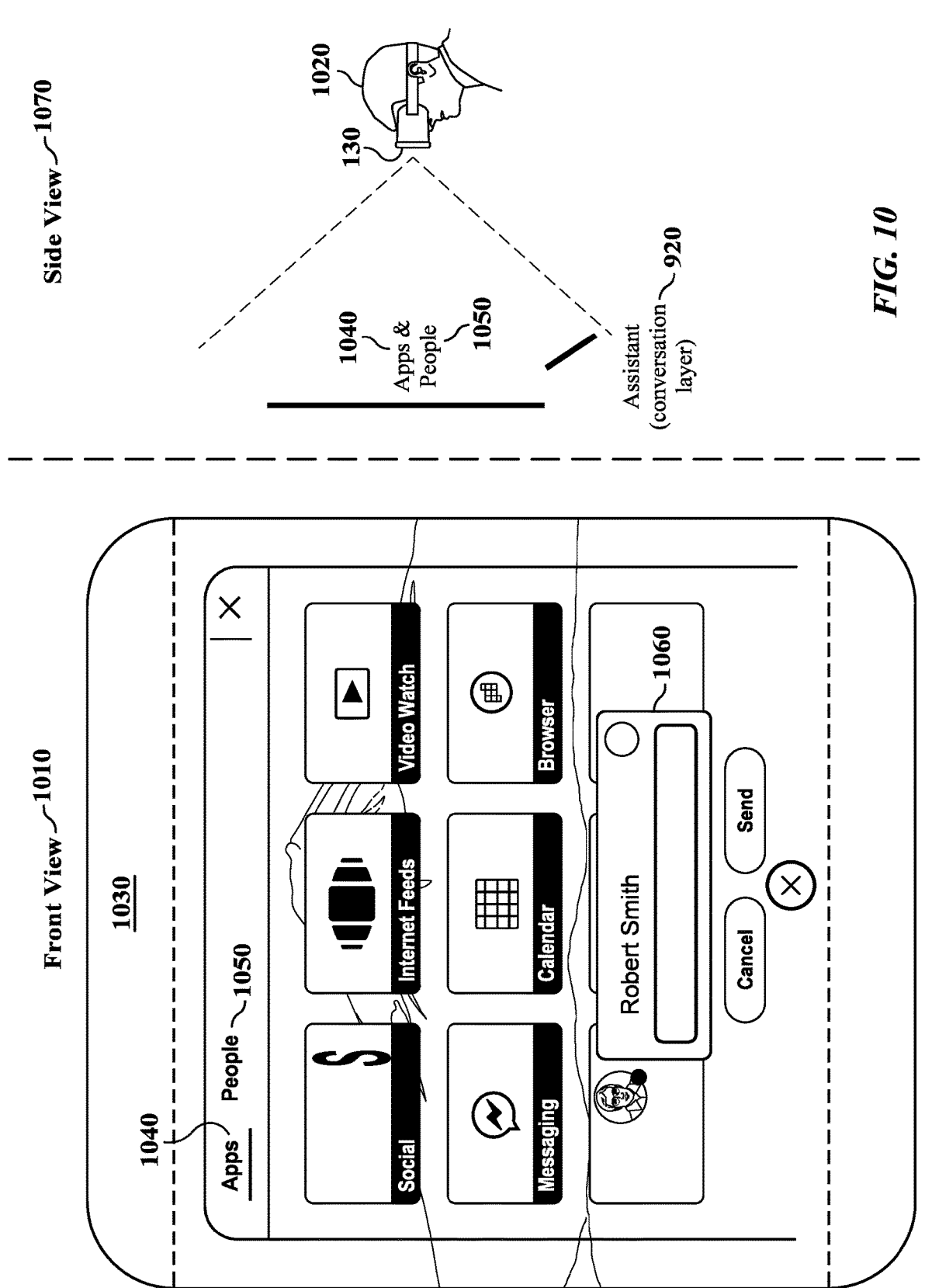
FIG. 10 illustrates an example user interface based on the AR conversation layer.

In particular embodiments, the outcomes for having the AR conversational layer 920 may be as follows. As an example and not by way of limitation, the user interface may display the flow of use cases (e.g., sending a message) in the AR conversation layer 920. As another example and not by way of limitation, the user interface may provide navigation, e.g., opening an app in the application space. As yet another example and not by way of limitation, the user interface may update power state with feedback in the status bar with respect to device control, e.g., turning the volume up. As yet another example and not by way of limitation, the user interface may display the recovery in the conversation layer 920 if a corresponding user request is not understood or not supported. FIG. 10 illustrates an example user interface based on the AR conversation layer. In FIG. 10, within the front view 1010 of a user 1020 using an AR-based client system 130, the user interface 1030 may display the applications (Apps) 1040 running on the client system 130 and the status of the people 1050 the user 1020 has connections with. As an example and not by way of limitation, the applications 1040 may comprise social, internet feeds, video watch, messaging, calendar, browser, etc. The user interface 1030 may further show a prompt 1060 for sending a message to another user (e.g., Robert Smith) as related to the status of the people 1050. The side view 1070 shows that apps 1040 and people 1050 may be in the middle of the user's 1020 field of view and the assistant conversation layer 920 corresponding to the prompt 1060 may be at the bottom. In addition, the assistant conversation layer 920 may be more forward than the layer of apps 1040 and people 1050. In particular embodiments, the AR conversational layer 920 may have several technical advantages. One advantage may include that the model may be already established, which is similar to voice assistant in mobile or wearable categories. Another advantage may include shared space for lower cost interactions since the conversational layer may easily support quick tasks (e.g., "what's the weather") and simplify complex tasks (e.g., multitasking or multi-intent such as "take a photo and share it") in different contexts. Another advantage may include clear feedback, attribution, and learnability as feedback, attribution, and voice affordances may all appear in a single, global location. Some other advantages may include support of multitasking with different applications, clear scope (e.g., global) for voice interactions, case to learn affordances, and branded attribution for different applications. Although this disclosure describes particular layers of particular systems in a particular manner, this disclosure contemplates any suitable layer of any suitable system in any suitable manner.

Figure 11:
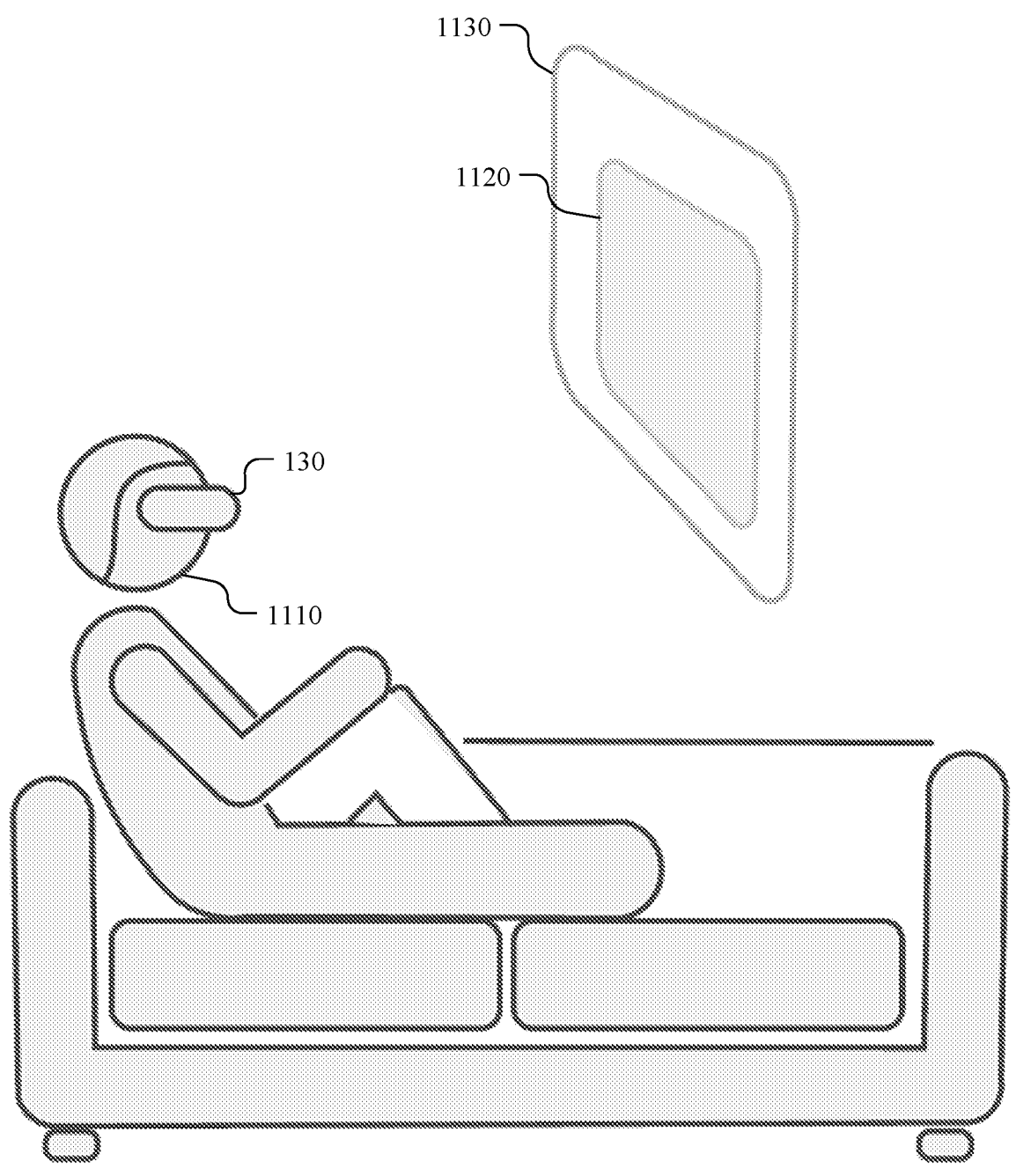
FIG. 11 illustrates an example interaction between a user and a user interface based on the integrated model.

In particular embodiments, the second option for determining how to represent the UI of the assistant system 140 may be having an integrated model, where the assistant system 140 may be integrated into the application layer of an application the user is engaged with. Users may seamlessly interact with the assistant system to complete any task. The applications on a client system 130 may have low density, and voice-forward UIs as voice may be the primary modality for most interactions since it may be natural, fast, and accurate. There may be no distinction between the assistant system 140 and the operating system shell of the client system 130. FIG. 11 illustrates an example interaction between a user and a user interface based on the integrated model. In FIG. 11, the user 1110 may be wearing smart glasses as the client system 130 and seeing the applications 1120 through the glasses in a 3D space. As indicated in FIG. 11, the assistant system 140 may open and natively control other applications 1120 within the application layer 1130, so users may be always interacting with an application. Being integrated into the application layer 1130, the assistant system 140 may have no presence as a standalone application or surface in the operating system shell of the client system 130. As an example and not by way of limitation, if a user wants to send a message, instead of interacting with a separate assistant layer, the assistant system 140 may instead bring up a messaging application and the user may interact with that application directly via voice command (e.g., by using the ASR module 208 of the assistant system 140). This may be thought of as an "invisible assistant" option, where the user may not realize they are necessarily using a separate assistant for a task. As a result, the user may interact with the assistant system 140 with fewer wake words, leading to much lower frictions.

Figure 12:
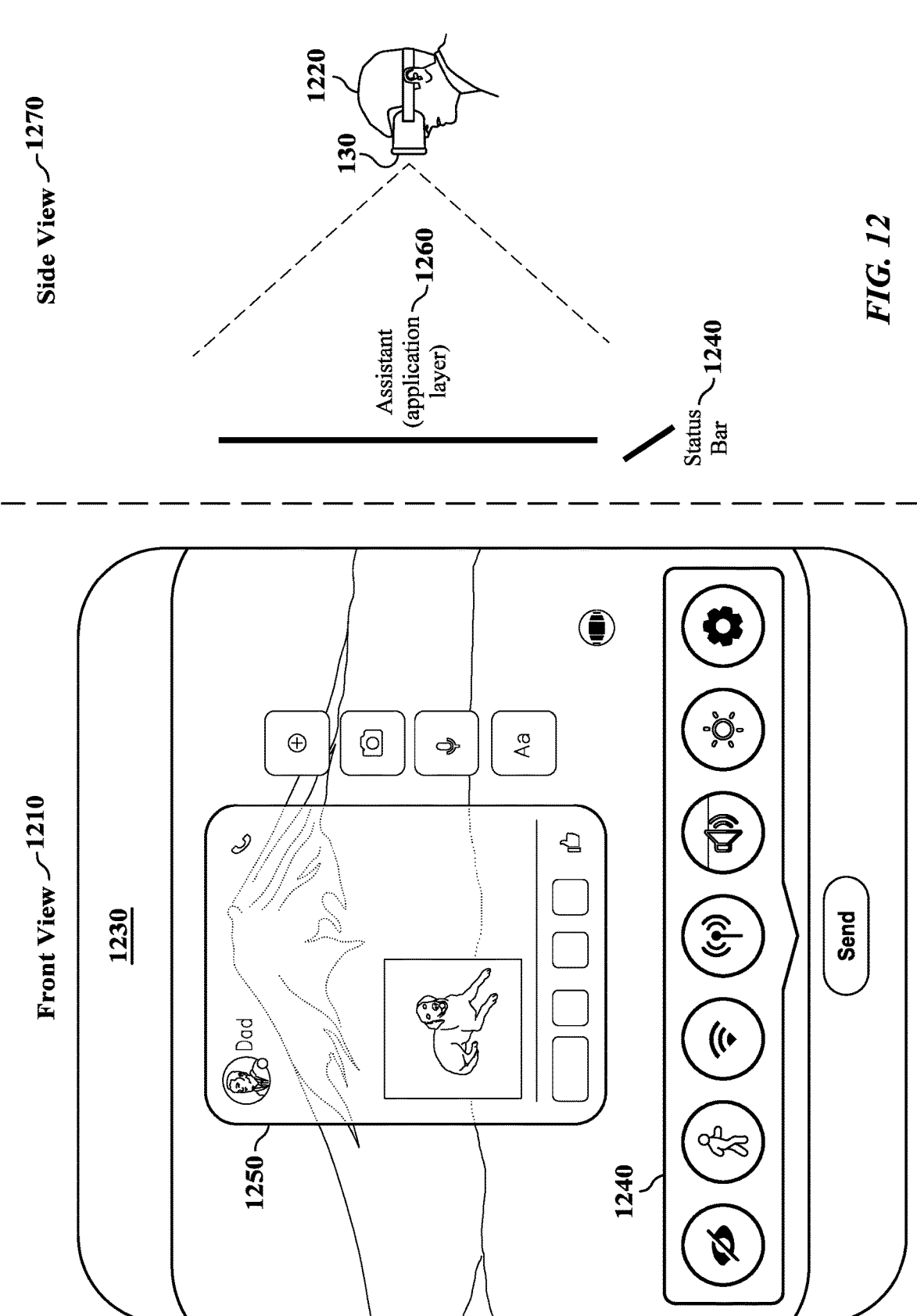
FIG. 12 illustrates an example user interface based on the integrated model.

In particular embodiments, the outcomes for having the integrated model may be as follows. As an example and not by way of limitation, the user interface may open a messaging application to a specific conversation (e.g., sending a message). As another example and not by way of limitation, the user interface may provide navigation, e.g., opening an application in the application space. As yet another example and not by way of limitation, the user interface may update power state with feedback in the status bar with respect to device control, e.g., turning the volume up. As yet another example and not by way of limitation, the user interface may display an audio response without visual feedback if a corresponding user request is not understood or not supported. FIG. 12 illustrates an example user interface based on the integrated model. In FIG. 12, within the front view 1210 of a user 1220 using an AR-based client system 130, the user interface 1230 may display a status bar 1240 comprising shortcuts to different functions of the AR system 500. The user interface 1230 may additionally show a messaging application 1250 which the user 1220 is currently engaged with. The messaging application 1250 may be associated with the assistant application layer 1260. The user 1220 may be using different applications and selecting different functions without noticing they are interacting with the assistant system 140 but rather the application itself. The side view 1270 shows that the assistant application layer 1260 (corresponding to the messaging application 1250 in the front view 1210) may be in the middle of the user's 1220 field of view and the status bar 1240 may be at the bottom. In addition, the assistant application layer 1260 may be more forward than the layer of the status bar 1240. In particular embodiments, the integrated model may have several technical advantages including the model already being established, a single application interaction model, etc. Although this disclosure describes particular models of particular systems in a particular manner, this disclosure contemplates any suitable model of any suitable system in any suitable manner.

Figure 13:
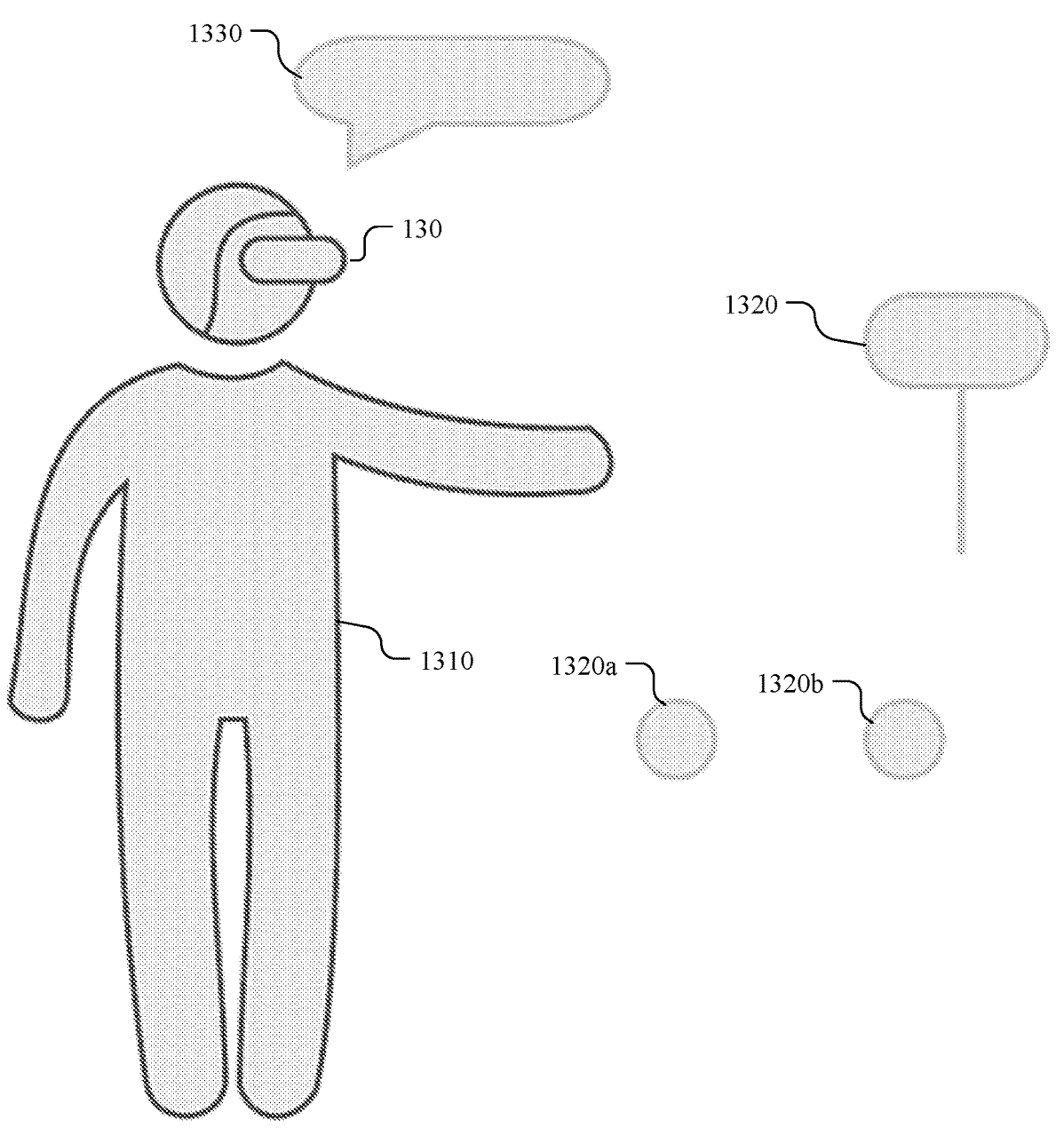
FIG. 13 illustrates an example interaction between a user and a user interface based on a mini application.

In particular embodiments, the third option for determining how to represent the UI of the assistant system 140 may be having a mini assistant application. FIG. 13 illustrates an example interaction between a user and a user interface based on a mini application. In FIG. 13, the user 1310 may be wearing smart glasses as the client system 130 and seeing the application space 1320 of the assistant system 140 through the glasses in a 3D space. As indicated in FIG. 13, the assistant system 140 may open a new instance of its own application space for every new task request, e.g., instance 1320a and instance 1320b. The user 1310 may place them in the world but only direct their voice commands 1330 to these surfaces or use a set of global commands to control the client system 130.

In particular embodiments, the outcomes for having the mini assistant applications may be as follows. As an example and not by way of limitation, the user interface may open an assistant surface in the application space (e.g., sending a message). As another example and not by way of limitation, the user interface may provide navigation, e.g., opening an application in the app space. As yet another example and not by way of limitation, the user interface may update power state with feedback in the status bar with respect to device control, e.g., turning the volume up. As yet another example and not by way of limitation, the user interface may open the assistant surface in the application space to show results and recover if a corresponding user request is not understood or not supported.

Figure 14:
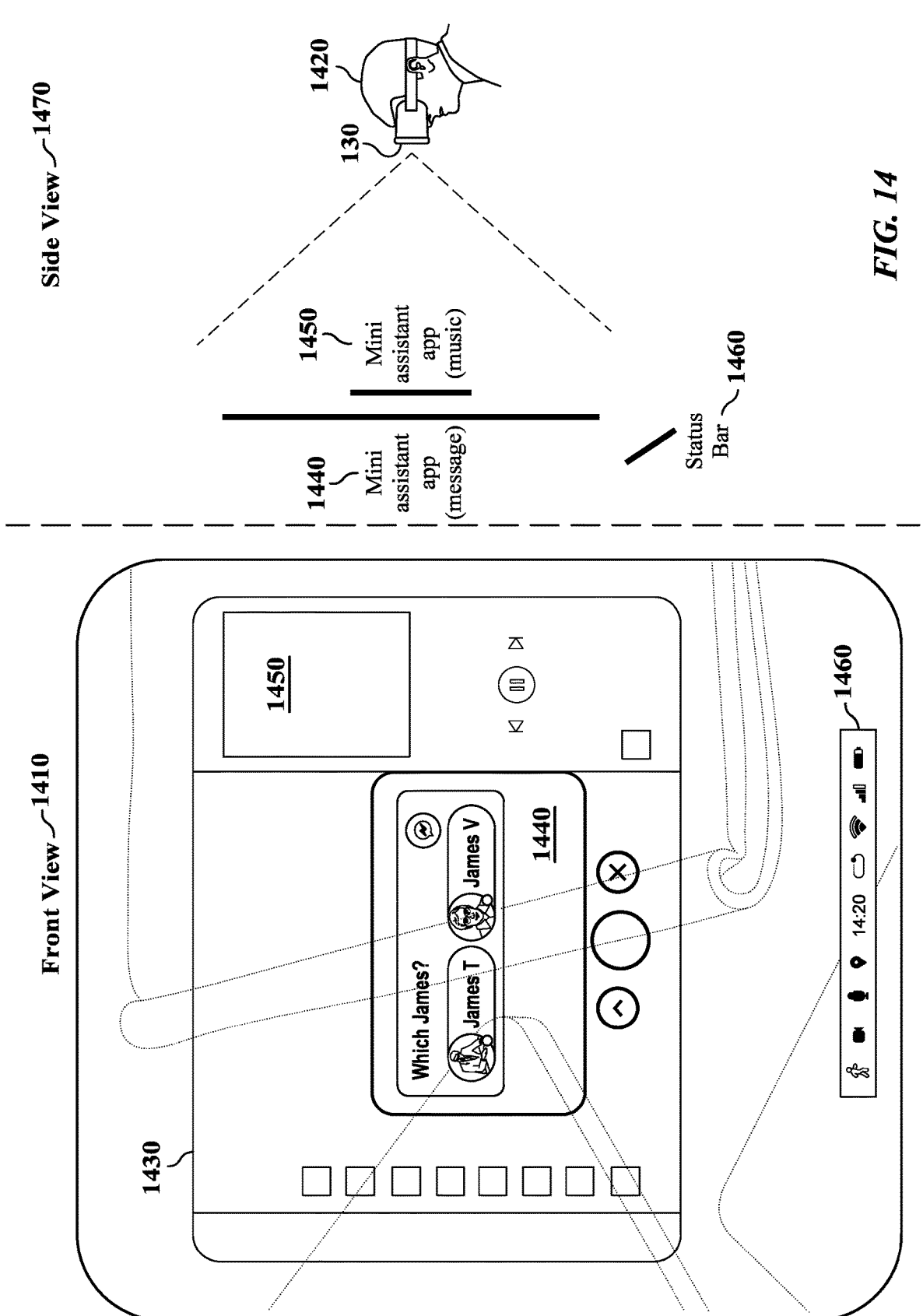
FIG. 14 illustrates an example user interface based on the mini assistant applications.

FIG. 14 illustrates an example user interface based on the mini assistant applications. In FIG. 14, within the front view 1410 of a user 1420 using an AR-based client system 130, the user interface 1430 may display two applications opened by the assistant system 140, one messaging application 1440 and one music application 1450 for the user 1420. The user interface 1430 may also display a status bar 1460 at the bottom. The user 1420 may be focusing on the messaging task now so the AR system 500 may render the representation of the messaging application 1440 more prominently, i.e., in a more forward layer than the music application 1450, as indicated in the side view 1470. Specifically, the side view 1470 shows that both the mini assistant application (music) 1450 and the mini assistant application (message) 1440 may be in the middle of the user's 1420 field of view. However, the mini assistant application (music) 1450 may be at a layer that is more forward than the layer of the mini assistant application (message) 1440. The side view 1460 additionally shows that the status bar 1460 may be at the bottom of the user's 1420 field view and may be at a layer that is more backward than the mini assistant applications. In particular embodiments, the mini assistant application may have several technical advantages including simpler overall interaction models, placing the assistant system 140 on the level of other applications, etc. Although this disclosure describes particular applications of particular systems in a particular manner, this disclosure contemplates any suitable application of any suitable system in any suitable manner.

In particular embodiments, the fourth option for determining how to represent the UI of the assistant system 140 may be having an assistant layer. The assistant layer may comprise an assistant representation and an attention system managing when the assistant system 140 is listening to users. The assistant layer may be based on a hybrid approach that mixes the conversation layer 920 with the invisible assistant concept to support the widest range of use cases of the assistant system 140 on an AR system 500. In particular embodiments, the inputs to the assistant layer may be more user-friendly and the density of UIs may decrease. There may be less need for an overlay and the majority of voice-based experiences may be invisible, i.e., either users are speaking directly to augments and/or the shell/assistant system 140 is proactively surfacing content. The assistant system 140 may combine ASR 208 with NLU 210 and contexts from the shell of the operating system to understand the user's intent. The assistant system 140 may intelligently fulfill each user intent, which may range from complex tasks like "schedule a meeting with Chris tomorrow afternoon" to the simpler "volume up/down." Fulfillment may occur through the assistant layer in the shell. In particular embodiments, the assistant layer may be globally accessible in all power states, and may transition a client system 130 from standby to glance and move forward into the user's field of view, hiding or masking augments behind it to focus on the conversational interaction either in body or world space. In particular embodiments, different intents may be fulfilled in different ways. The assistant layer may enable the assistant system 140 to provide assistant-only features where intents have no corresponding applications, e.g., responding to a user query "when is Chris's birthday?" The assistant layer may also enable the assistant system 140 to provide application actions where the assistant system 140 may use a voice-optimized UI in the assistant layer using an application API, e.g., responding to a user request "tell Justin I'll be there in 5 minutes." The assistant layer may additionally enable the assistant system 140 to provide deep links where intent fulfillment requires taking the user to the application, e.g., responding to a user request "start a video call with Brian." The assistant layer may further enable the assistant system 140 to provide application controls where voice enabled buttons are displayed in the foreground application, e.g., responding to a user request "save". For application actions, deep links, and application controls, the interactions between the user and the assistant system 140 may happen in the assistant layer and there may be body or world space involved for the application controls.

With the assistant layer, the assistant system 140 may be accessed in any power state and context of a client system 130, and there may only ever be instance of it at a time, so a user may consistently interact with it at any time or place. In addition, the assistant system 140 may be one way the shell helps the user mediate their experience with their curated AR world, handling the same tasks across devices and applications in the same way. Furthermore, the assistant system 140 may use contexts to intelligently adapt its responses and route commands to open augments or positions itself in a user's environment. The assistant system 140 may support and promote more natural inputs such as "share this with them" over basic device control commands like "select". The assistant system 140 may combine lightweight voice and GUI to keep people focused on their environment and simplify complex tasks by supporting high-level intents. Although this disclosure describes particular layers of particular systems in a particular manner, this disclosure contemplates any suitable layer of any suitable system in any suitable manner.

The following may be some use cases of the assistant layer. In one use case, the assistant system 140 may help accelerate a user's experience by completing complex, multistep tasks in single interaction by reducing the physical effort or cognitive load into a single, spoken command. These may include some combination of user scenarios that include filling in multiple form fields (e.g., creating a message or reminder) or navigating multiple menus or augments (e.g., searching for media to play or looking for contacts to start a call), user content that is not present within arm's reach, such as an augment or avatar in another space, that occurs when the user is on-the-go and/or in a less frequented space, user tasks that require physical effort, such as accessing an augment on the other side of the room or a physical button press like power state transitions or photo capture. In another use case, the assistant system 140 may help extend the functionality of the AR system 500 for most tasks if a user is busy or disabled in some way, or even when they are immersed in an AR or real-world experience. These may include times when users can't use their hands and/or their eyes, such as when they are driving, cooking, or watching TV, when users are focused on another task and can't give up their cognitive or physical budget to do another task, e.g., when they are on an augmented call and want to look up a question and answering (Q&A) fact, or they are immersed in a game and need to know how much longer they can keep playing, when users and/or the operating system have set the device into a specific state, e.g., "cameras off" or "display off", when only the voice-based assistant system 140 is accessible to the them. Although this disclosure describes particular use cases in a particular manner, this disclosure contemplates any suitable use case in any suitable manner.

In particular embodiments, based on the assistant layer, the assistant system 140 in AR space may change where its representation and response appear to fit within the changing visual environments in the following ways. When stationary, the assistant system 140 may display its attention system and response on a nearby physical surface, oriented to the user. If no surface is available, it may appear in the lower half of the user's field of view. When someone starts moving, it may slide down further in the field of view and follow the rules below. In particular embodiments, if a user is rotating in place, the assistant system 140 may comply with the general "follow" behavior deployed by the shell for head-leashed components. In particular embodiments, if a user is moving to another physical location, the assistant system may display its response on the edge of the field of view with the attention system below the field of view, though the user may look down at it or stop to bring it up in the field of view. In particular embodiments, when immersed in AR, the assistant system 140 may automatically adjust its placement to avoid overlapping any augments that are in focus to avoid obfuscating the user's view and mask others that are not in use. In particular embodiments, when command is associated with a visible augment, the assistant system 140 may adjust it's positioning to be pinned nearby that augment facing the user. Although this disclosure describes adapting particular contents by particular systems in a particular manner, this disclosure contemplates adapting any suitable content by any suitable system in any suitable manner.

In particular embodiments, multiple related applications may be served by the same voice-optimized UI in the assistant layer. Visual attribution, such as a prominently displayed logo, may provide a gesture-based pathway to expand the current assistant layer experience in the corresponding application. Voice attribution, such as saying "you have 2 new messages", may allow users to transition to the application using their voice by saying things like "open this in the messaging application". In particular embodiments, the assistant layer may enable a standard set of lightweight, re-usable components to be used by the assistant system 140 across all assistant-enabled client systems 130. There may be a pattern library of components from the standard set integrated into the design system of each type of client system 130 but rendered in each client system 130 using its native surface's interaction model, as well as its design system and styles.

In particular embodiments, there may be some other options for determining how to represent the UI of the assistant system 140. As an example and not by way of limitation, one option may be moveable glints, in which every user request directed to the assistant system 140 may create a new instance of that application but as a glint. As another example and not by way of limitation, one option may be search and support, in which the assistant system 140 may support global commands like search, navigation, and device control.

In particular embodiments, contextual information from the context engine 220 may be essential for the AR system 500 to determine how to render an AR content. The context engine 220 may maintain contextual information about users. Determining the adaptation of AR content based on context information associated with the user may be an effective solution for addressing the technical challenge of determining how to adapt the rendering of the AR content, as the contextual information may indicate the user states and their environment to enable proactive experiences (e.g., shell, applications, etc.) and assistant use cases. To infer the contextual information, the context engine 220 may use machine-learning microservices that analyze sensor signals to provide context predictions within the system constraints. In particular embodiments, the AR system 500 may further use contextual information to determine the placement of the AR content. As an example and not by way of limitation, the AR system 500 may render the UI of the assistant system 140 in a way that the UI is not overlaid on something the user is focusing on. For example, if the user is watching TV, the UI of the assistant system 140 may be rendered to the side of the TV instead of over it. The AR system 500 may additionally create slots in the user's field of view and figure out what slot to put an AR content in. In particular embodiments, the AR system 500 may determine the context of the first user based on one or more of the one or more sensor signals, a user profile of the first user, or a knowledge graph. In addition, the AR system 500 may determine the context based on the knowledge of the user (e.g., information from the assistant user memory). The AR system 500 may use sensor signals captured by sensors to detect transitions in user state. As an example and not by way of limitation, motion signals may help detect if the user transitioned from sitting to standing. As another example and not by way of limitation, audio signals may help detect if someone is talking to the user. These transitions in user state may then be used to proactively alter the rendering of the AR content. As yet another example and not by way of limitation, when a user arrives at the grocery store, a reminder may appear displaying the user's shopping list. Using different types of sensor signals to determine the context may be an effective solution for addressing the technical challenge of accurately determining the context for adaptive rendering as these sensor signals may provide comprehensive information about a user's environment and state change for accurate context determination. Although this disclosure describes determining particular contexts by particular systems in a particular manner, this disclosure contemplates determining any suitable context by any suitable system in any suitable manner.

Figure 15:
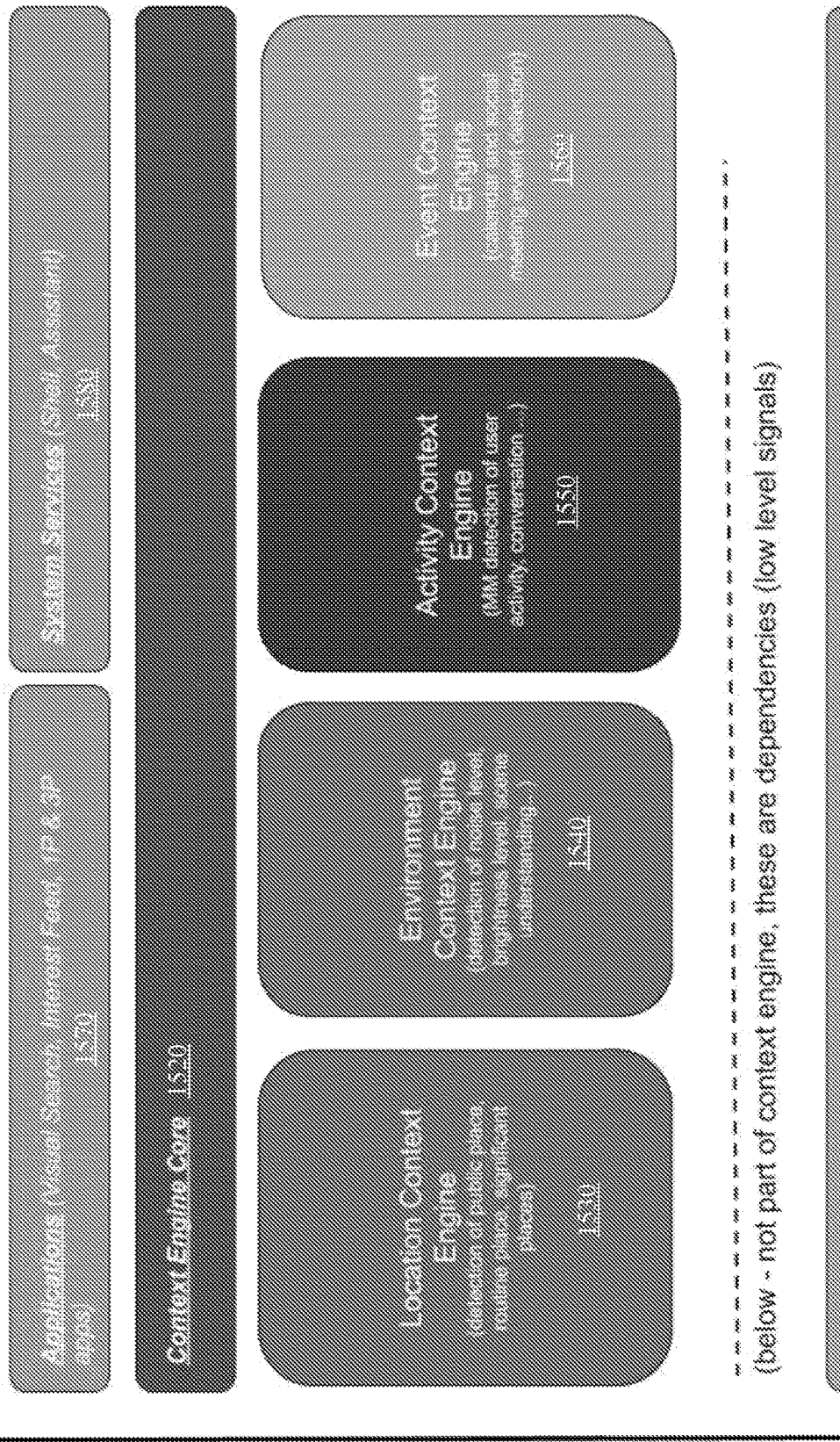
FIG. 15 illustrates an example vertical stack for contextual intelligence.

FIG. 15 illustrates an example vertical stack 1500 for contextual intelligence. In particular embodiments, the context of the first user may be based on one or more of a location associated with the first user, the real-world environment associated with the first user, an activity associated with the first user, or an event associated with the first user. In particular embodiments, the context engine 220 may comprise services and APIs that provide high-level information about the current context of the user and the world. The users of the context engine 220 may include, but not limited to, the operating system shell, the assistant system 140, and the 1st-party or 3rd-party applications. In particular embodiments, the context engine 220 may comprise multiple sub-systems, such as a location context engine, an environment context engine, an activity context engine, and an event context engine. The sub-systems of the context engines may use each other's output for their own analysis (e.g., the output of the location context engine may be an input to the event context engine). As illustrated in FIG. 15, the lowest level may be different sensor services 1510, which may be not part of the context engine 220 but dependent by different types of context engines 220. As an example and not by way of limitation, these sensor services 1510 may comprise IMU service, GPS service, Wi-Fi protected setup (WPS) service, computer vison (CV) service, audio service. The context engine core 1520 may be based on the location context engine 1530, the environment context engine 1540, the activity context engine 1550, and the event context engine 1560. The location context engine 1530 may be responsible for the detection of public place, routine place significant places, etc. The environment context engine 1540 may be responsible for the detection of noise level, brightness level, scene understanding, etc. The activity context engine 1550 may be response for multimodal detection of user activity, conversation, etc. The event context engine 1560 may be responsible for calendar and social meeting event detection. In particular embodiments, the context engine core 1520 may provide information to the applications 1570 (e.g., visual search, interest feed, 1st-party and 3rd-party apps) and system services 1580 (e.g., shell, assistant system 140). In particular embodiments, there may be different types of contexts. As an example and not by way of limitation, sitting, standing, walking, running, driving a vehicle, passenger in a vehicle may be all contexts that characterize user movement. As another example and not by way of limitation, speaking in a conversation and listening in a conversation may both characterize user conversation. Although this disclosure describes particular components of particular context engines in a particular manner, this disclosure contemplates any suitable component of any suitable context engine in any suitable manner.

Figure 16:
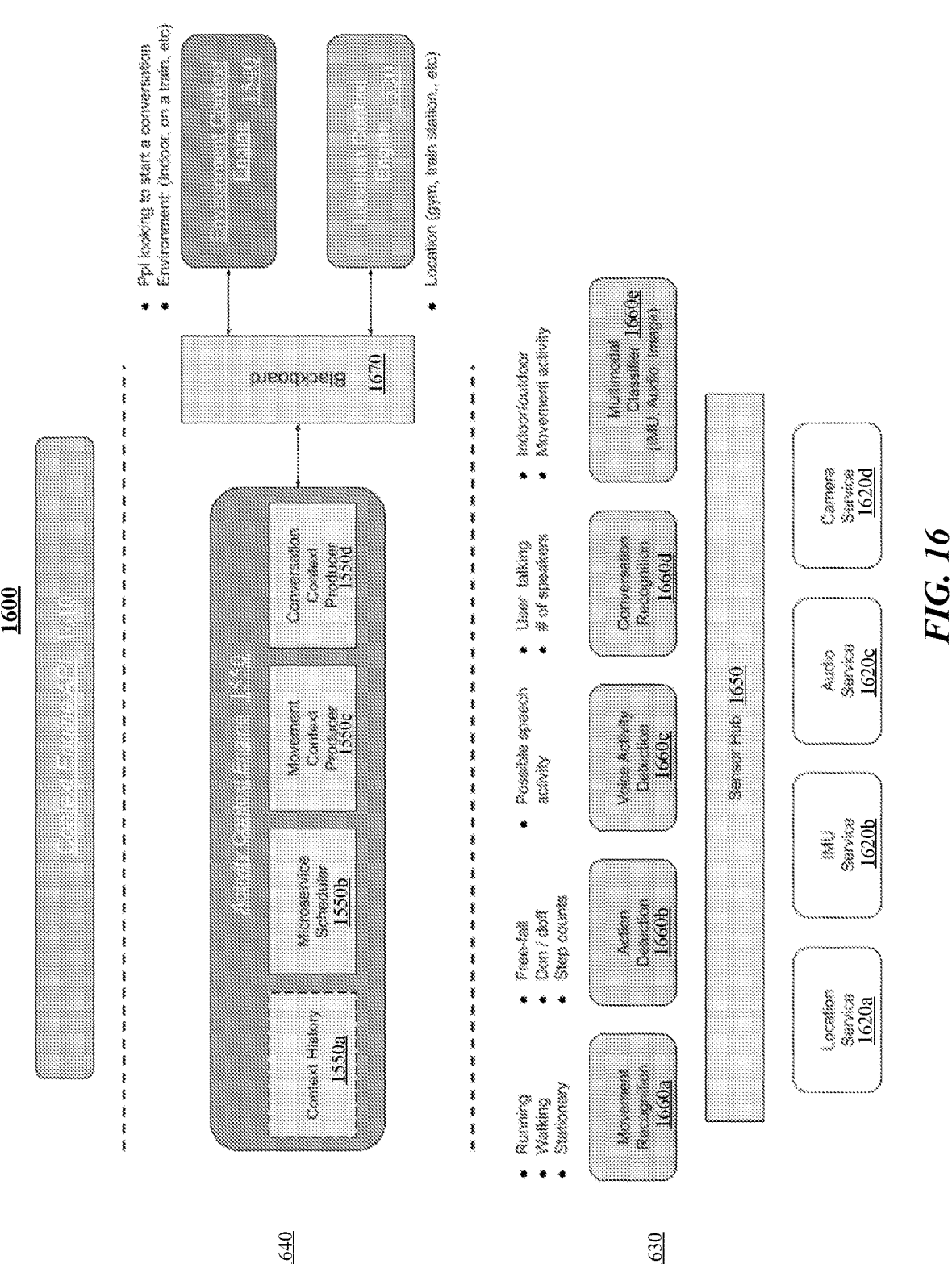
FIG. 16 illustrates an example two-layer architecture of the context engine.

FIG. 16 illustrates an example two-layer architecture 1600 of the context engine. The context engine 220 may facilitate management of application needs and power/privacy constraints. In particular embodiments, inference algorithms (e.g., machine-learning models) may be modeled as microservices such as location service 1620a, IMU service 1620b, audio service 1620c, and camera service 1620d, which make up the bottom layer 1630. These algorithms may generate low-level inference results, which may be shared with one or more domain context engines. The top layer 1640 may schedule the execution of those microservices, and output high-level context signals by fusing low-level inference results with contextual information from other domains. In particular embodiments, the data flow may be unidirectional, from bottom to top. A microservice may not need feedback from any domain context engines or microservices. In the case where certain inference may benefit from using more than one type of sensor, a new microservice may be added, which directly subscribes to those sensors, instead of introducing cross-microservice dependencies. Although this disclosure describes particular architectures of particular context engines in a particular manner, this disclosure contemplates any suitable architecture of any suitable context engine in any suitable manner.

In particular embodiments, the execution of microservices may be dependent of a number of factors as follows. A microservice may remain deactivated when no one subscribes to relevant contexts. A microservice may be deactivated if its hardware dependencies can no longer be met (e.g., broken sensors, system going to low-power mode, device going to privacy mode, etc.). A microservice may be deactivated if its power consumption exceeds the budget set by current power mode. A microservice may be executed on a one-off basis as needed, or scheduled to run a predetermined number of times per second/minute/hour, etc. The scheduling frequency of a microservice may be dynamically adjusted (e.g., to meet latency requirements in certain scenarios or to service high-priority inquiries). Although this disclosure describes executing particular services in a particular manner, this disclosure contemplates executing any suitable service in any suitable manner.

In particular embodiments, the sensor hub 1650 may efficiently manage sensors and dispatch sensor signals. The movement recognition module 1660a may be a microservice for detecting continuous movements (walking, running, etc.) using IMU signals. The action detection module 1660b may be a microservice for detecting transient movements (free-fall, don/doff, etc.) using IMU sensor signals. In particular embodiments, the voice activity detection module 1660c may be a microservice for detecting possible speech activities using mic signals. The conversation recognition module 1660d may be a microservice for conversation context inference. The multimodal classifier 1660e may be a placeholder for microservices that utilize multiple sensor streams.

In particular embodiments, the blackboard 1670 may be a shared storage accessed by all domain context engines, for avoiding dependency loop or deadlocks. The movement context producer 1550c may generate movement contexts, using microservice results as well as other domain contexts. The conversation context producer 1550d may generate conversation contexts, using microservice results as well as other domain contexts. In particular embodiments, the context history module 1550a may comprise a buffer for maintaining a short history (e.g., one day) of movement contexts. The microservice scheduler 1550b may schedule a microservice to run a predetermined number of times per second/minute/hour, etc. In particular embodiments, the activity context engine 1550 may provide a set of subscription-based API 1610, and applications may receive notifications when changes are detected in their subscribed contexts.

Figure 17:
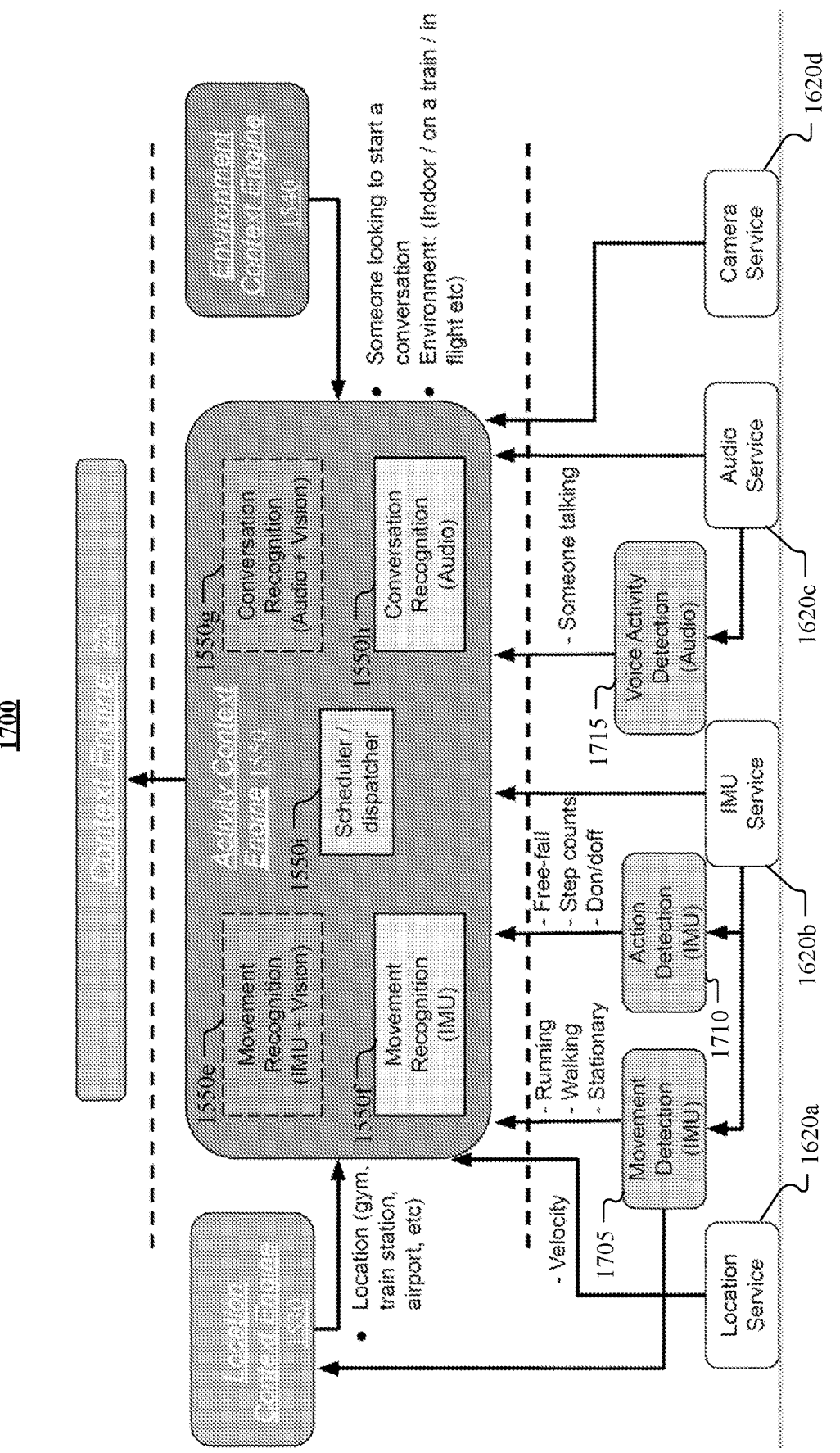
FIG. 17 illustrates an example block diagram for the activity context engine.

FIG. 17 illustrates an example block diagram 1700 for the activity context engine. As illustrated in FIG. 17, the location context engine 1530, activity context engine 1550, and environment context engine 1540 may depend on different microservices such as location service 1620a, IMU service 1620b, audio service 1620c, and camera service 1620d. Location service 1620a may provide velocity to the activity context engine 1550. IMU service 1620b may provide information for movement detection 1705 and action detection 1710. Running, walking, stationary, etc. may be detected by the movement detection 1705 whereas free-fall, step counts, etc. may be detected by the action detection 1710. The output from the movement detection 1705 and action detection 1710 may be provided to the activity context engine 1550. In particular embodiments, the IMU service 1620b may provide information directly to the activity context engine 1550 without movement detection 1705 and action detection 1710. The audio service 1620c may provide information for voice activity detection 1715, which may detect, e.g., someone is talking. The output from voice activity detection 1715 may be provided to the activity context engine 1550. In particular embodiments, the audio service 1620c may provide information directly to the activity context engine 1550. The camera service 1620d may provide information to the activity context engine 1550. As illustrated in FIG. 17, the activity context engine 1550 may also get contexts from the location context engine 1530 and the environment context engine 1540. As an example and not by way of limitation, the location context engine 1530 may provide location information such as gym, train station, airport, etc. to the activity context engine 1550. As another example and not by way of limitation, the environment context engine 1540 may provide information such as someone looking to start a conversation and environment information (e.g., indoor, on a train, in flight, etc.) to the activity context engine 1550. In particular embodiments, the activity context engine 1550 may comprise movement recognition 1550e based on IMU and vision signals, movement recognition 1550f based on IMU signals only, conversation recognition 1550g based on audio and vision signals, and conversation recognition 1550h based on audio signals only. The activity context engine may further comprise a scheduler/dispatcher 1550i. The activity contexts from the activity context engine 1550 may be further provided to the context engine 220. Although this disclosure describes particular block diagrams of particular context engines in a particular manner, this disclosure contemplates any suitable block diagram of any suitable context engine in any suitable manner.

In particular embodiments, the activity context engine 1550 may produce contexts that describe user activities such as walking, running, driving and conversations. A set of machine-learning models may be used to generate such contexts from different combinations of sensor modalities. In particular embodiments, the contexts may reflect continuous activities (e.g., running) instead of transient actions (e.g., waving hands). In particular embodiments, the activity context engine 1550 may be responsible for two types of activities, namely movement activities and conversation activities. The movement contexts corresponding to movement activities may be characterized by a user's moving speed, from low to high. The following may be some example categories of movement contexts. One example category may be "still" (e.g., standing, sitting, lying on the bed, etc.). This category may be further broken down (e.g., lying, standing, sitting) but the inference may require movement histories and/or multimodal input to build confidence. Another example category may be "walking" (e.g., walking upstairs, walking on the street, etc.). Another example category may be "running" (e.g., jogging, sprinting, etc.) Another example category may be "in moving vehicle" (e.g., in a car, riding a bike, on a train, etc.) For this category, the contexts may be deactivated a while after the vehicle stopped moving. If a user is walking on a train, both "walking" and "in moving vehicle" may activate. Another example category may be "driving" (e.g., driving a car). For this category, the user may be the operator of a car, but the vehicle may be not necessarily moving. For safety considerations, a user may be always assumed to be the driver, until proven otherwise. The movement contexts may be not necessarily mutually exclusive. As an example and not by way of limitation, a user driving a car may activate both "in moving vehicle" and "driving". Although this disclosure describes particular contexts in a particular manner, this disclosure contemplates any suitable context in any suitable manner.

The conversation contexts may correspond to the conversation activities. The following are some example category of conversation contexts. One example category may be "speaking" (e.g., giving a presentation, having a phone call, in a conversation with nearby people, etc.) For this category, the activity context engine may determine "talking" with audio signals when a particular user is talking. However, the activity context engine may need visual signals to differentiate between a presentation, a phone call, and a conversation with nearby people. Another example category may be "local conversation" (e.g., in a conversation with nearby people). The activity context engine may determine this category only when a user is actively engaged in the conversation. With audio-based models, the activity context engine may tell whether the user is facing someone who is talking or whether the user is talking. The activity context engine may use visual signals for the final check, if higher confidence is needed. In particular embodiments, the conversation contexts may be not mutually exclusive.

In particular embodiments, there may be battery impact for generating movement contexts and conversation contexts. Two types of operations may be considered in the modeling, i.e., always-on and on-demand. For each type of operation, the power consumption may comprise one or more of a sensor operation or an executing inference algorithm. Table 2 illustrates example inference costs of different contexts.

TABLE 2

| | Inference Costs of Contexts. | | | |
|---|---|---|---|---|
| Context | Always-On Sensor(s) | Always-On Power (Megawatt) | On-Demand Sensor(s) | On-Demand Power (Minecraft Joules) |
| Still, Walking, Running | IMU | 3.12 (D) | | |
| In Moving Vehicle | IMU | 3.12 (D) | GPS | 810 (D) |
| Driving | IMU | 3.12 (D) | Camera | 173 (D) |
| Talking | Mic | 27.4 (D) 33.4 (S) | | |
| Local Conversation | Mic | 27.4 (D) 33.4 (S) | Camera | 173 (D) 325 (S) |

Table 3 illustrates example capabilities of activity context engine 1550 in different power modes on an example client system 130. In particular embodiments, the example client system 130 may comprise smart glasses. As an example and not by way of limitation, the smart glasses may have a plurality of cameras, a plurality of IMUs and a plurality of microphones. In particular embodiments, the example client system 130 may additionally comprise a smart remote. The smart remote may be a computer input device that contains glass or magnified glass with a crosshair, allowing users to accurately trace an object or perform precision drawing. As an example and not by way of limitation, the smart control may have a plurality of cameras, one or more IMUs, one or more altimeters, and one or more GPS. In particular embodiments, all sensors of the smart glasses may be available in "glance" and "active", and only IMU and mic may be available in "standby". In particular embodiments, all sensors of the smart control may be available in "active" and only IMU, altimeter and GPS may be available in "standby". In particular embodiments, the context engine 220 may temporarily request a higher power state for data acquisition.

TABLE 3

| | Activity Context Engine (ACE) Capabilities vs. Power Modes. | | |
|---|---|---|---|
| Glasses State | Smart Control State | ACE Capabilities | Notes |
| Off/Sleep | Off | N/A | No sensor or compute available. |
| Off/Sleep | Standby | Still Walking Running In Moving Vehicle | No mic available. |
| Off/Sleep | Active | Still Walking Running In Moving Vehicle | No mic available. Using Stage IMU for movement contexts |

TABLE 3-continued

Activity Context Engine (ACE) Capabilities vs. Power Modes.

| Glasses State | Smart Control State | ACE Capabilities | Notes |
|---|---|---|---|
| Standby | Off | N/A | No sensor or compute available. |
| Standby | Standby | Still Walking Running In Moving Vehicle Talking Local Conversation | Using glasses and/or puck IMU for movement contexts. |
| Standby | Active | (Full feature set) Still Walking Running In Moving Vehicle Driving Talking Local Conversation | Using glasses and/or puck IMU for movement contexts. To produce glasses context, the AR system may put the glasses into glance mode, take a picture, and then get back to standby mode. |
| Glance | Off | N/A | No sensor or compute available. |
| Glance | Standby | Full feature set | |
| Glance | Active | Full feature set | |
| Active | Off | N/A | No sensor or compute available. |
| Active | Standby | Full feature set | |
| Active | Active | Full feature set | |

Figure 18:
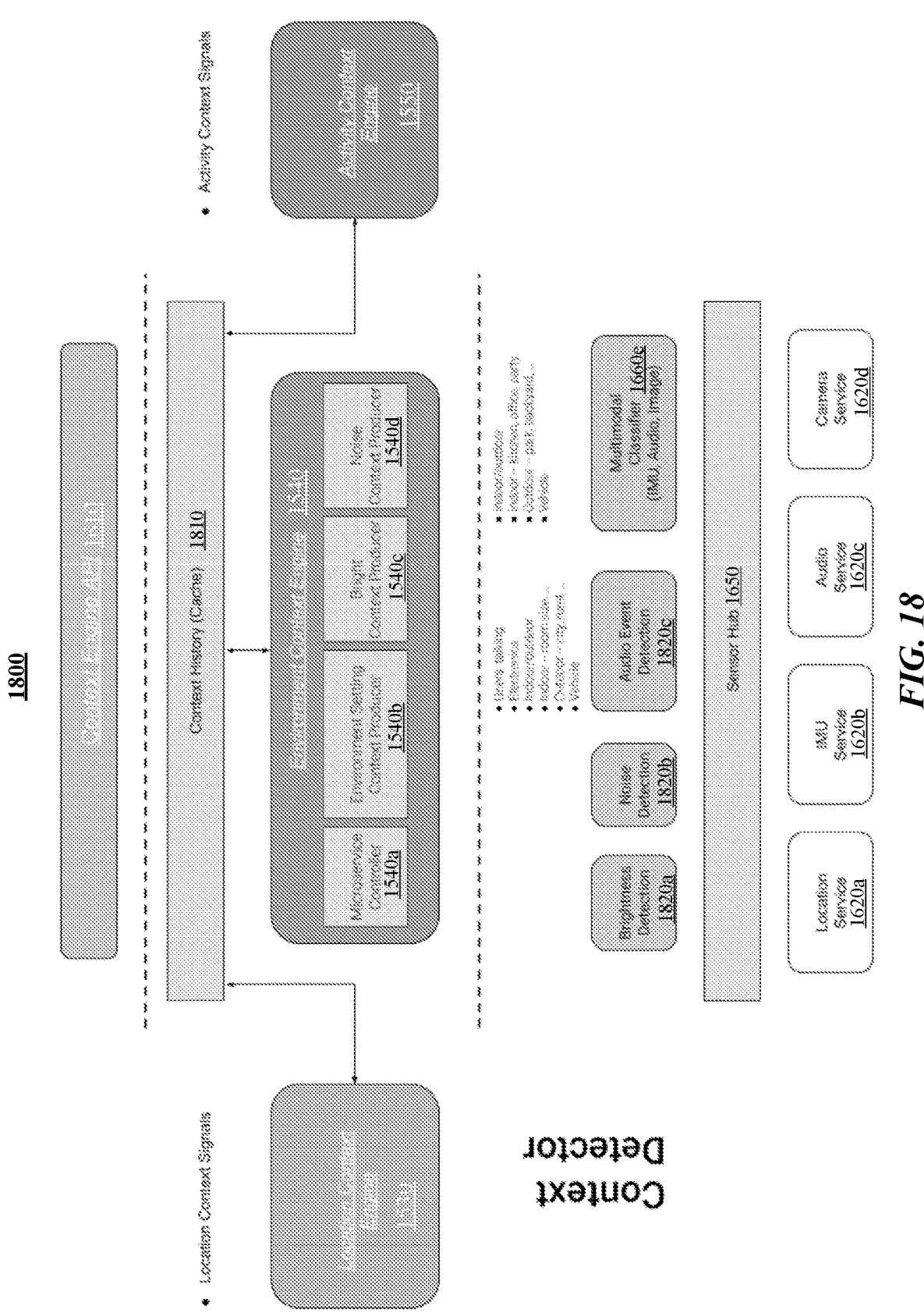
FIG. 18 illustrates an example block diagram for the environment context engine.

FIG. 18 illustrates an example block diagram 1800 for the environment context engine. As illustrated in FIG. 18, the machine-learning models may be in a sensor analysis layer (i.e., sensor hub 1650 as indicated in FIG. 18), which may comprise all the microservices that context engines (environment context engine 1540 as well as others) may subscribe to get multimodal as well as unimodal analysis. These microservices may comprise location service 1620*a*, IMU service 1620*b*, audio service 1620*c*, and camera service 1620*d*. By separating the machine-learning models from each individual context engine, the context engine 220 may co-schedule the recurring analysis of different sensors. In particular embodiments, contexts may be determined through multiple different sensors and they may provide different levels of accuracy and cost. As a result, the environment context engine 1540 may differentiate between vision-based and audio-based analysis. In particular embodiments, the environment context engine 1540 may have dependency on the location context engine 1530 and the activity context engine 1550. The dependency may be via a context history cache 1810, which may receive and update the location contexts with respect to the location content engine 1530 and activity contexts with respect to the activity context engine 1550, respectively. In particular embodiments, the environment context engine 1540 may have a control finite-state machine (FSM) that will control how often different blocks get invoked to find the best accuracy versus cost tradeoff. In FIG. 18, the inputs to the environment context engine 1540 may comprise analysis output of different sensors from sensor analysis services, including brightness detection 1820*a*, noise detection 1820*b*, audio event detection 1820*c*, multimodal classifier 1660*e* based on IMU signals, audio signals and images. As an example and not by way of limitation, the analysis output of audio event detection 1820*c* may comprise users talking, electronics, indoor/outdoor, room size if indoor, city or rural if outdoor, vehicle. As another example and not by way of limitation, the analysis output of multimodal classifier 1660*e* may comprise indoor/outdoor, kitchen, office, or party if indoor, park or backyard if outdoor, vehicle. In particular embodiments, the internal producer blocks may control which microservices to subscribe and the frequency to infer the contexts at desired accuracy and latency. In particular embodiments, the environment context engine 1540 may comprise a microservice controller 1540*a*, an environment setting context producer 1540*b*, a bright context producer 1540*c*, and a noise context producer 1540*d*. Although this disclosure describes particular block diagrams of particular context engines in a particular manner, this disclosure contemplates any suitable block diagram of any suitable context engine in any suitable manner.

In particular embodiments, the environment context engine 1540 may infer different environment contexts. As an example and not by way of limitation, Table 4 lists some of these contexts.

TABLE 4

Contexts inferred by the environment context engine.

| Context | Explanation |
|---|---|
| Noise | Infer whether the user is in a quiet or noisy environment |
| Indoor or outdoor | Infer whether the user is indoor or outdoor |
| Indoor setting | Infer the type of indoor setting (e.g., kitchen, living room, front door, etc.) |
| Outdoor setting | Infer the type of outdoor setting (e.g., street, backyard, etc.) |
| In a vehicle | Infer whether the user is in a vehicle |
| Vehicle | Infer what kind of vehicle is the user in |
| Too bright | Infer whether the user is in a bright environment |
| Too lowlight | Infer where the user is in a lowlight environment |

In particular embodiments, there may be multiple ways for the environment context engine 1540 to infer contexts based on IMU signals, audio signals, vision signals, and location signals. As an example and not by way of limitation, Table 5 lists some of the ways for inferencing some contexts.

TABLE 5

| Contexts inferred based on different signals. | | | | |
|---|---|---|---|---|
| | | Signals | | |
| Context | IMU | Location | Audio | Visual |
| Noise | | N/A | Yes | N/A |
| Indoor or outdoor | Yes | Location may provide first-level signals: i) Movement ii) Signal strength. They may be expensive so may be not always on. | Audio event detection | Scene understanding i) Camera captured images/videos with a small machine-learning model may provide high confidence inference. ii) Camera may be too expensive to be always on but may need to be smartly triggered. |
| Indoor setting | | 3D location map | Audio event detection (e.g., room sizes, animal sounds, electronics, alarms, etc.) | Scene understanding (e.g., kitchen, library, patio, furniture, etc.) |
| Outdoor setting | Yes | Location context engine may provide first-level signals but may need confirmation from other modalities before notification. | Audio event detection (e.g., animal sounds, construction, fire truck/ambulance, rural, etc.) | Scene understanding, which may provide very detailed information of objects, animals, things, actions (e.g., skating, dancing) and settings (e.g., backyard) |
| Vehicle | Yes | Location context engine may provide first-level signals | Audio event detection (e.g., vehicle type based on sound) | Scene understanding (e.g., vehicle type) |
| Too bright | | N/A | N/A | Yes |
| Too Lowlight | | N/A | N/A | Yes |

In particular embodiments, the environment context engine 1540 may additionally consider sensor cost and sensor availability when inferring contexts. In particular embodiments, the sensor cost may be the energy cost of activating these sensors. The sensor cost may be different for different sensors, especially in the standby mode. As an example and not by way of limitation, visual signals may be the most expensive because they may need camera capture and high-volume data transfer. As another example and not by way of limitation, audio signals with small amounts of machine-learning processing may be relatively cheap because always-on audio processing and machine-learning models on the compact client systems (e.g., smart glasses) are already available. As yet another example and not by way of limitation, cost of location signals may depend on the sensor being accessed and its cost tradeoffs may be covered in the location context engine. In particular embodiments, the sensor availability may indicate that some of the sensors may be turned off in certain privacy modes. This may impact context availability and fidelity in certain privacy settings.

TABLE 6

| Context inference in standby and transitions. | | | |
|---|---|---|---|
| | | Mode | |
| Context | Maintain in standby | Transition triggers | Infer in standby |
| Noise | Audio | N/A | Audio |
| Indoor or outdoor | Audio event detection, IMU for motion | Location coordinates may change "significantly" or IMU may show motion and audio prediction may change | IMU + Audio with machine learning |
| Indoor setting | Audio event detection, IMU for motion | Audio may predict a change and IMU may claim movement | Audio based machine learning |
| Outdoor setting | Audio event detection, IMU for motion, Location coordinates from location services | Location coordinates change "significantly" or IMU may show motion and audio prediction may change | Audio based machine learning |

TABLE 6-continued

| Context inference in standby and transitions. | | | |
|---|---|---|---|
| | Mode | | |
| Context | Maintain in standby | Transition triggers | Infer in standby |
| Vehicle | Audio event detection, motion from IMU (e.g., moving fast) | IMU-based action/motion prediction may change and audio prediction may change | IMU motion prediction (e.g., fast) and audio prediction (e.g., small room). |
| Too bright | N/A | N/A | |
| Too lowlight | N/A | N/A | |

In particular embodiments, the environment context engine 1540 may infer the contexts in standby using low-power sensors and conditions which will trigger a transition request to a higher power state. Table 6 lists example context inference in standby and transitions. To improve the inference confidence of the contexts in the high-accuracy mode, the environment context engine 1540 may request transition to a higher power state and perform the following example operations in that state. The environment context engine 1540 may read camera frames (e.g., at 2 frames per second for 10 seconds), which may be used as visual signals to understand the user environment. The environment context engine 1540 may read the output from the location context engine for the current location and "in-transit" status. The environment context engine 1540 may send audio signals for fine-grained event detection and person voice signatures. In particular embodiments, the environment context engine 1540 may additionally consider the cost of running context engine 220 on the application processor and the cost of power state transitions. To maintain the inference confidence of the contexts in the standby mode, the environment context engine 1540 may use audio and IMU (if available) signals to maintain confidence. Although this disclosure describes inferring particular contexts in a particular manner, this disclosure contemplates inferring any suitable context in any suitable manner.

In particular embodiments, the context engine 220 may maintain high-confidence contexts primarily using cheap modalities and sparingly using expensive visual signals. The context engine 220 may also minimize latency of determining changes in user environment and actions. In particular embodiments, the machine-learning microservices may use self-supervised training when possible to leverage all available data. The context engine 220 may further enable for on-device personalization of models.

In particular embodiments, the AR system 500 may take into account the tradeoff between resource usage and accuracy or latency. The AR system 500 may minimize the power consumption and memory footprint but may temporarily expend more resources in order to deliver high accuracy or low latency. In particular embodiments, both latency and accuracy may be important. Therefore, the AR system 500 may start with lower confidence, then gradually increase confidence level as more sensor signals come in. Given the aforementioned considerations, detecting the change in the context of the first user with respect to the real-world environment may be further based on a cascaded inference process of the change in the context. The cascaded inference process may be based on the one or more sensor signals. In particular embodiments, the cascaded inference process may be determined based on one or more sensor constraints associated with each of the one or more sensors. The one or more sensor constraints may constrain usage of the one or more sensor signals by the cascaded inference process. Because of the sensor constraints (e.g., battery) on AR devices, when determining the contextual information, the AR system 500 may run models with cheapest modality (usually IMU and audio) first to make classifications and avoid using vision if possible since that's expensive.

In particular embodiments, the cascaded inference process may be based on one or more unimodal baseline models and one or more fusion models. Each of the unimodal baseline models may be based on one or more motion signals, location signals, audio signals, or vision signals. Each of the fusion models may be based on two or more of the motion signals, the location signals, the audio signals, or the vision signals. In particular embodiments, the fusion model may use different strategies to combine the result from each type of signal. As an example and not by way of limitation, the fusion model may use late fusion, either at the feature level or the score level.

In particular embodiments, the cascaded inference process may be determined based on one or more policies defining one or more configurations of the cascaded inference process. As an example and not by way of limitation, one policy may be using cheap modalities (e.g., IMU signals, audio signals) as triggers. As another example and not by way of limitation, another policy may be choosing a model based on the recent context(s). As yet another example and not by way of limitation, another policy may be using a low-cost model by default. The AR system 500 may use a cascaded inference process, going from cheaper models (e.g., based on motion signals from IMU and/or audio signals) to more expensive models (e.g., based on vision signals) while trying to make inference, until the system reaches a high enough confidence to make a decision. In particular embodiments, the cascaded inference process may be based on different approaches. In one embodiment, the cascaded inference process may be based on heuristics (e.g., score thresholding). The context engine 220 may identify some heuristics around scores from the IMU models or IMU and audio models. If the heuristics are satisfied (e.g., score exceeds a threshold for a number of milliseconds") then the expensive model may not be used. In another embodiment, the cascaded inference process may be based on a learned approach where a lightweight and heavy model are learned together. The lightweight model may learn to choose the optimal signals to send to the heavy model. This approach may be applied to the activity and environment contexts in a real-time, online setting. In yet another embodiment, the cascaded inference process may be audio triggered. This approach may use audio as an efficient preview for video understanding and also explore image-audio based video understanding. Using a cascaded inference process may be an effective solution for addressing the technical challenge of taking the most use of the limited computing power of a compact client system 130 as cheaper sensor signals are used first and more expensive sensor signals are used later, thereby gradually increasing the utilization of the limited computing power to make the best use of it.

In particular embodiments, detecting the change in the context of the first user with respect to the real-world environment based on the cascaded inference may comprise the following steps. The AR system 500 may first calculate, based on one or more of the unimodal baseline models, a first confidence score associated with the change in the context of the first user with respect to the real-world environment. The AR system 500 may then determine whether the first confidence score is greater than a threshold score. Based on the determining of whether the first confidence score is greater than the threshold score, the AR system 500 may operate as follows. If the first confidence score is greater than the threshold score, the AR system 500 may confirm the change in the context of the first user with respect to the real-world environment. Else, the AR system 500 may calculate, based on one or more of the fusion models, a second confidence score associated with the change in the context of the first user with respect to the real-world environment. If the second confidence score is greater than the threshold score, the AR system 500 may confirm the change in the context of the first user with respect to the real-world environment. As an example and not by way of limitation, if the user is sitting in the couch looking at an AR content and then stands up, the AR system 500 may first use a movement detection model based on IMU signals to detect if the user has stood up. If the confidence is low, the AR system 500 may then use a more expensive model based on vision (e.g., turning on cameras to quickly take a few frames) for the detection. Once the AR system 500 confirms that the user stood up, it may minimize/hide/fade out the AR content so that the user can move within the real world. As another example and not by way of limitation, if the user is listening/watching content and then someone starts talking to the user, the AR system 500 may first use a voice activity detection model based on audio to determine if someone is talking to the user. If the confidence is low, the AR system 500 may use a more expensive model based on vision (e.g., if someone is looking at the user while speaking) for such detection. Once the AR system 500 confirms that someone is talking to the user, it may minimize/hide/fade out the content and/or turn down the volume so they can communicate.

In particular embodiments, the AR system 500 may use self-supervision for learning models to detect the change in the context. As an example and not by way of limitation, for vision and audio separately, the AR system 500 may use existing weakly-supervised pretraining schemes (e.g., hashtags) to obtain strong features. As another example and not by way of limitation, for IMU data the AR system 500 may use videos with synchronized IMU and vision streams. The AR system 500 may pretrain IMU features using cross-modal supervision to obtain representations. Although this disclosure describes determining particular changes of context by particular systems in a particular manner, this disclosure contemplates determining any suitable change of context by any suitable system in any suitable manner.

Figure 19A:
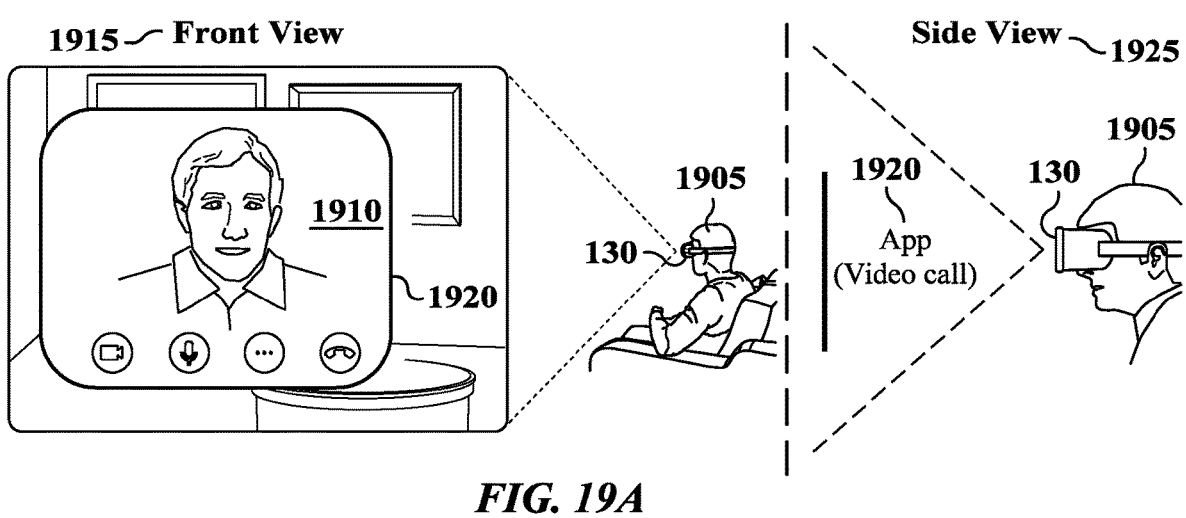
FIG. 19A illustrates an example rendering of a video call for a user sitting in the couch.
Figure 19B:
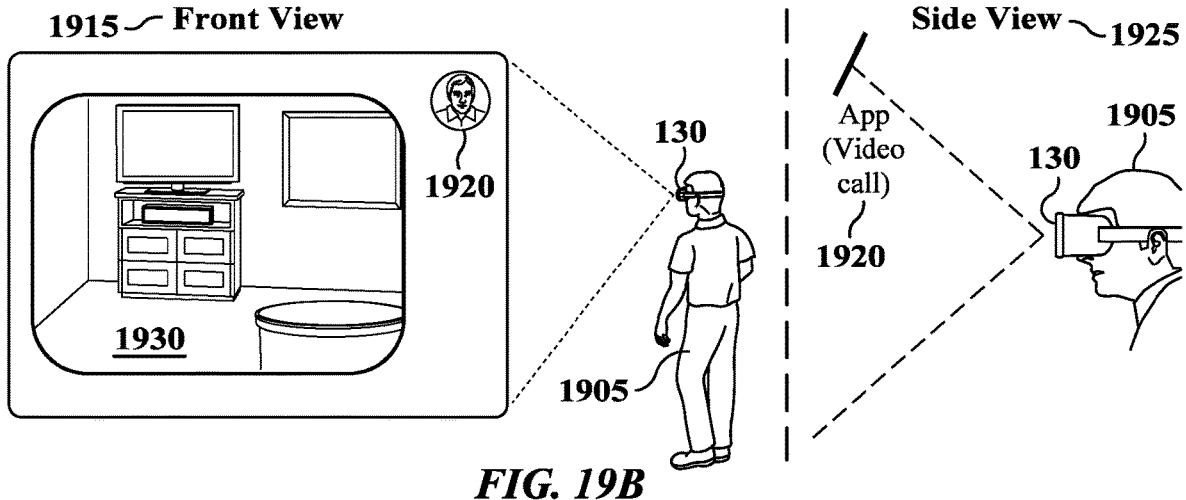
FIG. 19B illustrates an example change of the rendering of AR content after the user stands up.
Figure 19C:
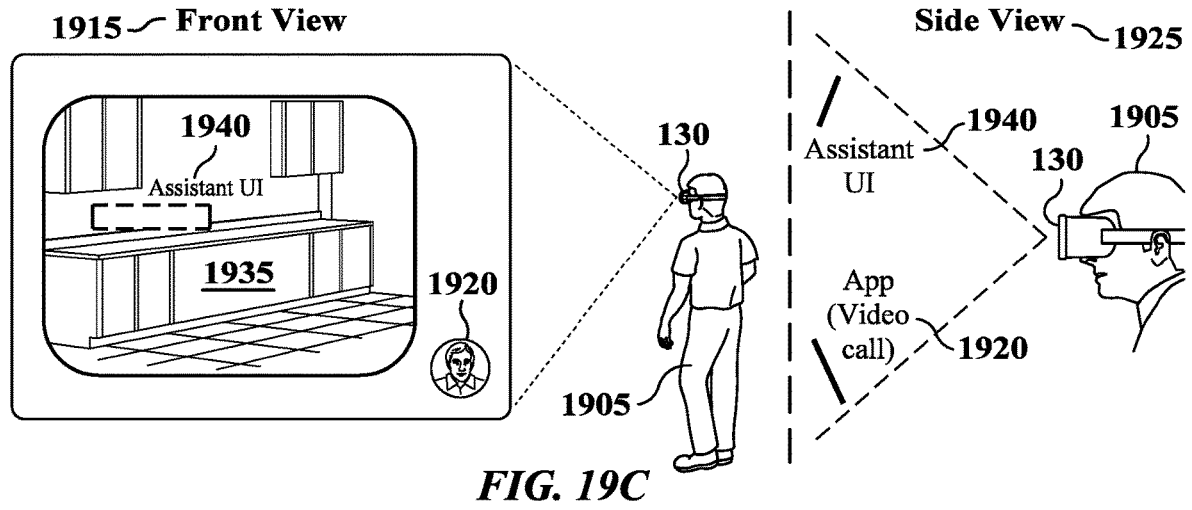
FIG. 19C illustrates another example change of the rendering of AR content after the user gets to the kitchen.

FIGS. 19A-19C illustrate an example dynamic rendering of AR content. FIG. 19A illustrates an example rendering of a video call for a user sitting in the couch. A user 1905 may be sitting in the couch in the living room. The user 1905 may be wearing smart glasses as the client system 130 and having a video call with another user 1910. Within the front view 1915, the application 1920 of the video call may be displayed for the user 1905. The side view 1925 shows that the application 1920 of the video call may be in the middle of the user's 1905 field of view. FIG. 19B illustrates an example change of the rendering of AR content after the user stands up. Since the user 1905 starts to move around, the AR system 500 may adapt the rendering of the AR content. As indicated in FIG. 19B, within the front view 1915, the application 1920 of the video call may be changed to be much smaller at the top right corner so that it won't block the user's 1905 view while the user 1905 is moving. The user 1905 may still be able to continue chatting with another user 1910. However, the user 1905 may now see the real-world scene 1930 of the user's 1905 living room. The side view 1925 shows that the application 1920 of the video call may be now at the top of the user's 1905 field of view. FIG. 19C illustrates another example change of the rendering of AR content after the user gets to the kitchen. As indicated in FIG. 19C, within the front view 1915, the application 1920 of the video call may be still small but now at the bottom right corner so that it won't block the user's 1905 view. The user 1905 may now see the kitchen counter 1935. An assistant UI 1940 may be displayed overlaying the kitchen counter 1935 so that the user 1905 may easily ask for the assistant system 140 to execute different tasks related to the kitchen (e.g., checking the timer of the oven). The side view 1925 shows that the application 1920 of the video call may be now at the bottom of the user's 1905 field of view while the assistant UI 1940 may be at the top of the user's 1905 field of view.

Figures 20A, 20B, 20C:
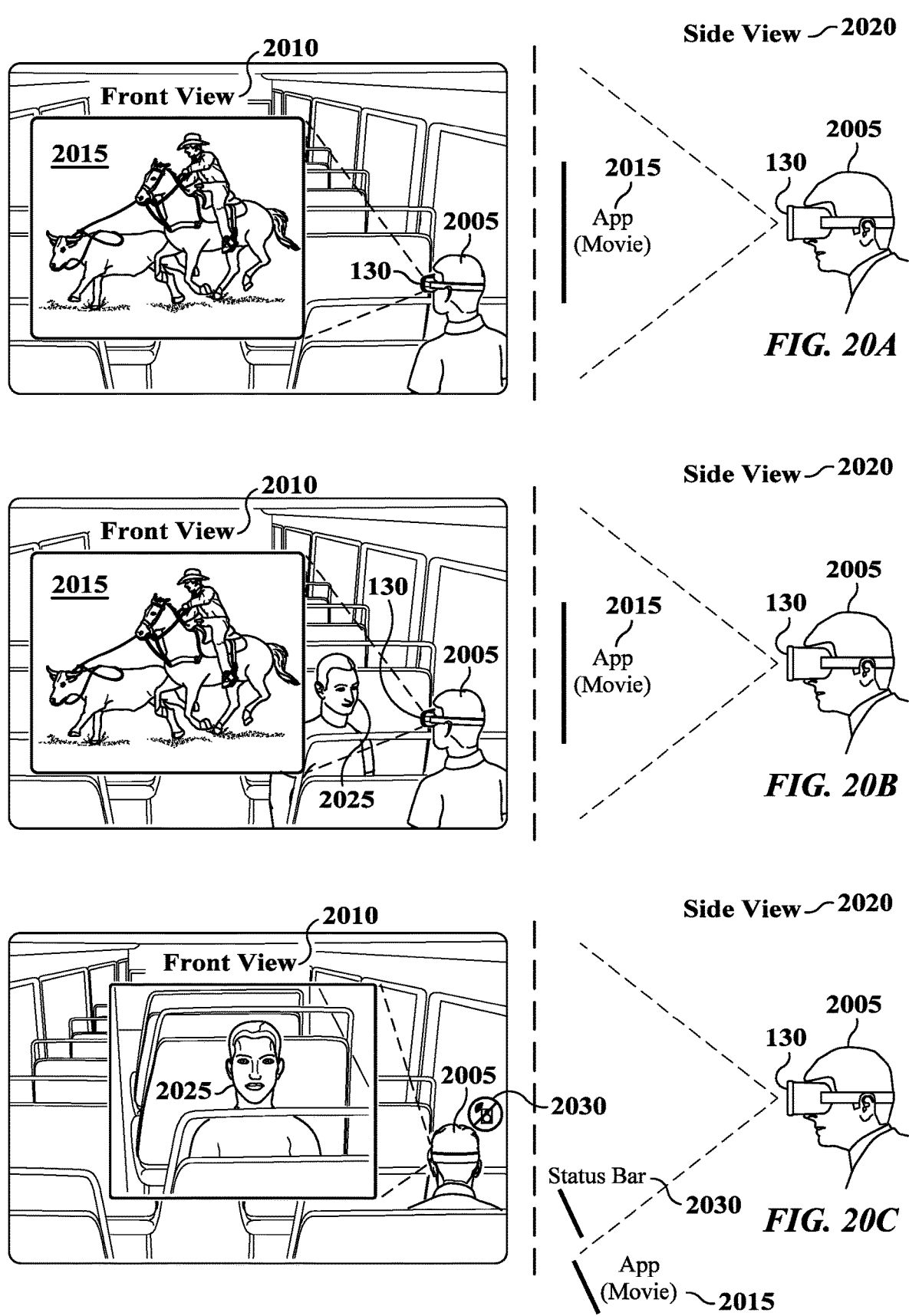
FIG. 20A illustrates an example rendering of a movie for a user in a bus.
FIG. 20B illustrates an example change of the rendering of AR content after someone starts talking to the user.
FIG. 20C illustrates an example change of the rendering of AR content after the AR system determines someone is talking to the user.

FIGS. 20A-20C illustrate another example dynamic rendering of AR content. FIG. 20A illustrates an example rendering of a movie for a user in a bus. The user 2005 may be wearing smart glasses as the client system 130 watching a movie. Within the front view 2010, the application 2015 of the movie may be displayed for the user 2005. The side view 2020 shows that the application 2015 of the movie may be in the middle of the user's 2005 field of view. FIG. 20B illustrates an example change of the rendering of AR content after someone starts talking to the user. As indicated in FIG. 20B, another person 2025 may start talking to the user 2005. At this point, the rendering of the AR content may haven't been adapted yet. FIG. 20C illustrates an example change of the rendering of AR content after the AR system determines someone is talking to the user. As indicated in FIG. 20C, the user 2005 may have turned to look at this person 2025. Within the front view 2010, the user 2005 may only see the real-world scene, e.g., person 2025. The user 2005 may also see a status bar 2030 showing the sound of the movie is disabled. The side view 2020 shows that the application 2015 of the movie may be now invisible from the user's 2005 field of view whereas the status bar 2030 is at the bottom. The status bar 2030 may be also more forward than the application 2015 of the movie.

Figures 21A, 21B, 21C:
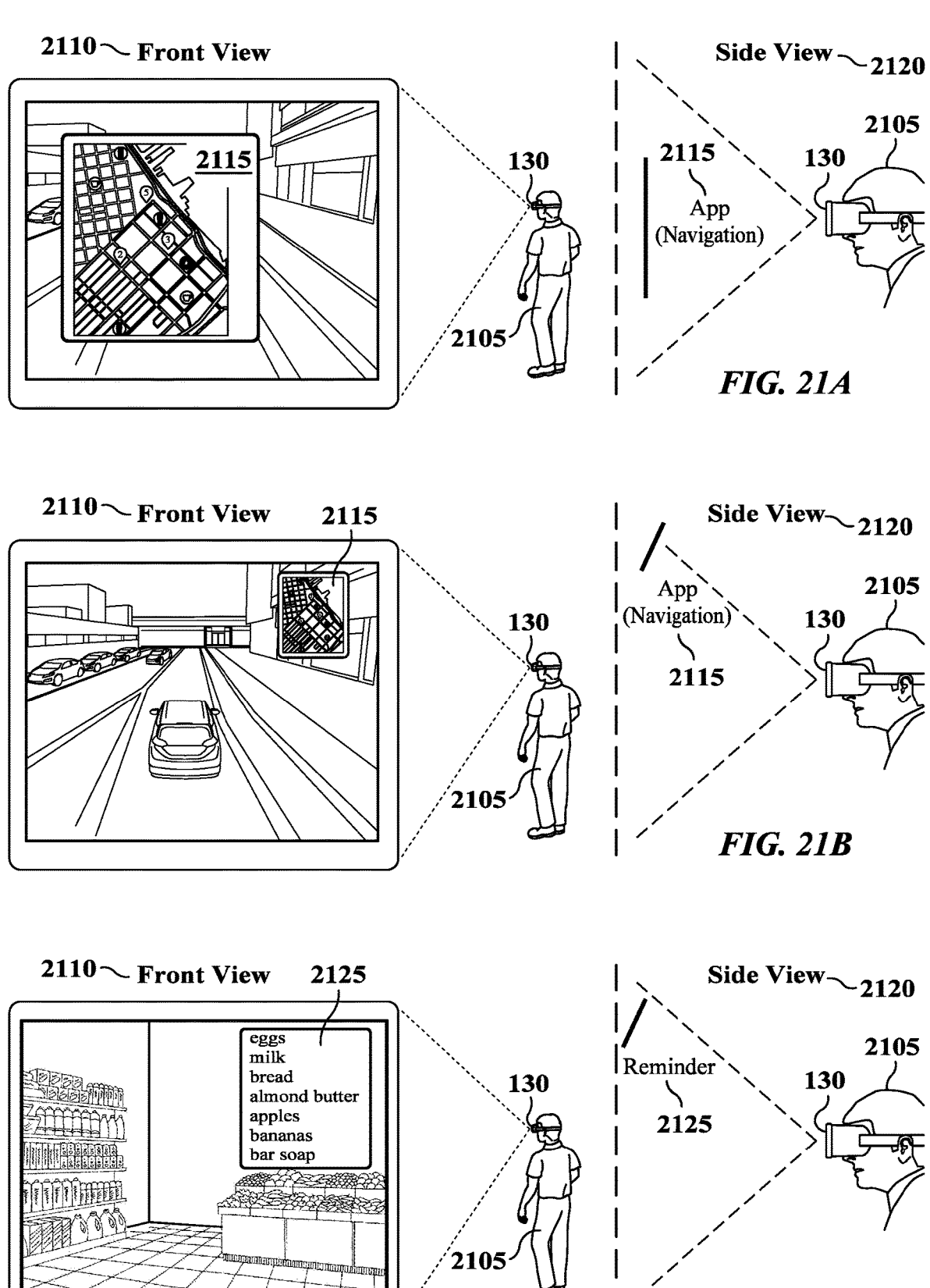
FIG. 21A illustrates an example rendering of a navigation application.
FIG. 21B illustrates an example change of the rendering of AR content after the user starts walking.
FIG. 21C illustrates another example change of the rendering of AR content after the user is inside the supermarket.

FIGS. 21A-21C illustrate another example dynamic rendering of AR content. FIG. 21A illustrates an example rendering of a navigation application. A user 2105 may be standing in the street wearing smart glasses as the client system 130. Within the front view 2110, the navigation application 2115 may be displayed for the user 2105. For example, the navigation application 2115 may be showing how to get to the supermarket. The side view 2120 shows that the navigation application 2115 may be in the middle of the user's 2105 field of view. FIG. 21B illustrates an example change of the rendering of AR content after the user starts walking. Since the user 2105 starts walking, the AR system 500 may adapt the rendering of the AR content to avoid blocking the user's 2105 view. As indicated in FIG.

21B, within the front view 2110, the navigation application 2115 may be changed to a smaller interface and moved to the top of the screen. The user 2105 may still be able to see the navigation while seeing the real-world street. The side view 2120 shows that the navigation application 2115 may be now at the top of the user's 2105 field of view. FIG. 21C illustrates another example change of the rendering of AR content after the user is inside the supermarket. As indicated in FIG. 21C, within the front view 2110, the navigation application 2115 may be not shown anymore. The user 2105 may instead see the inside of the supermarket. In addition, the AR system 500 may display a reminder 2125 comprising groceries to buy, e.g., eggs, milk, etc. The reminder 2125 may be overlaying in the real world. The side view 2120 shows that the reminder 2125 may be at the top of the user's 2105 field of view.

FIG. 22 illustrates an example method 2200 for dynamically adapting the rendering of AR content. The method may begin at step 2210, where the AR system 500 may render, for one or more displays of an augmented-reality (AR) display device of the AR system 500 associated with a first user, a first output image comprising one or more AR objects. At step 2220, the AR system 500 may access one or more sensor signals associated with the first user, wherein the one or more sensor signals are captured by one or more sensors of the AR system 500, wherein the one or more sensors comprise one or more of an inertial measurement unit (IMU), a GPS sensor, a microphone, or a camera, and wherein the one or more sensor signals comprise one or more of a motion signal, a location signal, an audio signal, or a vision signal. At step 2230, the AR system 500 may determine the context of the first user based on one or more of the one or more sensor signals, a user profile of the first user, or a knowledge graph, wherein the context of the first user is based on one or more of a location associated with the first user, the real-world environment associated with the first user, an activity associated with the first user, or an event associated with the first user. At step 2240, the AR system 500 may detect a change in a context of the first user with respect to a real-world environment based on the one or more sensor signals and a cascaded inference process of the change in the context, wherein the cascaded inference process is based on the one or more sensor signals, wherein the cascaded inference process is determined based on one or more sensor constraints associated with each of the one or more sensors constraining usage of the one or more sensor signals by the cascaded inference process, one or more policies defining one or more configurations of the cascaded inference process, one or more unimodal baseline models, and one or more fusion models, wherein each of the unimodal baseline models is based on one or more motion signals, location signals, audio signals, or vision signals, and wherein each of the fusion models is based on two or more of the motion signals, the location signals, the audio signals, or the vision signals. At step 2250, the AR system 500 may detect a change in an intent of the first user based on the one or more sensor signals. At step 2260, the AR system 500 may determine a power state associated with the AR display device, wherein the power state comprises one or more of an off state, a low-battery state, a standby state, a glance state, a locate-based discovery state, an interactive state, a vision-based discovery state, an RGB capture state, a media consumption state, a mute state, a ship mode, or an unconnected state. At step 2270, the AR system 500 may render, for the one or more displays of the AR display device, a second output image comprising the one or more AR objects, wherein one or more of the AR objects are adapted based on the detected change in the context of the first user, the detected change in the intent of the first user, and the power state, wherein adapting the one or more AR objects comprises one or more of adapting a pose of each of the AR objects, adapting a form factor of each of the AR objects, or adapting a transparency each of the AR object. Particular embodiments may repeat one or more steps of the method of FIG. 22, where appropriate. Although this disclosure describes and illustrates particular steps of the method of FIG. 22 as occurring in a particular order, this disclosure contemplates any suitable steps of the method of FIG. 22 occurring in any suitable order. Moreover, although this disclosure describes and illustrates an example method for dynamically adapting the rendering of AR content including the particular steps of the method of FIG. 22, this disclosure contemplates any suitable method for dynamically adapting the rendering of AR content including any suitable steps, which may include all, some, or none of the steps of the method of FIG. 22, where appropriate. Furthermore, although this disclosure describes and illustrates particular components, devices, or systems carrying out particular steps of the method of FIG. 22, this disclosure contemplates any suitable combination of any suitable components, devices, or systems carrying out any suitable steps of the method of FIG. 22.

Social Graphs

Figure 23:
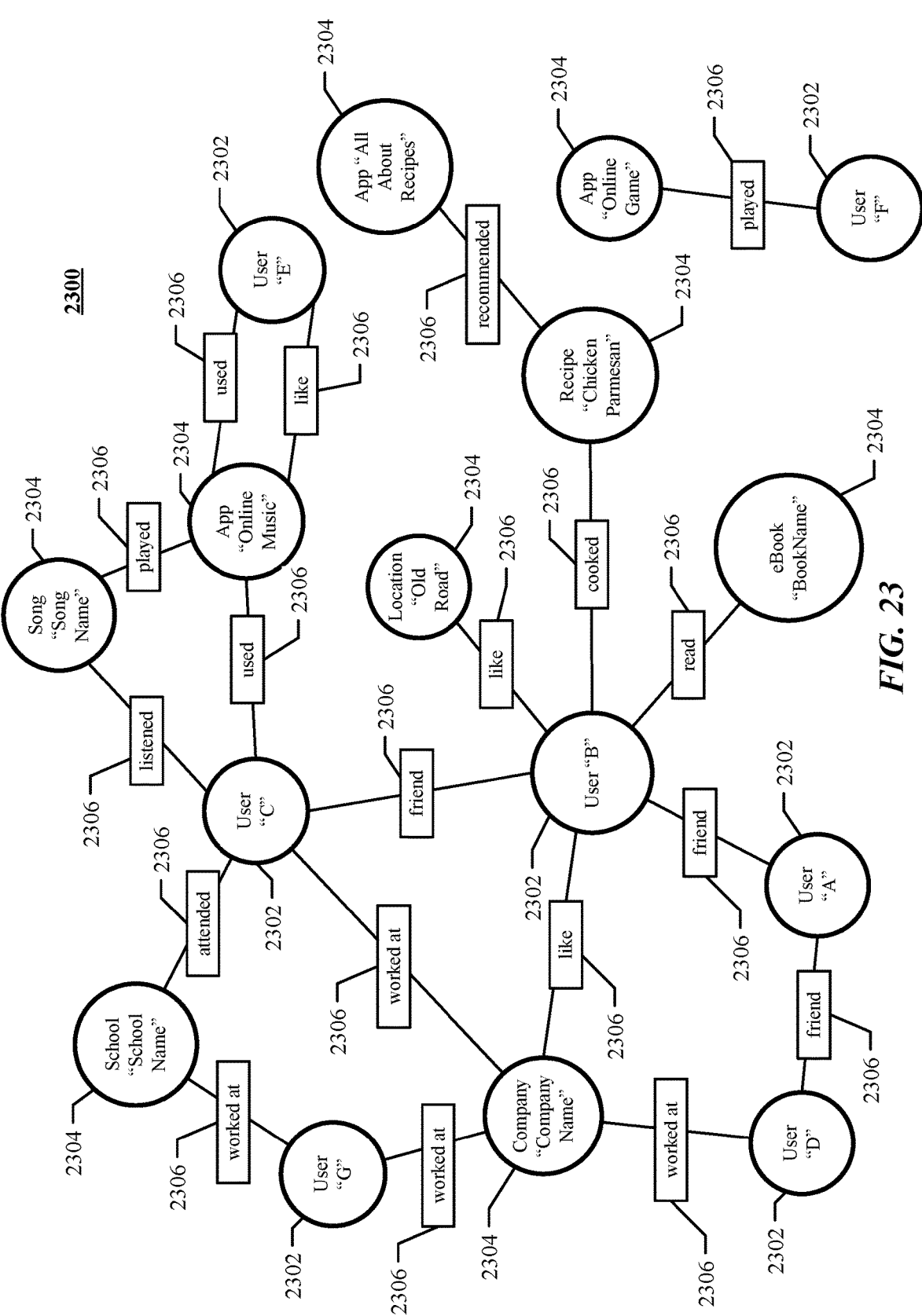
FIG. 23 illustrates an example social graph.

FIG. 23 illustrates an example social graph 2300. In particular embodiments, the social-networking system 160 may store one or more social graphs 2300 in one or more data stores. In particular embodiments, the social graph 2300 may include multiple nodes-which may include multiple user nodes 2302 or multiple concept nodes 2304—and multiple edges 2306 connecting the nodes. Each node may be associated with a unique entity (i.e., user or concept), each of which may have a unique identifier (ID), such as a unique number or username. The example social graph 2300 illustrated in FIG. 23 is shown, for didactic purposes, in a two-dimensional visual map representation. In particular embodiments, a social-networking system 160, a client system 130, an assistant system 140, or a third-party system 170 may access the social graph 2300 and related social-graph information for suitable applications. The nodes and edges of the social graph 2300 may be stored as data objects, for example, in a data store (such as a social-graph database). Such a data store may include one or more searchable or queryable indexes of nodes or edges of the social graph 2300.

In particular embodiments, a user node 2302 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 2302 corresponding to the user, and store the user node 2302 in one or more data stores. Users and user nodes 2302 described herein may, where appropriate, refer to registered users and user nodes 2302 associated with registered users. In addition or as an alternative, users and user nodes 2302 described herein may, where appropriate, refer to users that have not registered with the social-networking system 160. In particular embodiments, a user node 2302 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 2302 may be associated with one or more data objects corresponding to information associated with a user. In particular embodiments, a user node 2302 may correspond to one or more web interfaces.

In particular embodiments, a concept node 2304 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 2304 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 2304 may be associated with one or more data objects corresponding to information associated with concept node 2304. In particular embodiments, a concept node 2304 may correspond to one or more web interfaces.

In particular embodiments, a node in the social graph 2300 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 2304. Profile interfaces may be viewable by all or a selected subset of other users. As an example and not by way of limitation, a user node 2302 may have a corresponding user-profile interface in which the corresponding user may add content, make declarations, or otherwise express himself or herself. As another example and not by way of limitation, a concept node 2304 may have a corresponding concept-profile interface in which one or more users may add content, make declarations, or express themselves, particularly in relation to the concept corresponding to concept node 2304.

In particular embodiments, a concept node 2304 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 2302 corresponding to the user and a concept node 2304 corresponding to the third-party web interface or resource and store edge 2306 in one or more data stores.

In particular embodiments, a pair of nodes in the social graph 2300 may be connected to each other by one or more edges 2306. An edge 2306 connecting a pair of nodes may represent a relationship between the pair of nodes. In particular embodiments, an edge 2306 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 2306 connecting the first user's user node 2302 to the second user's user node 2302 in the social graph 2300 and store edge 2306 as social-graph information in one or more of data stores 164. In the example of FIG. 23, the social graph 2300 includes an edge 2306 indicating a friend relation between user nodes 2302 of user "A" and user "B" and an edge indicating a friend relation between user nodes 2302 of user "C" and user "B." Although this disclosure describes or illustrates particular edges 2306 with particular attributes connecting particular user nodes 2302, this disclosure contemplates any suitable edges 2306 with any suitable attributes connecting user nodes 2302. As an example and not by way of limitation, an edge 2306 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 2300 by one or more edges 2306. The degree of separation between two objects represented by two nodes, respectively, is a count of edges in a shortest path connecting the two nodes in the social graph 2300. As an example and not by way of limitation, in the social graph 2300, the user node 2302 of user "C" is connected to the user node 2302 of user "A" via multiple paths including, for example, a first path directly passing through the user node 2302 of user "B," a second path passing through the concept node 2304 of company "CompanyName" and the user node 2302 of user "D," and a third path passing through the user nodes 2302 and concept nodes 2304 representing school "SchoolName," user "G," company "CompanyName," and user "D." User "C" and user "A" have a degree of separation of two because the shortest path connecting their corresponding nodes (i.e., the first path) includes two edges 2306.

In particular embodiments, an edge 2306 between a user node 2302 and a concept node 2304 may represent a particular action or activity performed by a user associated with user node 2302 toward a concept associated with a concept node 2304. As an example and not by way of limitation, as illustrated in FIG. 23, a user may "like," "attended," "played," "listened," "cooked," "worked at," or "read" a concept, each of which may correspond to an edge type or subtype. A concept-profile interface corresponding to a concept node 2304 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Song-Name") using a particular application (a third-party online music application). In this case, the social-networking system 160 may create a "listened" edge 2306 and a "used" edge (as illustrated in FIG. 23) between user nodes 2302 corresponding to the user and concept nodes 2304 corresponding to the song and application to indicate that the user listened to the song and used the application. Moreover, the social-networking system 160 may create a "played" edge 2306 (as illustrated in FIG. 23) between concept nodes 2304 corresponding to the song and the application to indicate that the particular song was played by the particular application. In this case, "played" edge 2306 corresponds to an action performed by an external application (the third-party online music application) on an external audio file (the song "SongName"). Although this disclosure describes particular edges 2306 with particular attributes connecting user nodes 2302 and concept nodes 2304, this disclosure contemplates any suitable edges 2306 with any suitable attributes connecting user nodes 2302 and concept nodes 2304. Moreover, although this disclosure describes edges between a user node 2302 and a concept node 2304 representing a single relationship, this disclosure contemplates edges between a user node 2302 and a concept node 2304 representing one or more relationships. As an example and not by way of limitation, an edge 2306 may represent both that a user likes and has used at a particular concept. Alternatively, another edge 2306 may represent each type of relationship (or multiples of a single relationship) between a user node 2302 and a concept node 2304 (as illustrated in FIG. 23 between user node 2302 for user "E" and concept node 2304 for "online music application").

In particular embodiments, the social-networking system 160 may create an edge 2306 between a user node 2302 and a concept node 2304 in the social graph 2300. As an example and not by way of limitation, a user viewing a concept-profile interface (such as, for example, by using a web browser or a special-purpose application hosted by the user's client system 130) may indicate that he or she likes the concept represented by the concept node 2304 by clicking or selecting a "Like" icon, which may cause the user's client system 130 to send to the social-networking system 160 a message indicating the user's liking of the concept associated with the concept-profile interface. In response to the message, the social-networking system 160 may create an edge 2306 between user node 2302 associated with the user and concept node 2304, as illustrated by "like" edge 2306 between the user and the concept node 2304. In particular embodiments, the social-networking system 160 may store an edge 2306 in one or more data stores. In particular embodiments, an edge 2306 may be automatically formed by the social-networking system 160 in response to a particular user action. As an example and not by way of limitation, if a first user uploads a picture, reads a book, watches a movie, or listens to a song, an edge 2306 may be formed between user node 2302 corresponding to the first user and concept nodes 2304 corresponding to those concepts. Although this disclosure describes forming particular edges 2306 in particular manners, this disclosure contemplates forming any suitable edges 2306 in any suitable manner.

Vector Spaces and Embeddings

Figure 24:
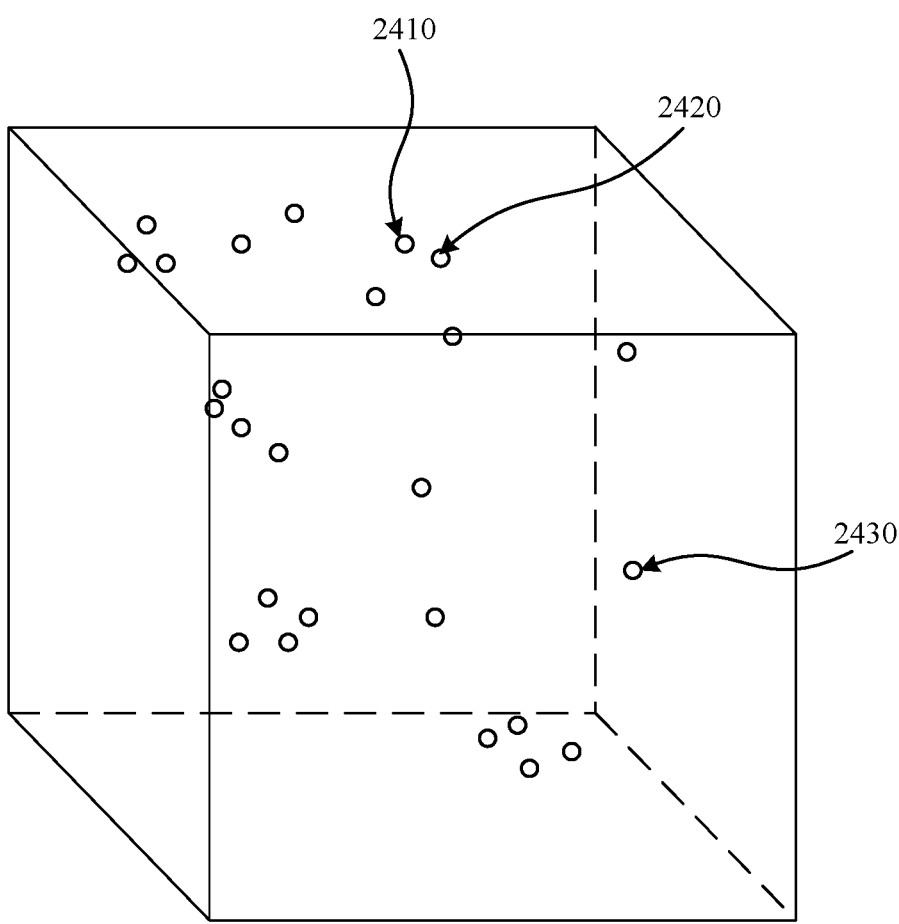
FIG. 24 illustrates an example view of an embedding space.

FIG. 24 illustrates an example view of a vector space 2400. In particular embodiments, an object or an n-gram may be represented in ad-dimensional vector space, where d denotes any suitable number of dimensions. Although the vector space 2400 is illustrated as a three-dimensional space, this is for illustrative purposes only, as the vector space 2400 may be of any suitable dimension. In particular embodiments, an n-gram may be represented in the vector space 2400 as a vector referred to as a term embedding. Each vector may comprise coordinates corresponding to a particular point in the vector space 2400 (i.e., the terminal point of the vector). As an example and not by way of limitation, vectors 2410, 2420, and 2430 may be represented as points in the vector space 2400, as illustrated in FIG. 24. An n-gram may be mapped to a respective vector representation. As an example and not by way of limitation, n-grams $t_1$ and $t_2$ may be mapped to vectors $\vec{v_1}$ and $\vec{v_2}$ in the vector space 2400, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 2400. In particular embodiments, an n-gram may be mapped to a vector representation in the vector space 2400 by using a machine leaning model (e.g., a neural network). The machine learning model may have been trained using a sequence of training data (e.g., a corpus of objects each comprising n-grams).

In particular embodiments, an object may be represented in the vector space 2400 as a vector referred to as a feature vector or an object embedding. As an example and not by way of limitation, objects $e_1$ and $e_2$ may be mapped to vectors $\vec{v_1}$ and $\vec{v_2}$ in the vector space 2400, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 2400. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ ma, 1 be a cosine similarity $$\frac{v_1 \, v_2}{\|v_1\| \, \|v_2\|}.$$

As another example and not by wav of limitation, a similarity metric of $\vec{v_1}$ and $\vec{v_2}$ may be a Euclidean distance $\| \vec{v_1} - \vec{v_2} \|$. A similarity metric of two vectors may represent how similar the two objects or n-grams corresponding to the two vectors, respectively, are to one another, as measured by the distance between the two vectors in the vector space 2400. As an example and not by way of limitation, vector 2410 and vector 2420 may correspond to objects that are more similar to one another than the objects corresponding to vector 2410 and vector 2430, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 25:
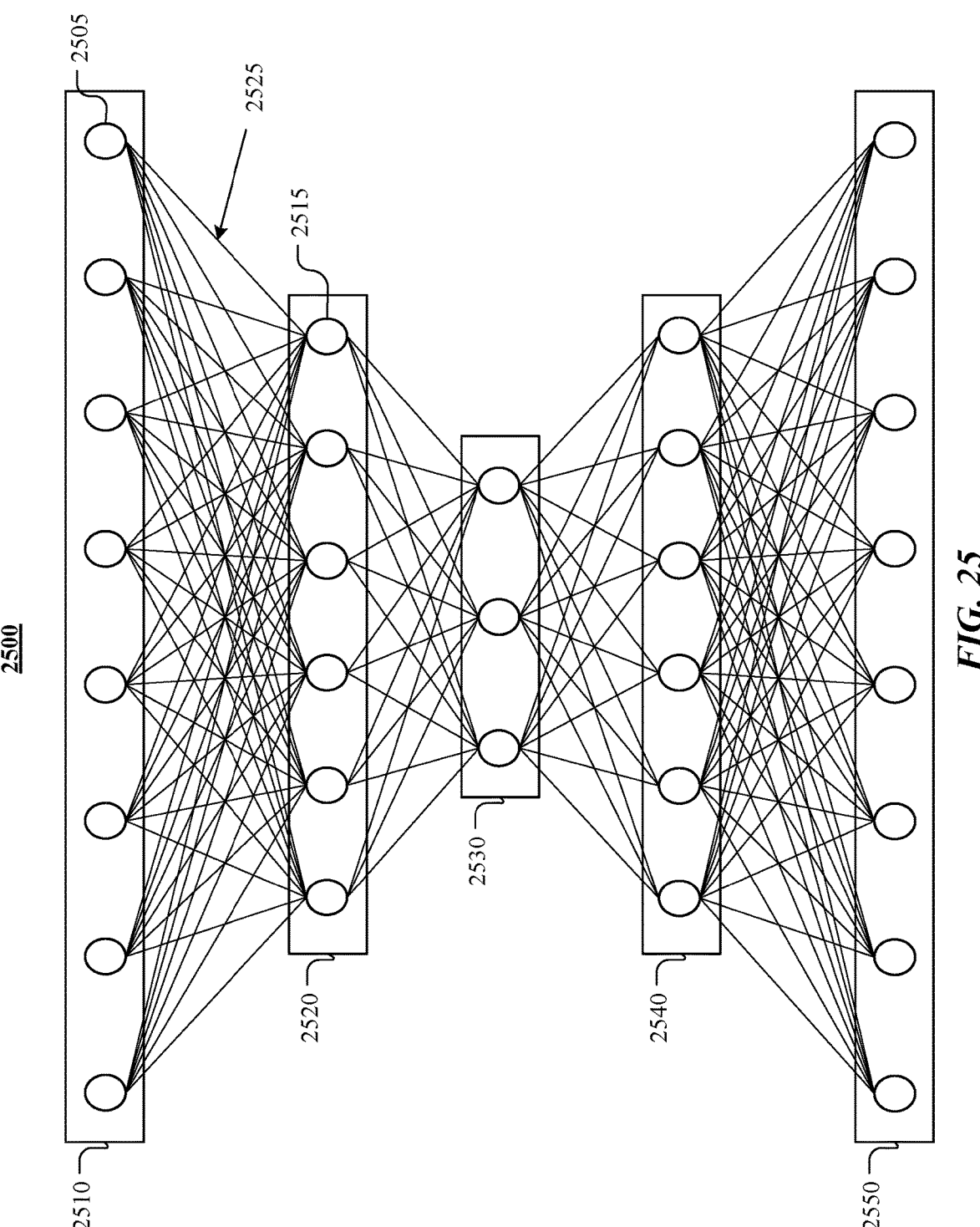
FIG. 25 illustrates an example artificial neural network.

FIG. 25 illustrates an example artificial neural network ("ANN") 2500. In particular embodiments, an ANN may refer to a computational model comprising one or more nodes. Example ANN 2500 may comprise an input layer 2510, hidden layers 2520, 2530, 2540, and an output layer 2550. Each layer of the ANN 2500 may comprise one or more nodes, such as a node 2505 or a node 2515. In particular embodiments, each node of an ANN may be connected to another node of the ANN. As an example and not by way of limitation, each node of the input layer 2510 may be connected to one of more nodes of the hidden layer 2520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 25 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 25 depicts a connection between each node of the input layer 2510 and each node of the hidden layer 2520, one or more nodes of the input layer 2510 may not be connected to one or more nodes of the hidden layer 2520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 2520 may comprise the output of one or more nodes of the input layer 2510. As another example and not by way of limitation, the input to each node of the output layer 2550 may comprise the output of one or more nodes of the hidden layer 2540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may-he the sigmoid function $$F_k(S_k) = \frac{1}{1 + e^{-s_k}}$$

the hyperbolic tangent function $$F_k(S_k) = \frac{e^s k - e^{-s} k}{e^s k + e^{-s} k},$$

the rectifier $F_k(S_k)=\max(0, s_k)$, or any other suitable function $F_k(S_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight.

As an example and not by way of limitation, a connection 2525 between the node 2505 and the node 2515 may have a weighting coefficient of 0.4, which may indicate that 0.4 multiplied by the output of the node 2505 is used as an input to the node 2515. As another example and not by way of limitation, the output $y_k$ of node k may be $y_k = F_k(s_k)$, where $F_k$ may be the activation function corresponding to node k, $s_k = \Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 2500 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 2300. A privacy setting may be specified for one or more edges 2306 or edge-types of the social graph 2300, or with respect to one or more nodes 2302, 2304 or node-types of the social graph 2300. The privacy settings applied to a particular edge 2306 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 2304 connected to a user node 2302 of the first user by an edge 2306. The first user may specify privacy settings that apply to a particular edge 2306 connecting to the concept node 2304 of the object, or may specify privacy settings that apply to all edges 2306 connecting to the concept node 2304. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 26:
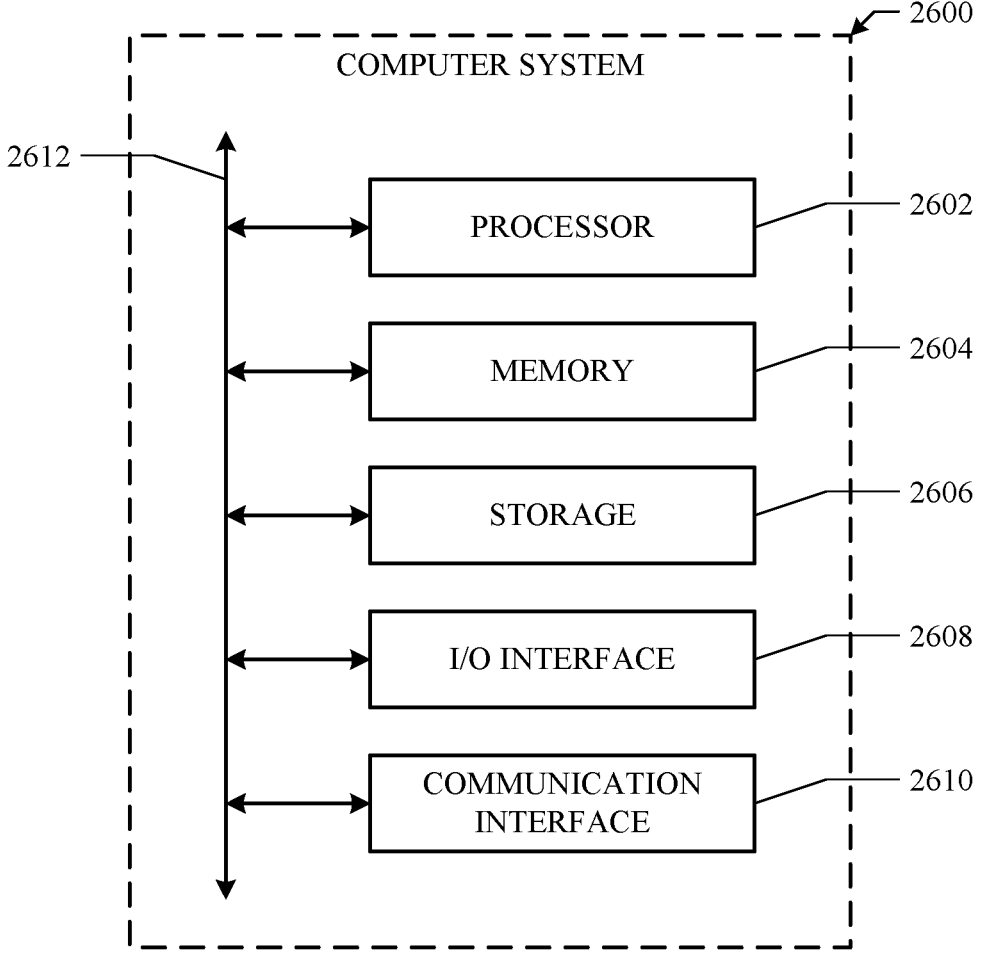
FIG. 26 illustrates an example computer system

FIG. 26 illustrates an example computer system 2600. In particular embodiments, one or more computer systems 2600 perform one or more steps of one or more methods described or illustrated herein. In particular embodiments, one or more computer systems 2600 provide functionality described or illustrated herein. In particular embodiments, software running on one or more computer systems 2600 performs one or more steps of one or more methods described or illustrated herein or provides functionality described or illustrated herein. Particular embodiments include one or more portions of one or more computer systems 2600. Herein, reference to a computer system may encompass a computing device, and vice versa, where appropriate. Moreover, reference to a computer system may encompass one or more computer systems, where appropriate.

This disclosure contemplates any suitable number of computer systems 2600. This disclosure contemplates computer system 2600 taking any suitable physical form. As example and not by way of limitation, computer system 2600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a main-frame, a mesh of computer systems, a mobile telephone, a personal digital assistant (PDA), a server, a tablet computer system, or a combination of two or more of these. Where appropriate, computer system 2600 may include one or more computer systems 2600; be unitary or distributed; span multiple locations; span multiple machines; span multiple data centers; or reside in a cloud, which may include one or more cloud components in one or more networks. Where appropriate, one or more computer systems 2600 may perform without substantial spatial or temporal limitation one or more steps of one or more methods described or illustrated herein. As an example and not by way of limitation, one or more computer systems 2600 may perform in real time or in batch mode one or more steps of one or more methods described or illustrated herein. One or more computer systems 2600 may perform at different times or at different locations one or more steps of one or more methods described or illustrated herein, where appropriate.

In particular embodiments, computer system 2600 includes a processor 2602, memory 2604, storage 2606, an input/output (I/O) interface 2608, a communication interface 2610, and a bus 2612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2602 includes hardware for executing instructions, such as those making up a computer program. As an example and not by way of limitation, to execute instructions, processor 2602 may retrieve (or fetch) the instructions from an internal register, an internal cache, memory 2604, or storage 2606; decode and execute them; and then write one or more results to an internal register, an internal cache, memory 2604, or storage 2606. In particular embodiments, processor 2602 may include one or more internal caches for data, instructions, or addresses. This disclosure contemplates processor 2602 including any suitable number of any suitable internal caches, where appropriate. As an example and not by way of limitation, processor 2602 may include one or more instruction caches, one or more data caches, and one or more translation lookaside buffers (TLBs). Instructions in the instruction caches may be copies of instructions in memory 2604 or storage 2606, and the instruction caches may speed up retrieval of those instructions by processor 2602. Data in the data caches may be copies of data in memory 2604 or storage 2606 for instructions executing at processor 2602 to operate on; the results of previous instructions executed at processor 2602 for access by subsequent instructions executing at processor 2602 or for writing to memory 2604 or storage 2606; or other suitable data. The data caches may speed up read or write operations by processor 2602. The TLBs may speed up virtual-address translation for processor 2602. In particular embodiments, processor 2602 may include one or more internal registers for data, instructions, or addresses. This disclosure contemplates processor 2602 including any suitable number of any suitable internal registers, where appropriate. Where appropriate, processor 2602 may include one or more arithmetic logic units (ALUs); be a multi-core processor; or include one or more processors 2602. Although this disclosure describes and illustrates a particular processor, this disclosure contemplates any suitable processor.

In particular embodiments, memory 2604 includes main memory for storing instructions for processor 2602 to execute or data for processor 2602 to operate on. As an example and not by way of limitation, computer system 2600 may load instructions from storage 2606 or another source (such as, for example, another computer system 2600) to memory 2604. Processor 2602 may then load the instructions from memory 2604 to an internal register or internal cache. To execute the instructions, processor 2602 may retrieve the instructions from the internal register or internal cache and decode them. During or after execution of the instructions, processor 2602 may write one or more results (which may be intermediate or final results) to the internal register or internal cache. Processor 2602 may then write one or more of those results to memory 2604. In particular embodiments, processor 2602 executes only instructions in one or more internal registers or internal caches or in memory 2604 (as opposed to storage 2606 or elsewhere) and operates only on data in one or more internal registers or internal caches or in memory 2604 (as opposed to storage 2606 or elsewhere). One or more memory buses (which may each include an address bus and a data bus) may couple processor 2602 to memory 2604. Bus 2612 may include one or more memory buses, as described below. In particular embodiments, one or more memory management units (MMUs) reside between processor 2602 and memory 2604 and facilitate accesses to memory 2604 requested by processor 2602. In particular embodiments, memory 2604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2604 may include one or more memories 2604, where appropriate. Although this disclosure describes and illustrates particular memory, this disclosure contemplates any suitable memory.

In particular embodiments, storage 2606 includes mass storage for data or instructions. As an example and not by way of limitation, storage 2606 may include a hard disk drive (HDD), a floppy disk drive, flash memory, an optical disc, a magneto-optical disc, magnetic tape, or a Universal Serial Bus (USB) drive or a combination of two or more of these. Storage 2606 may include removable or non-removable (or fixed) media, where appropriate. Storage 2606 may be internal or external to computer system 2600, where appropriate. In particular embodiments, storage 2606 is non-volatile, solid-state memory. In particular embodiments, storage 2606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2606 taking any suitable physical form. Storage 2606 may include one or more storage control units facilitating communication between processor 2602 and storage 2606, where appropriate. Where appropriate, storage 2606 may include one or more storages 2606. Although this disclosure describes and illustrates particular storage, this disclosure contemplates any suitable storage.

In particular embodiments, I/O interface 2608 includes hardware, software, or both, providing one or more interfaces for communication between computer system 2600 and one or more I/O devices. Computer system 2600 may include one or more of these I/O devices, where appropriate. One or more of these I/O devices may enable communication between a person and computer system 2600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2608 for them. Where appropriate, I/O interface 2608 may include one or more device or software drivers enabling processor 2602 to drive one or more of these I/O devices. I/O interface 2608 may include one or more I/O interfaces 2608, where appropriate. Although this disclosure describes and illustrates a particular I/O interface, this disclosure contemplates any suitable I/O interface.

In particular embodiments, communication interface 2610 includes hardware, software, or both providing one or more interfaces for communication (such as, for example, packet-based communication) between computer system 2600 and one or more other computer systems 2600 or one or more networks. As an example and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2610 for it. As an example and not by way of limitation, computer system 2600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2600 may include any suitable communication interface 2610 for any of these networks, where appropriate. Communication interface 2610 may include one or more communication interfaces 2610, where appropriate. Although this disclosure describes and illustrates a particular communication interface, this disclosure contemplates any suitable communication interface.

In particular embodiments, bus 2612 includes hardware, software, or both coupling components of computer system 2600 to each other. As an example and not by way of limitation, bus 2612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2612 may include one or more buses 2612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

rendering, for a display of an augmented-reality (AR) device associated with a user, an output image comprising one or more AR objects, wherein the one or more AR objects comprise a user interface;

detecting a gaze of the user directed towards a first portion of the user interface;

in response to detecting the gaze of the user towards the first portion of the user interface, displaying an indication of a notification on a second portion of the user interface;

receiving, from the user, an interaction with the displayed indication; and in response to receiving the interaction, performing an operation associated with content associated with the notification.

2. The method of claim 1, wherein the user interface comprises a notifications region, and the second portion of the user interface comprises the notifications region.

3. The method of claim 2, wherein the notifications region is located at a top portion of a field of view of the user.

4. The method of claim 2, wherein the first portion of the user interface comprises the notifications region.

5. The method of claim 1, wherein the output image comprises a real-world scene.

6. The method of claim 2, wherein the AR device is operating in a glance power state in which the notifications region is displayed relative to a real-world scene.

7. The method of claim 6, wherein the output image comprises a first layer and a second layer, the first layer comprises the real-world scene, and the second layer comprises the user interface, wherein the AR device is operating in a standby power state in which the second layer is hidden by default behind the first layer, and wherein displaying the notification on the second portion of the user interface comprises displaying the second layer in front of the first layer as an overlay.

8. The method of claim 1, wherein the notification is a push notification.

9. The method of claim 1, wherein the indication is displayed in further response to an input gesture performed by the user.

10. A non-transitory computer-readable storage medium embodying software that is operable, when executed, to:

render, for a display of an augmented-reality (AR) device associated with a user, an output image comprising one or more AR objects, wherein the one or more AR objects comprise a user interface;

detect a gaze of the user directed towards a first portion of the user interface;

in response to detecting the gaze of the user towards the first portion of the user interface, display an indication of a notification on a second portion of the user interface;

receive, from the user, an interaction with the displayed indication; and in response to receiving the interaction, perform an operation associated with content associated with the notification.

11. The non-transitory computer-readable storage medium of claim 10, wherein the user interface comprises a notifications region, and the second portion of the user interface comprises the notifications region.

12. The non-transitory computer-readable storage medium of claim 11, wherein the first portion of the user interface comprises the notifications region.

13. The non-transitory computer-readable storage medium of claim 10, wherein the notification is a push notification.

14. The non-transitory computer-readable storage medium of claim 10, wherein the indication is displayed in further response to an input gesture performed by the user.

15. The non-transitory computer-readable storage medium of claim 10, wherein the output image comprises a real-world scene.

16. A system comprising: one or more processors; and a non-transitory memory coupled to the processors comprising instructions executable by the processors, the instructions, when executed by the processors, cause the system to:

render, for a display of an augmented-reality (AR) device associated with a user, an output image comprising one or more AR objects, wherein the one or more AR objects comprise a user interface;

detect a gaze of the user directed towards a first portion of the user interface;

in response to detecting the gaze of the user towards the first portion of the user interface, display an indication of a notification on a second portion of the user interface;

receive, from the user, an interaction with the displayed indication; and in response to receiving the interaction, perform an operation associated with content associated with the notification.

17. The system of claim 16, wherein the user interface comprises a notifications region, and the second portion of the user interface comprises the notifications region.

18. The system of claim 16, wherein the notification is a push notification.

19. The system of claim 16, wherein the indication is displayed in further response to an input gesture performed by the user.

20. The system of claim 16, wherein the output image comprises a real-world scene.

\* \* \* \* \*